US010636018B2

(12) United States Patent
Dunn et al.

(10) Patent No.: US 10,636,018 B2
(45) Date of Patent: Apr. 28, 2020

(54) ELECTRONIC PAYMENT CLEARING AND CHECK IMAGE EXCHANGE SYSTEMS AND METHODS

(71) Applicant: THE CLEARING HOUSE PAYMENTS COMPANY L.L.C., New York, NY (US)

(72) Inventors: John P. Dunn, East Islip, NY (US); Stephen Ledford, Alpharetta, GA (US); Steve H. Jackson, Hackensack, NJ (US); Albert G. Wood, Kings Park, NY (US)

(73) Assignee: THE CLEARING HOUSE PAYMENTS COMPANY L.L.C., New York, NY (US)

( * ) Notice: Subject to any disclaimer, the term of this patent is extended or adjusted under 35 U.S.C. 154(b) by 0 days.

(21) Appl. No.: 15/711,416

(22) Filed: Sep. 21, 2017

(65) Prior Publication Data
US 2018/0012200 A1 Jan. 11, 2018

Related U.S. Application Data

(62) Division of application No. 14/229,326, filed on Mar. 28, 2014, now Pat. No. 9,799,011, which is a division
(Continued)

(51) Int. Cl.
*G06Q 20/04* (2012.01)
*G06Q 20/02* (2012.01)
*G06Q 20/10* (2012.01)

(52) U.S. Cl.
CPC .......... *G06Q 20/042* (2013.01); *G06Q 20/02* (2013.01); *G06Q 20/04* (2013.01); *G06Q 20/0425* (2013.01); *G06Q 20/10* (2013.01)

(58) Field of Classification Search
CPC ..................................................... G06Q 40/00
(Continued)

(56) References Cited

U.S. PATENT DOCUMENTS 3,852,571 A 12/1974 Hal et al.
4,201,978 A 5/1980 Nally ..................... 340/146.3 C
(Continued)

FOREIGN PATENT DOCUMENTS

CA 2131667 6/1995
EP 0 029 733 A2 6/1981
(Continued)

OTHER PUBLICATIONS

W. Morton, "E-Commerce (A Special Report): A Consumer's Guide—Payments—Check It Out: The Web is suddenly crowded with online-payment services; Here's how they compare," Wall Street Journal (Eastern Edition), New York, NY, Dec. 10, 2001, p. R.13.
(Continued)

*Primary Examiner* — Kirsten S Apple
(74) *Attorney, Agent, or Firm* — Merchant & Gould P.C.

(57) ABSTRACT

A system and corresponding method are provided. The system includes a plurality of first entities (such as banks), each first entity communicatively connected to at least one distributed traffic agent (DTA), a second entity (such as a central facility) communicatively connected to a DTA, and a communication network communicatively connecting the DTAs. A payload containing a data file (such as electronic check presentment data, electronic payment data, or any other data type) is communicated from one first entity to another through their respective DTAs via the communication network. In addition, a transmittal containing control information corresponding to the payload is communicated
(Continued)

from the one first entity to the second entity through their respective DTAs via the communication network.

20 Claims, 19 Drawing Sheets

Related U.S. Application Data of application No. 10/768,821, filed on Jan. 30, 2004, now Pat. No. 8,725,607.

(58) Field of Classification Search
USPC .......................................................... 705/35
See application file for complete search history.

(56) References Cited

U.S. PATENT DOCUMENTS

| | | | |
|---|---|---|---|
| 4,205,780 A | 6/1980 | Burns et al. ................. 235/454 |
| 4,264,808 A | 4/1981 | Owens et al. ................ 235/379 |
| 4,268,715 A | 5/1981 | Atalla ............................ 178/22 |
| 4,270,042 A | 5/1981 | Case .............................. 235/379 |
| 4,321,672 A | 3/1982 | Braun et al. .................. 364/408 |
| 4,326,258 A | 4/1982 | de la Guardia ............... 364/515 |
| 4,404,649 A | 9/1983 | Nunley et al. ................. 364/900 |
| 4,417,136 A | 11/1983 | Rushby et al. ................ 235/379 |
| 4,457,015 A | 6/1984 | Nally et al. ..................... 382/45 |
| 4,491,725 A | 1/1985 | Pritchard ....................... 235/375 |
| 4,500,750 A | 2/1985 | Elander et al. ................. 380/26 |
| 4,523,330 A | 6/1985 | Cain ................................. 382/7 |
| 4,555,617 A | 11/1985 | Brooks et al. ................ 235/379 |
| 4,578,530 A | 3/1986 | Zeidler ............................ 380/26 |
| 4,602,936 A | 7/1986 | Topfl et al. |
| 4,617,457 A | 10/1986 | Granzow et al. |
| 4,652,990 A | 3/1987 | Pailen et al. .................. 364/200 |
| 4,672,377 A | 6/1987 | Murphy et al. |
| 4,673,802 A | 6/1987 | Ohmae et al. |
| 4,675,815 A | 6/1987 | Kuroki et al. ................... 379/37 |
| 4,680,803 A | 7/1987 | Dilella ............................. 382/9 |
| 4,694,147 A | 9/1987 | Amemiya et al. ............ 235/379 |
| 4,723,283 A | 2/1988 | Nagasawa et al. ............. 380/20 |
| 4,745,267 A | 5/1988 | Davis et al. .................. 235/379 |
| 4,747,058 A | 5/1988 | Ho ................................. 364/478 |
| 4,748,557 A | 5/1988 | Tamada et al. ............... 364/200 |
| 4,750,201 A | 6/1988 | Hodgson et al. .............. 379/144 |
| 4,755,940 A | 7/1988 | Brachtl et al. ................ 364/408 |
| 4,757,543 A | 7/1988 | Tamada et al. ................. 380/51 |
| 4,758,530 A | 7/1988 | Schubert |
| 4,771,460 A | 9/1988 | Tamada et al. ................. 380/24 |
| 4,799,156 A | 1/1989 | Shavit et al. ................. 364/401 |
| 4,810,866 A | 3/1989 | Lord, Jr. |
| 4,823,264 A | 4/1989 | Deming ......................... 364/408 |
| 4,843,220 A | 6/1989 | Haun ............................. 235/380 |
| 4,858,121 A | 8/1989 | Barber et al. ................. 364/406 |
| 4,882,779 A | 11/1989 | Rahtgen .......................... 380/24 |
| 4,888,812 A | 12/1989 | Dinan et al. ....................... 382/7 |
| 4,910,774 A | 3/1990 | Barakat ........................... 380/23 |
| 4,912,762 A | 3/1990 | Lee et al. ......................... 380/24 |
| 4,922,503 A | 5/1990 | Leone ........................ 370/85.13 |
| 4,926,325 A | 5/1990 | Benton et al. ................ 364/408 |
| 4,941,125 A | 7/1990 | Boyne ............................ 364/900 |
| 4,960,981 A | 10/1990 | Benton et al. ................ 235/379 |
| 4,961,142 A | 10/1990 | Elliott et al. .................. 364/408 |
| 4,962,531 A | 10/1990 | Sipman et al. ................. 380/24 |
| 4,977,595 A | 12/1990 | Ohta et al. ....................... 380/24 |
| 4,985,921 A | 1/1991 | Schwartz ......................... 380/24 |
| 5,003,594 A | 3/1991 | Shinagawa ...................... 380/24 |
| 5,014,311 A | 5/1991 | Schrenk .......................... 380/23 |
| 5,016,277 A | 5/1991 | Hamilton ........................ 380/49 |
| 5,053,607 A | 10/1991 | Carlson et al. ................ 235/379 |
| 5,054,096 A | 10/1991 | Belzer ............................. 382/41 |
| 5,081,680 A | 1/1992 | Bennett .......................... 380/50 |
| 5,091,968 A | 2/1992 | Higgins et al. ................. 382/30 |
| 5,093,787 A | 3/1992 | Simmons ....................... 364/406 |
| 5,095,480 A | 3/1992 | Fenner ......................... 370/94.1 |
| 5,111,395 A | 5/1992 | Smith et al. .................. 364/408 |
| 5,122,950 A | 6/1992 | Benton et al. ................ 364/408 |
| 5,123,047 A | 6/1992 | Rosenow ........................ 380/50 |
| 5,144,115 A | 9/1992 | Yoshida ........................ 235/379 |
| 5,159,548 A | 10/1992 | Caslavka ...................... 364/408 |
| 5,159,592 A | 10/1992 | Perkins ........................ 370/85.7 |
| 5,163,098 A | 11/1992 | Dahbura .......................... 380/24 |
| 5,168,444 A | 12/1992 | Cukor et al. .................. 364/401 |
| 5,170,466 A | 12/1992 | Rogan et al. .................. 395/145 |
| 5,173,594 A | 12/1992 | McClure ........................ 235/380 |
| 5,175,682 A | 12/1992 | Higashiyama et al. ....... 364/408 |
| 5,175,766 A | 12/1992 | Hamilton ........................ 380/49 |
| 5,185,798 A | 2/1993 | Hamada et al. ................ 380/23 |
| 5,187,750 A | 2/1993 | Behera ............................. 382/7 |
| 5,195,133 A | 3/1993 | Kapp et al. ...................... 380/9 |
| 5,198,975 A * | 3/1993 | Baker .................... G06K 17/00 235/379 |
| 5,200,993 A | 4/1993 | Wheeler et al. ................ 379/96 |
| 5,204,811 A | 4/1993 | Bednar et al. ................ 364/406 |
| 5,214,697 A | 5/1993 | Saito ................................. 380/4 |
| 5,220,501 A | 6/1993 | Lawlor et al. ................. 364/408 |
| 5,231,569 A | 7/1993 | Myatt et al. |
| 5,233,547 A | 8/1993 | Kapp et al. |
| 5,233,656 A | 8/1993 | Langrand et al. ............... 380/23 |
| 5,235,433 A | 8/1993 | Clarkson et al. .............. 358/434 |
| 5,237,158 A | 8/1993 | Kern et al. .................... 235/379 |
| 5,237,159 A * | 8/1993 | Stephens ................ G06Q 20/02 235/379 |
| 5,237,620 A | 8/1993 | Deaton et al. |
| 5,241,600 A | 8/1993 | Hillis ............................... 380/23 |
| 5,256,863 A | 10/1993 | Ferguson et al. ............. 235/383 |
| 5,259,025 A | 11/1993 | Monroe et al. ................. 380/23 |
| 5,262,942 A | 11/1993 | Earle ............................. 364/408 |
| 5,265,007 A | 11/1993 | Bernhard, Jr. et al. ........ 364/408 |
| 5,274,567 A | 12/1993 | Kallin et al. .................. 364/478 |
| 5,283,829 A | 2/1994 | Anderson ........................ 380/24 |
| 5,287,497 A | 2/1994 | Behera .......................... 395/600 |
| 5,317,637 A | 5/1994 | Pichlmaier et al. ............ 380/25 |
| 5,321,238 A | 6/1994 | Kamata et al. ................ 235/379 |
| 5,321,751 A | 6/1994 | Ray et al. ........................ 380/23 |
| 5,321,816 A | 6/1994 | Rogan et al. .................. 395/200 |
| 5,326,959 A | 7/1994 | Perazza ......................... 235/379 |
| 5,329,589 A | 7/1994 | Fraser et al. .................... 379/91 |
| 5,337,358 A | 8/1994 | Axelrod et al. ................. 380/23 |
| 5,341,428 A | 8/1994 | Schatz ............................. 380/23 |
| 5,343,529 A | 8/1994 | Goldfine et al. ................ 380/23 |
| 5,345,090 A | 9/1994 | Hludzinski .................... 250/566 |
| 5,373,550 A | 12/1994 | Campbell et al. ............ 379/100 |
| 5,383,113 A | 1/1995 | Kight et al. .................. 364/401 |
| 5,396,558 A | 3/1995 | Ishiguro et al. ................. 380/25 |
| 5,408,531 A | 4/1995 | Nakajima ......................... 380/3 |
| 5,412,190 A * | 5/1995 | Josephson .............. G06Q 20/02 235/379 |
| 5,426,281 A | 6/1995 | Abecassis |
| 5,434,928 A | 7/1995 | Wagner et al. ................ 382/187 |
| 5,436,970 A | 7/1995 | Ray et al. ........................ 380/23 |
| 5,440,634 A | 8/1995 | Jones et al. ..................... 380/24 |
| 5,444,794 A | 8/1995 | Uhland, Sr. ................... 382/137 |
| 5,446,796 A | 8/1995 | Ishiguro et al. ................. 380/24 |
| 5,453,601 A | 9/1995 | Rosen |
| 5,454,575 A | 10/1995 | Del Buono .................... 280/35 |
| 5,455,407 A | 10/1995 | Rosen |
| 5,457,747 A | 10/1995 | Drexler et al. ................. 380/24 |
| 5,465,206 A | 11/1995 | Hilt et al. ..................... 364/406 |
| 5,473,143 A | 12/1995 | Vak et al. ..................... 235/380 |
| 5,479,510 A | 12/1995 | Olsen et al. ..................... 380/24 |
| 5,484,988 A | 1/1996 | Hills et al. .................... 235/379 |
| 5,502,765 A | 3/1996 | Ishiguro et al. ................. 380/24 |
| 5,506,691 A | 4/1996 | Bednar et al. ................ 358/402 |
| 5,523,167 A | 6/1996 | Hunt et al. |
| 5,524,073 A | 6/1996 | Stambler ........................ 380/24 |
| 5,528,705 A | 6/1996 | Reasoner, Jr. et al. ........ 382/306 |
| 5,532,464 A * | 7/1996 | Josephson .............. G06Q 20/02 235/379 |
| 5,539,822 A | 7/1996 | Lett ................................ 380/20 |
| 5,539,825 A | 7/1996 | Akiyama et al. ................ 380/24 |
| 5,544,043 A | 8/1996 | Miki et al. .................... 364/406 |
| 5,544,255 A | 8/1996 | Smithies et al. .............. 382/119 |
| 5,557,518 A | 9/1996 | Rosen ........................... 364/408 |
| 5,577,121 A | 11/1996 | Davis et al. .................... 380/24 |

(56) References Cited

U.S. PATENT DOCUMENTS

| | | | |
|---|---|---|---|
| 5,590,038 A | 12/1996 | Pitroda | 395/241 |
| 5,594,226 A | 1/1997 | Steger | |
| 5,596,642 A | 1/1997 | Davis et al. | 380/24 |
| 5,602,933 A | 2/1997 | Blackwell et al. | 382/116 |
| 5,602,936 A | 2/1997 | Green et al. | 382/140 |
| 5,604,640 A | 2/1997 | Zipf et al. | 359/803 |
| 5,604,802 A | 2/1997 | Holloway | 380/24 |
| 5,608,800 A | 3/1997 | Hoffmann et al. | 380/25 |
| 5,613,001 A | 3/1997 | Bakhoum | 380/4 |
| 5,615,269 A | 3/1997 | Micali | 380/49 |
| 5,621,796 A | 4/1997 | Davis et al. | 380/24 |
| 5,621,797 A | 4/1997 | Rosen | 380/24 |
| 5,623,547 A | 4/1997 | Jones et al. | 380/24 |
| 5,625,694 A | 4/1997 | Lee et al. | 380/23 |
| 5,629,981 A | 5/1997 | Nerlikar | 380/25 |
| 5,633,930 A | 5/1997 | Davis et al. | 380/24 |
| 5,642,419 A | 6/1997 | Rosen | 380/23 |
| 5,649,117 A | 6/1997 | Landry | 395/240 |
| 5,647,017 A | 7/1997 | Smithies et al. | 382/119 |
| 5,649,116 A | 7/1997 | McCoy et al. | 395/238 |
| 5,652,786 A | 7/1997 | Rogers | 379/91.01 |
| 5,657,389 A | 8/1997 | Houvener | 380/23 |
| 5,657,396 A | 8/1997 | Rudolph et al. | 382/190 |
| 5,659,616 A | 8/1997 | Sudia | 380/23 |
| 5,668,897 A | 9/1997 | Stolfo | 382/283 |
| 5,673,333 A | 9/1997 | Johnston | 382/137 |
| 5,677,955 A | 10/1997 | Doggett et al. | 380/24 |
| 5,682,549 A | 10/1997 | Tanaka et al. | 395/828 |
| 5,684,965 A | 11/1997 | Pickering | 395/234 |
| 5,691,524 A * | 11/1997 | Josephson | G06Q 20/02 235/375 |
| 5,699,528 A | 12/1997 | Hogan | 395/240 |
| 5,703,344 A | 12/1997 | Bezy et al. | |
| 5,708,810 A | 1/1998 | Kern et al. | 395/712 |
| 5,710,887 A | 1/1998 | Chelliah et al. | 395/226 |
| 5,715,298 A | 2/1998 | Rogers | 379/91.01 |
| 5,717,868 A * | 2/1998 | James | G06Q 20/10 705/35 |
| 5,732,400 A | 3/1998 | Mandler et al. | 705/26 |
| 5,742,668 A | 4/1998 | Pepe et al. | 379/58 |
| 5,742,888 A | 4/1998 | Fuchiwaki et al. | 399/308 |
| 5,751,842 A | 5/1998 | Riach et al. | 382/137 |
| 5,754,673 A | 5/1998 | Brooks et al. | 382/112 |
| 5,760,916 A | 6/1998 | Dellert et al. | 358/408 |
| 5,738,808 A | 7/1998 | Josephson | 235/379 |
| 5,778,178 A | 7/1998 | Arunachalam | 395/200.33 |
| 5,781,654 A | 7/1998 | Carney | 382/137 |
| 5,783,808 A * | 7/1998 | Josephson | G06Q 20/02 235/379 |
| 5,784,503 A | 7/1998 | Bleecker, III et al. | 382/306 |
| 5,784,610 A | 7/1998 | Copeland, III et al. | 395/615 |
| 5,787,403 A | 7/1998 | Randle | 705/43 |
| 5,790,260 A | 8/1998 | Myers | 358/296 |
| 5,790,790 A | 8/1998 | Smith et al. | 395/200.36 |
| 5,793,869 A | 8/1998 | Claflin, Jr. | 380/49 |
| 5,832,460 A | 11/1998 | Bednar et al. | 705/27 |
| 5,832,463 A | 11/1998 | Funk | 705/35 |
| 5,832,464 A | 11/1998 | Houverner et al. | 705/45 |
| 5,848,400 A | 12/1998 | Chang | 705/35 |
| 5,857,034 A | 1/1999 | Tsuchiya et al. | 382/175 |
| 5,870,456 A | 2/1999 | Rogers | 379/91.01 |
| 5,870,724 A | 2/1999 | Lawlor et al. | 705/42 |
| 5,870,725 A | 2/1999 | Bellinger et al. | 705/45 |
| 5,873,072 A | 2/1999 | Kight et al. | 705/40 |
| 5,884,271 A | 3/1999 | Pitroda | 705/1 |
| 5,893,080 A | 4/1999 | McGurl et al. | 705/40 |
| 5,903,874 A | 5/1999 | Leonard et al. | 705/14 |
| 5,903,880 A | 5/1999 | Biffar | 705/39 |
| 5,903,881 A | 5/1999 | Schrader et al. | 705/42 |
| 5,910,988 A | 6/1999 | Ballard | 380/24 |
| 5,915,023 A | 6/1999 | Bernstein | 380/24 |
| 5,917,965 A * | 6/1999 | Cahill | G06K 9/033 382/305 |
| 5,920,847 A | 7/1999 | Kolling et al. | 705/40 |
| 5,925,865 A | 7/1999 | Steger | |
| 5,926,288 A | 7/1999 | Dellert et al. | 358/487 |
| 5,930,778 A | 7/1999 | Geer | 705/45 |
| 5,937,396 A | 8/1999 | Konya | 705/43 |
| 5,940,844 A | 8/1999 | Cahill et al. | |
| 5,956,700 A | 9/1999 | Landry | 705/40 |
| 5,963,647 A | 10/1999 | Downing et al. | 380/24 |
| 5,963,925 A | 10/1999 | Kolling et al. | 705/40 |
| 5,973,731 A | 10/1999 | Schwab | 348/161 |
| 5,978,780 A | 11/1999 | Watson | 705/40 |
| 5,987,500 A | 11/1999 | Arunachalam | 709/203 |
| 5,999,625 A | 12/1999 | Bellare et al. | 380/24 |
| 6,006,208 A | 12/1999 | Forst et al. | |
| 6,021,202 A | 2/2000 | Anderson et al. | 380/25 |
| 6,029,150 A | 2/2000 | Kravitz | 705/39 |
| 6,029,151 A | 2/2000 | Nikander | 705/39 |
| 6,032,133 A | 2/2000 | Hilt et al. | 705/40 |
| 6,032,137 A | 2/2000 | Ballard | 705/75 |
| 6,036,344 A | 3/2000 | Goldenberg | |
| 6,047,051 A | 4/2000 | Ginzboorg et al. | |
| 6,049,785 A | 4/2000 | Gifford | |
| 6,049,786 A | 4/2000 | Smorodinsky | 705/40 |
| 6,055,567 A | 4/2000 | Ganesan et al. | 709/219 |
| 6,058,382 A | 5/2000 | Kasai et al. | 705/41 |
| 6,069,896 A | 5/2000 | Borgstahl et al. | 370/401 |
| 6,070,150 A | 5/2000 | Remington et al. | 705/34 |
| 6,076,068 A | 6/2000 | DeLapa et al. | 705/14 |
| 6,076,074 A | 6/2000 | Cotton et al. | 705/40 |
| 6,108,104 A | 8/2000 | Tesavis | 358/434 |
| 6,115,509 A | 9/2000 | Yeskel | 382/309 |
| 6,138,107 A | 10/2000 | Elgamal | 705/39 |
| 6,145,738 A | 11/2000 | Stinson et al. | 235/379 |
| 6,173,272 B1 | 1/2001 | Thomas et al. | 705/42 |
| 6,181,837 B1 | 1/2001 | Cahill et al. | |
| 6,189,785 B1 | 2/2001 | Lowery | |
| 6,192,142 B1 | 2/2001 | Pare, Jr. et al. | 382/115 |
| 6,192,407 B1 | 2/2001 | Smith et al. | 709/229 |
| 6,199,077 B1 | 3/2001 | Inala et al. | 707/501 |
| 6,202,054 B1 | 3/2001 | Lawlor et al. | 705/42 |
| 6,209,095 B1 | 3/2001 | Anderson et al. | 713/176 |
| 6,212,556 B1 | 4/2001 | Arunachalam | 709/219 |
| 6,223,168 B1 | 4/2001 | McGurl et al. | 705/40 |
| 6,230,148 B1 | 5/2001 | Pare, Jr. et al. | 705/40 |
| 6,243,689 B1 | 6/2001 | Norton | |
| 6,260,024 B1 | 7/2001 | Shkedy | 705/37 |
| 6,269,348 B1 | 7/2001 | Pare, Jr. et al. | 705/39 |
| 6,278,993 B1 | 8/2001 | Kumar et al. | 707/3 |
| 6,282,523 B1 | 8/2001 | Tedesco et al. | |
| 6,283,366 B1 | 9/2001 | Hills et al. | |
| 6,285,991 B1 | 9/2001 | Powar | 705/76 |
| 6,289,322 B1 | 9/2001 | Kitchen et al. | 705/40 |
| 6,292,789 B1 | 9/2001 | Schutzer | 705/40 |
| 6,301,379 B1 * | 10/2001 | Thompson | G06Q 20/042 235/379 |
| 6,304,857 B1 | 10/2001 | Heindel et al. | 705/34 |
| 6,317,745 B1 | 11/2001 | Thomas et al. | 707/100 |
| 6,317,783 B1 | 11/2001 | Freishtat et al. | 709/218 |
| 6,324,526 B1 | 11/2001 | D'Agostino | 705/44 |
| 6,327,577 B1 | 12/2001 | Garrison et al. | 705/40 |
| 6,330,544 B1 | 12/2001 | Walker et al. | 705/14 |
| 6,334,116 B1 | 12/2001 | Ganesan et al. | 705/34 |
| 6,338,050 B1 | 1/2002 | Conklin et al. | 705/80 |
| 6,351,553 B1 | 2/2002 | Hayosh | |
| 6,353,811 B1 | 3/2002 | Weissman | 705/40 |
| 6,363,362 B1 | 3/2002 | Burfield et al. | 705/40 |
| 6,385,595 B1 | 5/2002 | Kolling et al. | 705/40 |
| 6,385,652 B1 | 5/2002 | Brown et al. | 709/227 |
| 6,405,245 B1 | 6/2002 | Burson et al. | 709/217 |
| 6,408,284 B1 | 6/2002 | Hilt et al. | 705/40 |
| 6,411,939 B1 | 6/2002 | Parsons | |
| 6,412,073 B1 | 6/2002 | Rangan | 713/202 |
| 6,438,527 B1 | 8/2002 | Powar | 705/40 |
| 6,442,590 B1 | 8/2002 | Inala et al. | 709/204 |
| 6,477,565 B1 | 11/2002 | Daswani et al. | 709/217 |
| 6,493,685 B1 | 12/2002 | Ensel et al. | 705/40 |
| 6,510,451 B2 | 1/2003 | Wu et al. | 709/203 |
| 6,517,587 B2 | 2/2003 | Satyavolu et al. | 715/501.1 |
| 6,553,346 B1 | 4/2003 | Walker et al. | 705/1 |
| 6,567,850 B1 | 5/2003 | Freishtat et al. | 709/224 |
| 6,574,377 B1 | 6/2003 | Cahill et al. | |

(56) References Cited

U.S. PATENT DOCUMENTS

| | | | |
|---|---|---|---|
| 6,578,015 B1 | 6/2003 | Haseltine et al. ............... 705/34 |
| 6,594,647 B1 | 7/2003 | Randle et al. |
| 6,594,766 B2 | 7/2003 | Rangan et al. ............... 713/202 |
| 6,633,910 B1 | 10/2003 | Rajan et al. ................ 709/224 |
| 6,647,376 B1 | 11/2003 | Farrar et al. ................ 705/45 |
| 6,678,664 B1 | 1/2004 | Ganesan ........................ 435/6 |
| 6,694,300 B1 | 2/2004 | Walker et al. ................ 705/14 |
| 6,725,425 B1 | 4/2004 | Rajan et al. ................ 715/513 |
| 6,738,804 B1 | 5/2004 | Lo ................................ 709/219 |
| 6,748,367 B1 | 6/2004 | Lee ................................ 705/66 |
| 6,802,042 B2 | 10/2004 | Rangan et al. ............ 715/501.1 |
| 6,826,545 B2 | 11/2004 | Kawashima et al. ........... 705/40 |
| 6,842,782 B1 | 1/2005 | Malik et al. .................. 709/224 |
| 6,856,974 B1 | 2/2005 | Ganesan et al. ............... 705/40 |
| 6,856,975 B1 | 2/2005 | Inglis ............................ 705/51 |
| 6,859,212 B2 | 2/2005 | Kumar et al. ................. 345/744 |
| 6,863,214 B1 | 3/2005 | Garner, IV et al. |
| 6,865,680 B1 | 3/2005 | Wu et al. ....................... 713/201 |
| 6,871,220 B1 | 3/2005 | Rajan et al. .................. 709/218 |
| 6,910,023 B1 | 6/2005 | Schibi ............................ 705/64 |
| 6,932,268 B1 | 8/2005 | McCoy et al. ................ 235/380 |
| 6,934,691 B1 | 8/2005 | Simpson et al. ............... 705/34 |
| 6,945,453 B1 | 9/2005 | Schwarz ........................ 235/375 |
| 6,948,063 B1 | 9/2005 | Ganesan et al. ............... 713/168 |
| 6,968,319 B1 | 11/2005 | Remington et al. ............ 705/40 |
| 6,980,973 B1 | 12/2005 | Karpenko |
| 6,996,542 B1 | 2/2006 | Landry ........................... 705/40 |
| 7,004,382 B2 | 2/2006 | Sandru ........................... 235/379 |
| 7,013,310 B2 | 3/2006 | Messing et al. ............ 707/104.1 |
| 7,028,008 B2 | 4/2006 | Powar ............................ 705/40 |
| 7,028,886 B1 | 4/2006 | Maloney ....................... 235/379 |
| 7,039,656 B1 | 5/2006 | Tsai et al. ..................... 707/201 |
| 7,076,458 B2 | 7/2006 | Lawlor et al. ................. 705/35 |
| 7,085,997 B1 | 8/2006 | Wu et al. ................... 715/501.1 |
| 7,089,208 B1 | 8/2006 | Levchin et al. ................ 705/39 |
| 7,099,845 B2* | 8/2006 | Higgins ................ G06Q 20/02 |
| | | 705/35 |
| 7,107,244 B2 | 9/2006 | Kight et al. .................... 705/40 |
| 7,110,969 B1 | 9/2006 | Bennett et al. |
| 7,110,993 B2 | 9/2006 | Soulanille et al. ............... 707/3 |
| 7,120,602 B2 | 10/2006 | Kitchen et al. ................. 705/40 |
| 7,146,338 B2 | 12/2006 | Kight et al. .................... 705/42 |
| 7,155,508 B2 | 12/2006 | Sankuratripati et al. ..... 709/224 |
| 7,158,955 B2 | 1/2007 | Diveley et al. ................ 705/74 |
| 7,165,052 B2 | 1/2007 | Diveley et al. ................ 705/74 |
| 7,165,723 B2* | 1/2007 | McGlamery ............ G06K 9/03 |
| | | 235/379 |
| 7,167,711 B1 | 1/2007 | Dennis ...................... 455/456.1 |
| 7,175,074 B2 | 2/2007 | Mejias et al. ................. 235/379 |
| 7,177,846 B2 | 2/2007 | Moenickheim et al. ....... 705/64 |
| 7,178,096 B2 | 2/2007 | Rangan et al. ................ 715/500 |
| 7,181,430 B1 | 2/2007 | Buchanan et al. ............. 705/45 |
| 7,191,150 B1 | 3/2007 | Shao et al. .................... 705/38 |
| 7,191,151 B1 | 3/2007 | Nosek ............................ 705/39 |
| 7,200,551 B1 | 4/2007 | Senez ............................. 704/40 |
| 7,200,804 B1 | 4/2007 | Khavari et al. ................ 715/513 |
| 7,203,845 B2 | 4/2007 | Sokolic et al. ................ 713/194 |
| 7,213,003 B1 | 5/2007 | Kight et al. .................... 705/40 |
| 7,225,156 B2 | 5/2007 | Fisher et al. .................... 705/50 |
| 7,225,464 B2 | 5/2007 | Satyavolu et al. .............. 726/10 |
| 7,236,950 B2 | 6/2007 | Savage et al. ................. 705/34 |
| 7,240,031 B1 | 7/2007 | Kight et al. .................... 705/40 |
| 7,249,080 B1 | 7/2007 | Hoffman et al. ............... 705/36 |
| 7,249,094 B2 | 7/2007 | Levchin et al. ................ 705/39 |
| 7,251,656 B2 | 7/2007 | Keown et al. .................. 707/10 |
| 7,263,548 B2 | 8/2007 | Daswani et al. .............. 709/217 |
| 7,296,004 B1 | 11/2007 | Garrison et al. .............. 705/404 |
| 7,302,408 B2 | 11/2007 | Engdahl et al. ................ 705/30 |
| 7,302,411 B2 | 11/2007 | Ganesan et al. ............... 705/35 |
| 7,308,426 B1 | 12/2007 | Pitroda ........................... 705/35 |
| 7,313,813 B2 | 12/2007 | Rangan et al. ................... 726/5 |
| 7,321,874 B2 | 1/2008 | Dilip et al. .................... 705/37 |
| 7,321,875 B2 | 1/2008 | Dilip et al. .................... 705/37 |
| 7,330,831 B2 | 2/2008 | Biondi et al. .................. 705/36 |
| 7,334,128 B2 | 2/2008 | Ganesan et al. ............... 713/168 |
| 7,356,502 B1 | 4/2008 | LaBadie et al. |
| 7,366,696 B1 | 4/2008 | Ganesan et al. ............... 705/40 |
| 7,366,697 B2 | 4/2008 | Kitchen et al. ................. 705/40 |
| 7,370,014 B1 | 5/2008 | Vasavada et al. .............. 705/40 |
| 7,383,223 B1 | 6/2008 | Dilip et al. ..................... 705/39 |
| 7,383,226 B2 | 6/2008 | Kight et al. .................... 705/40 |
| 7,392,223 B1 | 6/2008 | Ganesan et al. ............... 705/40 |
| 7,395,319 B2 | 7/2008 | Harris et al. .................. 709/219 |
| 7,415,610 B2 | 8/2008 | Ganesan et al. ............... 713/168 |
| 7,424,520 B2 | 9/2008 | Dawsani et al. .............. 709/217 |
| 7,426,638 B2 | 9/2008 | Ganesan et al. ............... 713/168 |
| 7,447,347 B2* | 11/2008 | Weber .................... G06K 9/186 |
| | | 382/139 |
| 7,474,779 B2 | 1/2009 | Duncan |
| 7,490,063 B2 | 2/2009 | Garrison et al. ................ 705/40 |
| 7,502,749 B2 | 3/2009 | Ganesan et al. ............... 705/26 |
| 7,505,937 B2 | 3/2009 | Dilip et al. ..................... 705/37 |
| 7,526,448 B2 | 4/2009 | Zielke et al. ................... 705/40 |
| 7,533,058 B2 | 5/2009 | Kulakowski ................... 705/40 |
| 7,536,340 B2 | 5/2009 | Dheer et al. .................... 705/37 |
| 7,558,795 B2 | 7/2009 | Malik et al. .................... 707/10 |
| 7,606,752 B2 | 10/2009 | Hazlehurst et al. ............. 705/35 |
| 7,606,787 B2 | 10/2009 | Keown et al. ..................... 707/1 |
| 7,610,245 B2 | 10/2009 | Dent et al. ...................... 705/40 |
| 7,636,686 B2 | 12/2009 | Pierdinock et al. ............ 705/37 |
| 7,636,688 B2 | 12/2009 | Kitchen et al. ................. 705/39 |
| 7,640,197 B1 | 12/2009 | Gentry et al. .................. 705/35 |
| 7,644,023 B2 | 1/2010 | Kumar et al. .................. 705/36 |
| 7,644,036 B2 | 1/2010 | McCoy et al. .................. 705/39 |
| 7,653,598 B1 | 1/2010 | Hamilton et al. ............... 705/40 |
| 7,657,484 B2 | 2/2010 | Ganesan et al. ............... 705/40 |
| 7,660,766 B1 | 2/2010 | Lawson et al. ................. 705/40 |
| 7,672,879 B1 | 3/2010 | Kumar et al. .................. 705/30 |
| 7,685,525 B2 | 3/2010 | Kumar et al. ................ 715/744 |
| 7,693,790 B2 | 4/2010 | Lawlor et al. .................. 705/40 |
| 7,702,583 B1 | 4/2010 | Hamilton et al. ............... 705/40 |
| 7,702,585 B2 | 4/2010 | Lyda et al. ..................... 705/40 |
| 7,711,626 B2 | 5/2010 | Nanjundamoorthy et al. ............. |
| | | 705/36 |
| 7,711,690 B1 | 5/2010 | Garrison et al. .............. 707/102 |
| 7,725,389 B1 | 5/2010 | D'Aquisto et al. ............ 705/39 |
| 7,729,283 B2 | 6/2010 | Ferguson et al. ............ 370/254 |
| 7,729,969 B1 | 6/2010 | Smith, III et al. .............. 705/36 |
| 7,729,996 B2 | 6/2010 | Zito ................................ 705/76 |
| 7,734,541 B2 | 6/2010 | Kumar et al. ................. 705/39 |
| 7,752,130 B2 | 7/2010 | Byrd et al. ...................... 705/40 |
| 7,752,535 B2 | 7/2010 | Satyavolu ..................... 715/205 |
| 7,778,901 B2 | 8/2010 | Ganesan et al. ............... 705/35 |
| 7,788,172 B2 | 8/2010 | Kight et al. .................... 705/39 |
| 7,792,749 B2 | 9/2010 | Ganesan ........................ 705/40 |
| 7,886,156 B2 | 2/2011 | Franchi |
| 7,979,348 B2 | 7/2011 | Thomas et al. ................. 705/39 |
| 8,032,932 B2 | 10/2011 | Speyer et al. |
| 8,073,772 B2 | 12/2011 | Bishop et al. |
| 8,327,429 B2 | 12/2012 | Speyer et al. |
| 8,369,601 B2 | 2/2013 | Lugg |
| 8,423,453 B1 | 4/2013 | Elliott |
| 8,688,580 B1 | 4/2014 | Guenther et al. |
| 8,725,607 B2 | 5/2014 | Dunn et al. |
| 8,725,609 B2 | 5/2014 | Pawelczyk et al. |
| 9,135,620 B2 | 9/2015 | Chen et al. |
| 9,195,984 B1 | 11/2015 | Spector et al. |
| 9,264,902 B1 | 2/2016 | Ward et al. |
| 9,600,817 B2 | 3/2017 | Bondesen et al. |
| 9,693,234 B2 | 6/2017 | Cook |
| 9,741,037 B2 | 8/2017 | Garlick et al. |
| 9,799,011 B2 | 10/2017 | Dunn et al. |
| 10,262,306 B2 | 4/2019 | Pawelczyk et al. |
| 10,387,879 B2 | 8/2019 | Thomas et al. |
| 2001/0000537 A1 | 4/2001 | Inala et al. .................... 707/500 |
| 2001/0016034 A1 | 8/2001 | Singh et al. ................ 379/88.17 |
| 2001/0023414 A1 | 9/2001 | Kumar et al. .................. 705/35 |
| 2001/0024157 A1 | 9/2001 | Hansmann et al. ........ 340/10.41 |
| 2001/0032182 A1 | 10/2001 | Kumar et al. .................. 705/40 |
| 2001/0032183 A1 | 10/2001 | Landry ........................... 705/40 |
| 2001/0051907 A1 | 12/2001 | Kumar et al. .................. 705/36 |
| 2002/0002536 A1 | 1/2002 | Braco ............................ 705/40 |
| 2002/0007323 A1 | 1/2002 | Tamatsu |
| 2002/0010612 A1 | 1/2002 | Smith et al. ...................... 705/8 |

(56) References Cited

U.S. PATENT DOCUMENTS

| | | | |
|---|---|---|---|
| 2002/0010677 A1 | 1/2002 | Kitchen et al. | 705/40 |
| 2002/0015480 A1 | 2/2002 | Daswani et al. | 379/88.17 |
| 2002/0019808 A1 | 2/2002 | Sharma | 705/40 |
| 2002/0019809 A1 | 2/2002 | Kitchen et al. | 705/40 |
| 2002/0023108 A1 | 2/2002 | Daswani et al. | 707/507 |
| 2002/0046167 A1 | 4/2002 | Kitchen et al. | 705/40 |
| 2002/0046168 A1 | 4/2002 | Kitchen et al. | 705/40 |
| 2002/0049671 A1 | 4/2002 | Trende et al. | 705/40 |
| 2002/0049672 A1 | 4/2002 | Kitchen et al. | 705/40 |
| 2002/0052840 A1 | 5/2002 | Kitchen et al. | 705/40 |
| 2002/0059139 A1 | 5/2002 | Evans | 705/40 |
| 2002/0059369 A1 | 5/2002 | Kern et al. | 709/203 |
| 2002/0062282 A1 | 5/2002 | Kight et al. | 705/40 |
| 2002/0065773 A1 | 5/2002 | Kight et al. | 705/40 |
| 2002/0069161 A1 | 6/2002 | Eckert et al. | |
| 2002/0077952 A1 | 6/2002 | Eckert et al. | |
| 2002/0077961 A1 | 6/2002 | Eckert et al. | |
| 2002/0077978 A1 | 6/2002 | O'Leary et al. | 705/40 |
| 2002/0087454 A1 | 7/2002 | Calo et al. | |
| 2002/0087455 A1 | 7/2002 | Tsagarakis et al. | |
| 2002/0087461 A1 | 7/2002 | Ganesan et al. | 705/39 |
| 2002/0087465 A1 | 7/2002 | Ganesan et al. | 705/39 |
| 2002/0091635 A1 | 7/2002 | Dilip et al. | 705/39 |
| 2002/0111886 A1 | 8/2002 | Chenevich et al. | 705/30 |
| 2002/0128964 A1 | 9/2002 | Baker et al. | 705/39 |
| 2002/0128968 A1 | 9/2002 | Kitchen et al. | 705/40 |
| 2002/0143655 A1 | 10/2002 | Elston et al. | |
| 2002/0174048 A1 | 11/2002 | Dheer et al. | 705/36 |
| 2002/0184144 A1 | 12/2002 | Byrd et al. | 705/40 |
| 2002/0194137 A1 | 12/2002 | Park et al. | |
| 2003/0014489 A1 | 1/2003 | Inala et al. | 709/204 |
| 2003/0018571 A1 | 1/2003 | Eckert et al. | |
| 2003/0023552 A1 | 1/2003 | Kight et al. | 705/40 |
| 2003/0037002 A1* | 2/2003 | Higgins | G06Q 20/02 705/45 |
| 2003/0089768 A1 | 5/2003 | Page | 235/379 |
| 2003/0120774 A1 | 6/2003 | Satyavolu et al. | 709/224 |
| 2003/0126075 A1 | 7/2003 | Mascavage, III et al. | 705/39 |
| 2003/0158811 A1 | 8/2003 | Sanders et al. | 705/39 |
| 2003/0182206 A1 | 9/2003 | Hendrix et al. | |
| 2003/0187925 A1 | 10/2003 | Inala et al. | 709/204 |
| 2003/0191701 A1 | 10/2003 | Haseltine et al. | 705/34 |
| 2003/0191711 A1 | 10/2003 | Jamison et al. | 705/40 |
| 2003/0191832 A1 | 10/2003 | Satyavolu et al. | 709/223 |
| 2003/0195844 A1 | 10/2003 | Hogan | 705/40 |
| 2003/0208421 A1* | 11/2003 | Vicknair | G06Q 20/042 705/35 |
| 2003/0208441 A1 | 11/2003 | Poplawski et al. | 705/40 |
| 2003/0225705 A1* | 12/2003 | Park | G06Q 20/382 705/64 |
| 2003/0236728 A1 | 12/2003 | Sunderji et al. | 705/35 |
| 2004/0034594 A1 | 2/2004 | Thomas et al. | 705/39 |
| 2004/0039701 A1 | 2/2004 | Nakamura et al. | 705/42 |
| 2004/0059671 A1 | 3/2004 | Nozaki et al. | 705/39 |
| 2004/0059672 A1 | 3/2004 | Baig et al. | 705/40 |
| 2004/0059673 A1 | 3/2004 | Kitchen et al. | 705/40 |
| 2004/0064407 A1 | 4/2004 | Kight et al. | 705/40 |
| 2004/0064408 A1 | 4/2004 | Kight et al. | 705/40 |
| 2004/0064409 A1 | 4/2004 | Kight et al. | 705/40 |
| 2004/0064410 A1 | 4/2004 | Kight et al. | 705/40 |
| 2004/0071333 A1 | 4/2004 | Douglas et al. | |
| 2004/0078423 A1 | 4/2004 | Satyavolu et al. | 709/203 |
| 2004/0078464 A1 | 4/2004 | Rajan et al. | 709/224 |
| 2004/0083167 A1 | 4/2004 | Kight et al. | 705/40 |
| 2004/0083171 A1 | 4/2004 | Kight et al. | 705/40 |
| 2004/0088235 A1 | 5/2004 | Ziekle et al. | 705/34 |
| 2004/0093305 A1 | 5/2004 | Kight et al. | 705/40 |
| 2004/0133515 A1 | 7/2004 | McCoy et al. | 705/40 |
| 2004/0139005 A1 | 7/2004 | Ganesan | 705/39 |
| 2004/0139009 A1 | 7/2004 | Kozee et al. | 705/40 |
| 2004/0139010 A1 | 7/2004 | McMichael et al. | 705/40 |
| 2004/0139011 A1 | 7/2004 | Kozee et al. | 705/40 |
| 2004/0143552 A1 | 7/2004 | Weichert et al. | 705/64 |
| 2004/0148235 A1 | 7/2004 | Craig et al. | |
| 2004/0148252 A1 | 7/2004 | Fleishman | 705/39 |
| 2004/0215543 A1 | 10/2004 | Betz et al. | 705/35 |
| 2004/0225609 A1 | 11/2004 | Greene | 705/40 |
| 2004/0236653 A1 | 11/2004 | Sokolic et al. | 705/35 |
| 2004/0236681 A1 | 11/2004 | Modigliani et al. | 705/39 |
| 2005/0010483 A1 | 1/2005 | Ling | 705/26 |
| 2005/0010523 A1 | 1/2005 | Myklebust et al. | 705/40 |
| 2005/0086136 A1 | 4/2005 | Love et al. | |
| 2005/0086165 A1 | 4/2005 | Pawelczyk et al. | 705/40 |
| 2005/0119971 A1 | 6/2005 | Zito | 705/40 |
| 2005/0137960 A1* | 6/2005 | Brann | G06Q 40/04 705/37 |
| 2005/0137978 A1 | 6/2005 | Ganesan et al. | 705/40 |
| 2005/0149439 A1 | 7/2005 | Suisa | 705/44 |
| 2005/0154923 A1 | 7/2005 | Lok et al. | |
| 2005/0171899 A1 | 8/2005 | Dunn et al. | 705/39 |
| 2005/0171900 A1 | 8/2005 | Onneken | 705/39 |
| 2005/0177505 A1 | 8/2005 | Keeling et al. | 705/40 |
| 2005/0182720 A1 | 8/2005 | Willard et al. | |
| 2005/0187867 A1 | 8/2005 | Sokolic et al. | 705/39 |
| 2005/0192901 A1 | 9/2005 | McCoy et al. | 705/40 |
| 2005/0198377 A1 | 9/2005 | Ferguson et al. | 709/238 |
| 2005/0203835 A1 | 9/2005 | Nhaissi et al. | 705/39 |
| 2005/0203844 A1 | 9/2005 | Ferguson et al. | 705/40 |
| 2005/0210297 A1 | 9/2005 | Wu et al. | 713/202 |
| 2005/0222954 A1 | 10/2005 | Keown et al. | 705/40 |
| 2006/0047724 A1 | 3/2006 | Messing et al. | 707/204 |
| 2006/0106717 A1 | 5/2006 | Randle et al. | 705/45 |
| 2006/0136595 A1 | 6/2006 | Satyavolu | 709/229 |
| 2006/0184451 A1 | 8/2006 | Ganesan et al. | 705/40 |
| 2006/0195398 A1 | 8/2006 | Dheer et al. | 705/40 |
| 2006/0230343 A1 | 10/2006 | Armandpour et al. | 715/517 |
| 2006/0253340 A1 | 11/2006 | Levchin et al. | 705/26 |
| 2006/0253463 A1 | 11/2006 | Wu et al. | 707/10 |
| 2006/0282381 A1 | 12/2006 | Ritchie | |
| 2007/0011090 A1 | 1/2007 | Baker et al. | 705/39 |
| 2007/0067239 A1 | 3/2007 | Dheer et al. | 705/40 |
| 2007/0088821 A1 | 4/2007 | Sankuratripati et al. | 709/224 |
| 2007/0094151 A1 | 4/2007 | Moenickheim et al. | 705/64 |
| 2007/0100748 A1 | 5/2007 | Dheer et al. | 705/39 |
| 2007/0106612 A1 | 5/2007 | O'Brien et al. | 705/44 |
| 2007/0121840 A1 | 5/2007 | Ganesan et al. | 379/114.01 |
| 2007/0125840 A1 | 6/2007 | Law et al. | 235/379 |
| 2007/0130347 A1 | 6/2007 | Rangan et al. | 709/227 |
| 2007/0131758 A1 | 6/2007 | Mejias et al. | 235/379 |
| 2007/0162769 A1 | 7/2007 | Sokolic et al. | 713/194 |
| 2007/0179885 A1 | 8/2007 | Bird et al. | 705/39 |
| 2007/0180380 A1 | 8/2007 | Khavari et al. | 715/704 |
| 2007/0208645 A1 | 9/2007 | Hoffman et al. | 705/36 |
| 2007/0230371 A1 | 10/2007 | Tumminaro | 370/259 |
| 2007/0233615 A1 | 10/2007 | Tumminaro | 705/75 |
| 2007/0239601 A1 | 10/2007 | Ganesan et al. | 705/40 |
| 2007/0244811 A1 | 10/2007 | Tumminaro | 705/39 |
| 2007/0255620 A1 | 11/2007 | Tumminaro et al. | 705/14 |
| 2007/0255652 A1 | 11/2007 | Tumminaro et al. | 705/39 |
| 2007/0255653 A1 | 11/2007 | Tumminaro et al. | 705/39 |
| 2007/0255662 A1 | 11/2007 | Tumminaro | 705/79 |
| 2008/0015982 A1 | 1/2008 | Sokolic et al. | 705/39 |
| 2008/0032741 A1 | 2/2008 | Tumminaro | 455/558 |
| 2008/0033878 A1 | 2/2008 | Krikorian et al. | |
| 2008/0052226 A1 | 2/2008 | Agarwal et al. | 705/39 |
| 2008/0082454 A1 | 4/2008 | Dilip et al. | 705/76 |
| 2008/0086403 A1 | 4/2008 | Dilip et al. | 705/35 |
| 2008/0086426 A1 | 4/2008 | Dilip et al. | 705/75 |
| 2008/0091663 A1 | 4/2008 | Inala et al. | 707/3 |
| 2008/0097899 A1 | 4/2008 | Jackson et al. | 705/39 |
| 2008/0133407 A1 | 6/2008 | Guillory et al. | 705/40 |
| 2008/0263069 A1 | 10/2008 | Harris et al. | 707/100 |
| 2008/0275816 A1 | 11/2008 | Hazlehurst | 705/40 |
| 2008/0288376 A1 | 11/2008 | Panthaki et al. | 705/30 |
| 2008/0288400 A1 | 11/2008 | Panthaki et al. | 705/40 |
| 2008/0301022 A1 | 12/2008 | Patel et al. | 705/35 |
| 2008/0301023 A1 | 12/2008 | Patel et al. | 705/35 |
| 2008/0306846 A1 | 12/2008 | Ferguson | 705/34 |
| 2008/0319880 A1 | 12/2008 | D'Aquisto et al. | |
| 2009/0006205 A1 | 1/2009 | Bixler et al. | |
| 2009/0006582 A1 | 1/2009 | Dawsani et al. | 709/219 |
| 2009/0024505 A1 | 1/2009 | Patel et al. | 705/35 |
| 2009/0063197 A1 | 3/2009 | Lisle | |
| 2009/0076950 A1 | 3/2009 | Chang et al. | 705/39 |

(56) References Cited

U.S. PATENT DOCUMENTS

| | | | |
|---|---|---|---|
| 2009/0119190 A1 | 5/2009 | Realini | 705/30 |
| 2009/0125446 A1 | 5/2009 | Saunders et al. | |
| 2009/0132289 A1 | 5/2009 | Stenman et al. | |
| 2009/0138394 A1 | 5/2009 | Garrison et al. | 705/35 |
| 2009/0222369 A1 | 9/2009 | Zoldi et al. | |
| 2009/0265241 A1 | 10/2009 | Bishop et al. | |
| 2009/0265774 A1 | 10/2009 | Malik et al. | 726/7 |
| 2009/0271854 A1 | 10/2009 | Hazlehurst et al. | 726/7 |
| 2009/0287601 A1 | 11/2009 | Tumminaro et al. | 705/39 |
| 2009/0287613 A1 | 11/2009 | Pierdinock et al. | 705/36 |
| 2009/0319410 A1 | 12/2009 | Kight et al. | 705/34 |
| 2009/0319425 A1 | 12/2009 | Tumminaro et al. | 705/42 |
| 2010/0004990 A1 | 1/2010 | Hazlehurst et al. | 705/14.25 |
| 2010/0005025 A1 | 1/2010 | Kumar et al. | 705/40 |
| 2010/0017332 A1 | 1/2010 | Kight et al. | 705/64 |
| 2010/0030687 A1 | 2/2010 | Panthaki et al. | |
| 2010/0100462 A1 | 4/2010 | Lyda et al. | 705/30 |
| 2010/0100466 A1 | 4/2010 | Garrison et al. | 705/34 |
| 2010/0100467 A1 | 4/2010 | McCoy et al. | 705/34 |
| 2010/0138243 A1 | 6/2010 | Carroll | |
| 2010/0198645 A1 | 8/2010 | Heiss et al. | |
| 2011/0125613 A1 | 5/2011 | Franchi | |
| 2011/0202415 A1 | 8/2011 | Casares et al. | |
| 2011/0295746 A1 | 12/2011 | Thomas et al. | 705/42 |
| 2012/0284175 A1 | 11/2012 | Wilson et al. | |
| 2013/0262296 A1 | 10/2013 | Thomas et al. | |
| 2013/0268839 A1 | 10/2013 | Lefebvre et al. | |
| 2013/0293363 A1 | 11/2013 | Plymouth et al. | |
| 2014/0067677 A1 | 3/2014 | Ali et al. | |
| 2014/0089182 A1* | 3/2014 | Short | H04L 63/08 705/40 |
| 2014/0164246 A1 | 6/2014 | Thomas et al. | |
| 2014/0188728 A1 | 7/2014 | Dheer et al. | |
| 2014/0289106 A1 | 9/2014 | Pawelczyk et al. | |
| 2015/0046319 A1 | 2/2015 | Thomas et al. | |
| 2015/0161597 A1 | 6/2015 | Subramanian et al. | |
| 2015/0254665 A1 | 9/2015 | Bondesen et al. | |
| 2015/0324801 A1 | 11/2015 | Thomas et al. | |
| 2016/0019536 A1 | 1/2016 | Ortiz et al. | |
| 2016/0092872 A1 | 3/2016 | Prakash et al. | |
| 2016/0358163 A1 | 12/2016 | Kumar et al. | |
| 2016/0359829 A1 | 12/2016 | Gulledge | |
| 2017/0004501 A1 | 1/2017 | Ledford et al. | |
| 2017/0221066 A1 | 8/2017 | Ledford et al. | |
| 2017/0344960 A1 | 11/2017 | Garlick et al. | |
| 2017/0344964 A1 | 11/2017 | Garlick et al. | |
| 2017/0353420 A1 | 12/2017 | Garlick et al. | |
| 2017/0372319 A1 | 12/2017 | Garlick et al. | |
| 2018/0012199 A1 | 1/2018 | Dunn et al. | |
| 2018/0012201 A1 | 1/2018 | Dunn et al. | |
| 2018/0174140 A1 | 1/2018 | Garlick et al. | |
| 2019/0043052 A1 | 2/2019 | Ledford et al. | |
| 2019/0220833 A1 | 7/2019 | Pawelczyk et al. | |

FOREIGN PATENT DOCUMENTS

| | | |
|---|---|---|
| EP | 0 593 209 A2 | 4/1994 |
| EP | 0 661 654 A2 | 7/1995 |
| GB | 2 328 310 A | 2/1999 |
| GB | 2533379 A | 6/2016 |
| GB | 2533380 A | 6/2016 |
| GB | 2533432 A | 6/2016 |
| GB | 2533562 A | 6/2016 |
| GB | 2537087 A | 10/2016 |
| WO | WO 90/04837 | 5/1990 |
| WO | WO 91/06058 | 5/1991 |
| WO | 93/02424 A1 | 2/1993 |
| WO | WO 95/12859 | 5/1995 |
| WO | WO 97/07468 | 2/1997 |
| WO | WO 97/22060 | 6/1997 |
| WO | WO 1998/018095 | 4/1998 |
| WO | WO 98/47100 | 10/1998 |
| WO | WO 98/58356 | 12/1998 |
| WO | WO 99/56219 | 11/1999 |
| WO | WO 02/17196 A1 | 2/2002 |
| WO | 03/060749 A1 | 7/2003 |
| WO | WO 2007/053123 A2 | 5/2007 |
| WO | WO 2007/056274 A2 | 5/2007 |
| WO | WO 2008/027620 | 3/2008 |
| WO | WO 2008/027621 | 3/2008 |
| WO | 2008/060725 A2 | 5/2008 |
| WO | WO 2009/114876 | 9/2009 |
| WO | WO 2009/152184 | 12/2009 |
| WO | 2016/097672 A1 | 6/2016 |
| WO | 2016/097673 A1 | 6/2016 |
| WO | 2016/097674 A1 | 6/2016 |
| WO | 2016/097675 A1 | 6/2016 |

OTHER PUBLICATIONS

B. Scheschuk, "Pay It on the Net (electronic commerce payment solutions)," CMA Management, Hamilton, Jun. 2001, vol. 75, Issue 4, 4 pages.

P. Beckett, "Credit-card Firms Get Into Web Game," Asian Wall Street Journal, Apr. 3, 2001, p. N1.

A. Brooks, "Still Waiting for the E-Mail and Faxes to Start Coming in?," New York Times (East Coast Late Edition), New York, NY, Dec. 19, 1996, p. C7.

A. Roth, "Banks Fund B2B Payment System Effort," American Banker, Apr. 24, 2001, one page.

Kingson et al., "E-Processing by Banks: Idea Gains Ground," American Banker, Apr. 26, 2001, two pages.

E. Wing, "Cracking the Code," Washington Business Journal (Trends in Technology), vol. 20, No. 11, Jul. 20-26, 2001, two pages.

"The Remaining Barriers to ePayments and Straight-through Processing," Research Conducted Oct. 2001-Mar. 2002 by The Clearing House, pp. 1-22.

"New Universal Payment Identification Code Will Become Industry Standard for I-Enabled Payments," United Payment Identification Code, The Clearing House Press Release, Apr. 24, 2001, two pages.

"NYCH Project Shows Promise for Facilitating E-Payments," Pulse, Association for Financial Professionals, Mar. 2002, two pages.

E. Messmer,"Banks Turn to Web for Check Processing," Network World, Framingham, Jun. 19, 2000, vol. 17, Issue 25, pp. 53 and 54.

Check Adjustment Request Federal Reserve Bank, Form: FRBADJ (Sep. 1993), one page.

"Electronic Check Adjustments: Are You Using FedLine?," The Federal Reserve Bank of St. Louis, http://www.stlouisfed.com/publications/pq/1998/a/pq1998a5.html (downloaded Jun. 23, 2005), pp. 1-3.

Check Adjustment Quick Reference Guide, Federal Reserve System, Financial Services, Jul. 1996, 10 pages.

EP 03 72 8532 European Search Report dated Feb. 15, 2008, 3 pages.

"By-law No. 7 Respecting the Large Value Transfer System," Canada Gazette, Part I, vol. 132, No. 16 (Canadian Government Publishing, online: Archive 1998, Part I http://canadagazette.gc.ca/part1/1998/19980418/pdf/g1-13216.pdf, Apr. 18, 1998, 71 pages.

"Real-Time Gross Settlement Systems," http://www.bis.org/publ/cpss22/pdf, Bank for International Settlements; Basle, Mar. 1997, 66 pages.

Carey, T.W., "Quicken versus Money," *PC World*, vol. 14, No. 4, p. 162(6), Apr. 1996, 8 pages.

Cummings, S., "*Home Banking with Quicken*," New York: MIS Press, pp. 24-29, 34-37, and 52-59, 1996, 15 pages.

Lee et al., *NOVAHID: A Novel Architecture for Asynchronous Hierarchical, Distributed, Real-Time Payments Processing, IEEE Journal on selected areas in communications*, vol. 12, No. 6, 1994, pp. 1072-1087, 16 pages.

American National Standard for Financial Image Interchange: Architecture, Overview, and System Design Specification, American National Standards Institute, Inc., ANSI/ABA X9.46/1995 Version 0.13 (Draft), pp. 1-225.

American National Standard for Financial Image Interchange: Architecture, Overview, and System Design Specification, American National Standards Institute, Inc., ANSI/ABA X9.46/1997, pp. 1-231.

(56) References Cited

OTHER PUBLICATIONS

D. Minoli, *Imaging in Corporate Environments: Technology and Communication*, McGraw-Hill Osborne, Feb. 1, 1994, pp. 1-297.
*About FSTC*, Financial Services Technology Consortium, http://www.fstc.org/about/history.cfm, Downloaded Feb. 27, 2003, 2 pages.
*American National Standard for Financial Image Interchange: Architecture, Overview and System Design Specification*, American Bankers Association, American National Standards Institute, Inc., pp. 1-202 (1994).
Anderson, *Re: Electronic Check and Check Law*, Letter to Robert Ballen, 2 pages (Apr. 8, 1996).
*AT&T Global Offers One-Step Imaging (AT&T Global Information Solutions)*, American Banker, vol. 159, No. 39, p. 14A(1) (Feb. 28, 1994).
*AT&T Partners with Fiserv to Form Single Source Provider for Leading Image Item Processing Solutions*, PR Newswire, p. 913, col. 11 (1995).
*Image Can Be . . . Everything!*, At Your Service, A Newsletter from the Federal Reserve Bank of Kansas City, pp. 1-6 (1995).
*Baby Boomers, Generation X are Both Addicted to the ATM*, AT&T News Release, http://www.att.com/news/0295/950228.nca.html, Downloaded Nov. 15, 2002, 3 pages.
*Banctec Inc. Has Received Another Order for Its Image Statement Processing Product. (First National Bank of Chicago Orders ImageFirst)*, Financial Services Report, vol. 8, No. 22, p. 5(2) (Nov. 13, 1991).
Banet, *Document Image Processing, 1991: The Imaging Edge*, Seybold Report on Publishing Systems, vol. 20, No. 19, p. 22(8) (Jun. 24, 1991).
*Banks to Check Out Imaging (Solutions)*, Communicationsweek International, No. 093, p. 46 (Oct. 19, 1992).
Barthel, *NCR and Unisys Exchange Check Images in a Pivotal Test. (Computer Makers Test Compatibility of Check Imaging Systems)*, American Banker, vol. 158, No. 67, p. 3(1) (Apr. 8, 1993).
Barthel, *Unisys, Banctec Offer PC-based Imaging: High-tech Check Statements Produced; Community Banks are Market*, Banctec Systems Inc., American Banker, vol. 157, No. 195, p. 3(1) (Oct. 8, 1992).
Bartholomew, *More Checks on Checks—Bank of America Plans to Convert to an IBM Imaging System that Screens Checks Faster and More Thoroughly*, Informationweek, No. 504, p. 32 (Dec. 5, 1994).
*Bill Processing: US West Re-engineers with $7.2 Million Unisys Image-based Remittance Processing Solution*, EDGE, On& About AT&T, vol. 10, No. 378 (Oct. 23, 1995).
Blankenhorn, *Cincinnati Bell and Unisys Go Into Bank Imaging*, Cincinnati Bell Information Systems, Inc., Newsbytes, p. NEW10240020 (Oct. 24, 1990).
Block, *USAA Federal Gets Imaging System*, USAA Federal Savings Bank, Cincinatti Bell Information Systems Inc., Brief Article, American Banker, vol. 159, No. 49, p. 6A(1) (Mar. 14, 1994).
Booker, *Bank to Test Scalable NCR Imaging for Check Processing*, Computerworld, p. 66 (Dec. 14, 1992).
Brown, *Imaging May Dramatically Alter Bank Data Networks*, Network World, vol. 6, No. 19, p. 6(2) (May 15, 1989).
Buchok, *OCR Gets Processing Credit*, Computing Canada, vol. 19, No. 26, p. 30(1) (Dec. 20, 1993).
*Chase's New Image (Chase Manhattan Awards 12-yrs Image-processing Contract to Flserv; Contract Could Generate $40 mil/yr in Revenue for Flserv)*, Information Week, No. 517. p. 14 (Mar. 6, 1995).
*Current Check Flow*, PowerPoint Presentation, Check[1].ppt, pp. 1-4.
*FSTC Projects, Check Image Exchange Project (a.k.a Interbank Check Imaging Project)*, Financial Services Technology Consortium, http://www.fstc.org/projects/imaging/index.cfm, Downloaded Oct. 30, 2002, 6 pages.
*Check-Image Interchange Inches Closer (New York Clearing House, Chase Manhattan Bank and Federal Reserve Bank of Boston All Launch Check-image Interchange Program)*, Bank Technology News, vol. 10, No. 1, p. 19+ (Jan. 1997).

*Checks & Checking: Check Imaging at the Teller Station*, Bank Technology News, vol. 9, No. 10, p. 37 (Oct. 1996).
*Chemical Chooses IBM Check Imaging (Chemical Banking Corp to Install IBM's ImagePlus High Performance Transaction System to Process 9 Mil Checks Daily)*, Bank Technology News, vol. 8, No. 9, p. 11 (Sep. 1995).
*Cincinnati Bell: CBIS & Unisys in Major Imaging Agreement*, EDGE, on & About AT&T, vol. 5, No. 118, 1 page (Oct. 20, 1990).
*Cincinnati Bell Information Systems (Integrator Briefs)*, Computer Reseller News, No. 534, p. 129 (Jul. 12, 1993).
*Computerm Announces Remote Check Imaging Support for VMC 8200 High-speed Channel Extension System*, PR Newswire, p. 40LAM012 (Apr. 8, 1996).
*Computerm Eases Remote Imaging*, Introduces Remote Image Solution, Brief Article, American Banker, vol. 158, No. 156, p. 13A(1) (Aug. 16, 1993).
*Computerm Enables Boatmen's Bancshares to Execute Remote Check Imaging*, PR Newswire, p. 408LAM013 (Apr. 8, 1996).
Cooney, *\*Frame \*\*Relay \* Comes to Computerm Extenders*, Network World, p. 14 (Jun. 28, 1993).
Cortese, *Image Yields Interest at Banks*, Collaboration Results in Imaging System to Automate Check Processing, Computerworld, p. 6 (Mar. 19, 1990).
Costanzo, *As Banks Cling to the Conventional, Check-imaging Struts Its Stuff*, Bank Technology News, p. 1 (Mar. 1994).
Crockett, *Systematics to Use Deposited-check Imaging; Installation at Firm's N.J. Center Would be the First by an Outsourcer*, Systematics Financial Services Inc., Unisys Corp., American Banker, vol. 158, No. 95, p. 3(1) (May 19, 1993).
Crone, *Reducing Data Processing Costs with a Remote Item Processing System*, Bank Administration, vol. 62, No. 10, pp. 44-46 (Oct. 1986).
*Unisys Acquires VisualImpact Solution for Check Processing, Archive & Image Delivery*, Business Wire, p. 9181204 (Sep. 19, 1997).
*Unisys Provides Services to Bank of the West to Support Retail Banking*, Business Wire, p. 9180098 (Sep. 19, 1995).
Cantwell, *Data Compression Over Frame Relay Implementation Agreement FRF.9*, Frame Relay Forum Technical Committee, pp. 1-28 (Jan. 22, 1996).
*Defendants' Final Invalidity Construction Pursuant to Fourth Amended Docket Control Order and Patent Local Rules 3-3 and 3-6*, Datatreasury Corporation, Civil Action No. 5:03-CV-039 (DF), Served Dec. 13, 2005, pp. 1-21.
*Defendants Ingenico S.A. and Ingenico, Inc.'s Preliminary Invalidity Contentions*, DataTreasury Corporation, Civil Action No. 502CV095, dated Dec. 9, 2002, pp. 1-224.
*Defendants' Preliminary Invalidity Construction Pursuant to Patent Local Rules 3-3 and 3-4*, DataTreasury Corporation, Civil Action 502-CV-094-DF, Served Oct. 15, 2002, 94 pages.
Depompa, *IBM Adds Image-based Processing*, MIS Week, vol. 11, No. 12, p. 12(1) (Mar. 19, 1990).
*3174 Network Processor*, Specification Sheet, http://ecc400.com/ibm/controllers/314.prod.htm, Downloaded Oct. 7, 2002.
*Broadway & Seymour to Invest in Two Strategic Initiatives*, Business Wire, p. 03151248 (Mar. 15, 1995).
*eCheck:Homepage*, http://www.echeck.orb, Downloaded Feb. 27, 2003.
*Electronic Imaging '88*, International Electronic Imaging Exposition & Conference (Advance Printing of Paper Summaries), Anaheim, California, Mar. 28-31, 1988, 26 pages.
*Electronic Imaging '88*, International Electronic Imaging Exposition & Conference (Advance Printing of Paper Summaries), Boston, Massachusetts, Oct. 3-6, 1988, 11 pages.
*IdeaCopTM OpenOpposition Prior Art Report for U.S. Pat. No. 5,910,988 by PatenTrakkerTM*, Email regarding USPTO Reexam C.N. 90/007,829, Requested Date: Nov. 25, 2005, from "PT" >admin@patentrakker.com>, pp. 1-13 (May 10, 2006).
*Encryption and Digital Signature Explained*, Northern Telecom Inc., 4 pages (no date available).
*Computerm Earns MCI "Level 1" Approval; Computerm's Industry Exclusive Native \*Frame \*\*Relay\* Interface Passes Test for Interoperability with MCI's \*Frame \*\*Relay\* Services*, Business Wire, p. 4121139 (Apr. 1995).

(56) References Cited

OTHER PUBLICATIONS

Evans, *The End of Paper Wait: Document Imaging* (includes related articles on successful document imaging implementations at Borgess Medical Center, the Huntington Internal Medicine Group, the University of Alabama Health Services Foundation and Quest Diagnostics)(Industry Trend or Event), Health Management Technology, vol. 18, No. 2, p. 15(5) (Feb. 1997).
Fassett, *Impact of Imaging*, Bank Management, vol. 67, No. 11, p. 56 (Nov. 1991).
*Request for Proposal for Check Image Processing and Archival and Retrieval Systems for the Federal Reserve*, Federal Reserve Bank of Boston, Version 1.0, Apr. 21, 1994.
*NCR Demonstrates Systems for Insurance and Accounting Industry*, AT&T News Release, http://www.att.com/news/0592/920531.nca.html, Downloaded Nov. 15, 2002, 3 pages.
*NCR Demonstrates Full Line of Retail Products at NFR Conference*, AT&T News Release, http://www.att.com/news/0193/930118.ncd.html, Downloaded Nov. 15, 2002, 3 pages.
*Introducing the Age of Document-Image Processing*, FileNetTM Brochure, FileNet Corporation, 14 pages (1984).
*Financial EDI Over the Internet*, A Pilot Conducted by BankAmerica and Lawrence Livemore National Laboratory, http://www.bofa.com/batoday/edi_briefing.html, Downloaded Mar. 2, 1996, 7pages.
*Financial Services Technology Consortium—Interbank Check Imaging Project—White Paper (Draft)*, FSTC, pp. 1-30 (Jun. 20, 1994).
Fisher, *IBM, Customers Continue Work on Document Image Processor*, Datamation, vol. 34, No. 19, p. 23(2) (Oct. 1, 1988).
Fitch, *Digital Image Systems Speed Return Items, Exceptions*, Corporate Cashflow, pp. 8 & 10 (May 1996).
Fitch, *Check Image Capture Speeds Up Positive Pay Reconcilement*, Corporate Cashflow, pp. 7 & 11 (Feb. 1995).
*Nixdorf Computer Introduces DCPA Image—A Sophisticated Document Image Processing System with Unqiue Capabilities*, PR Newswire, 3 pages (Aug. 15, 1989).
*FSTC Check Image Interchange Project—Archive Storage and Retrieval Component Decomposition*, FSTC, pp. 1-20 (May 25, 1995).
Brown, *FSTC Image Interchange Project Pilot Phase-1A—Preliminary Architecture and Project Plan—Bank of Boston Huntington Bank*, IBM Corporation, pp. 1-34 (Jun. 30, 1995).
Wong et al., *FSTC Check Image Quality Subproject Status and Project Plan Update*, 6 pages (May 22, 1996).
Brown, *ANSI X9.46 Data Structure Reference*, IBM Corporation, pp. 1-16 (Jul. 31, 1995).
*FSTC Demonstrates Interbank Check Image Pilot; Multi-vendor System Speeds Check Clearing, Cuts Fraud*, FSTC Projects—Check Image Exchange Project, Press Release, http://www.fstc.org/proiects/imaging/public/information.cfm, Downloaded Oct. 30, 2002, 2 pages.
Hanna, *FSTC Image Exchange*, POS Image Capture Pilot—Reader-Scanner Study, RDM Corp, 1 page (May 21, 1996).
*Image Quality Functional Requirements*, FSTC, Chase Manhattan Bank, pp. 1-19 (Jul. 26, 1995).
*FSTC Interbank Check Imaging Unisys Monthly Status Report*, pp. 1-7 (Jun. 26, 1996).
*FSTC Interbank Check Imaging Unisys Monthly Status Report*, pp. 1-9 (Jul. 22, 1996).
Stanley, *Pilot Overview*, FSTC, 8 pages (Apr. 3, 1995).
*Check Image Exchange Project—Project Participants*, FSTC Projects, FSTC, http://www.fstc.org/projects/imaging/participants.cfm, Downloaded Oct. 30, 2002, 1 page.
*The Bank Internet Payment System (BIPS): Leading the Way to Electronic Commerce*, FSTC Projects, FSTC, http://www.fstc.org/projects/bips/index.cfm, Downloaded Feb. 27, 2003, 3 page.
Garvey, *Check Processing Goes Digital—Chase Manhattan Bank to Store Checks Electronically, Saving Time and Money*, Informationweek, No. 648, p. 20 (Sep. 15, 1997).

Gawen, *PC Based Document Image Processing and Signature Verification*, OIS IMC91 Document Imaging, Proceedings of the Information & Image Management Conference, London, pp. 389-391 (Jul. 1991).
*Global Concepts—Payment Systems Consulting*, Global Concepts, Inc., http://www.globalconcepts.com/image_archive.htm, Downloaded Nov. 20, 2002, 1 page.
*National City, NCR Form Strategic Imaging Partnership*, AT&T News Release, http://www.att.com/news/1192/921109.nca.html, Downloaded Nov. 15, 2002, 3 pages.
Gullo, *NCR, Unisys Plan Check Imaging for IBM Systems*, American Banker, vol. 156, No. 249, p. 1(2) (Dec. 30, 1991).
*Unisys Integrates Retail/Wholesale Lockbox Solution for Remittance Processors*, Business Wire, p. 03251075 (Mar. 25, 1997).
*Unisys Solution will Support Check Processing at Vermont Federal*, Business Wire, p. 5201185 (May 20, 1996).
Helm, *Banks Check Into Image Processing*, Computers in Banking, vol. 7, No. 3, p. 25(7) (Mar. 1990).
Helm, *Who's Doing What in Image Processing* (includes definition of image processing), ABA Banking Journal, vol. 83, No. 1, p. 31(3) (Jan. 1991).
*MICR Technology Helps Eliminate POS Check Fraud*, Chain Store Age Executive, p. 79 (Sep. 1991).
Horine, *AT&T and Fiserv Team to Offer Imaging Solutions*, AT&T News Release, http://www.att.com/news/0995/950913.nca.html, Downloaded Nov. 15, 2002, 2 pages.
*Huntington Bancshares in the Forefront of Technology with Purchase of Unisys Check Imaging System*, PR Newswire, p. 1 (Oct. 11, 1989).
*IBM 3898 Image Processor*, Product Announcement, IBM, 3 pages (Mar. 19, 1990).
*IBM Proposal for FRB Phase Four: Image Archive System*, IBM Financial Document Processing, IBM, Nov. 7, 1991.
*Preface*, IBM Systems Journal, IBM, vol. 29, No. 3, pp. 302-303 (1990).
*IBM X9.49 Pilot Status—Summary*, 3 pages (no date available).
Schemers, III, *Ibnamed, A Load Balancing Name Server Written in Perl*, http://www.stanford.edu/~schemers/docs/Ibnamed/Ibnamed.html, Downloaded Oct. 15, 2002, 5 pages.
Schemers, III, *Ibnamed, A Load Balancing Name Server Written in Perl*, http://www.stanford.edu/~schemers/docs/Ibnamed/Ibnamed.html, Downloaded Nov. 27, 2002, 5 pages.
*ICI Project Security Work Session*—May 10, 1996, Agenda, 3 pages.
*Image Archive Forum—Payments Systems Task Force—Introduction and Flow Diagrams and Narratives*, Flow Nos. 1-13, 50 pages (no date available).
*Methodology and Value*, Image Archive Forum, 20 pages (Sep. 19, 1997).
*Image Archive Forum—Payments Systems Task Force—Economic Framework*, 33 pages (Jan. 27, 1998).
*Image Processing Survival Guide, vol. II—Sure-Fire Strategies for Implementing Image-Remittance*, Phillips Business Information, Inc., 48 pages (1996).
*Image Systems Garner NOAC Spotlight* (American Bankers' Association's National Operations and Automation Conference), Computers in Banking, vol. 6, No. 7, p. 8(4) (Jul. 1989).
*Imaging Products*, United States Banker, vol. 100, No. 8, p. 23(3) (Aug. 1990).
*Imaging Vendors Shape Processing*, Banking Management, vol. 69, No. 4, p. 29 (Apr. 1993).
*250 U.S. Banks to Use NCR, Cincinnati Bell Financial Systems*, AT&T News Release, http://www.att.com/news/0593/930504.ncd.html, Downloaded Nov. 15, 2002, 2 pages.
*Industry Security Leader Racal Supports Visa/Mastercard Proposal for Internet*, PR Newswire, 2 pages (Apr. 17, 1996).
*Item Processing Leaps Ahead with VisualImpact and Windows NT* (Sponsored Supplement: Unlock Your Back Office with Microsoft BackOffice), US Banker, vol. 105, No. 6, p. S4(3) (Jun. 1995).
Janusky, *FSTC Interbank Check Imaging*, 6 pages (Apr. 29, 1996).
Janusky, *FSTC Interbank Check Imaging*, 7 pages (May 22, 1996).
*Joint Marketing & Referral Agreement Between ACS Image Solutions, Inc. and JPMorgan Chase Bank*, 27 pages (no date available).

(56) References Cited

OTHER PUBLICATIONS

*Broadway & Seymore Announces Client/Server Product for Item and Image Processing*, Business Wire, p. 03201186 (Mar. 20, 1995).
*Broadway & Seymore Announces New VisualImpact Release*, Business Wire, p. 3291274 (Mar. 29, 1996).
*Terminal Data to Supply NCR with Document Microfilmers*, AT&T News Release, http://www.att.com/news/1093/931013.nca.html, Downloaded Nov. 15, 2002, 2 pages.
*Signet Bank Processes Over 2,500 Documents/Hour in Unisys Check Imaging Tests*, PR Newswire, p. 0409P8428 (Apr. 9, 1991).
Kniskern, *Engineering a Visionary Solution*, Datamation, vol. 36, No. 8, p. 90(2) (Apr. 15, 1990).
Kutler, *AT&T, IBM and Unisys Join Bank Resrearch Group* (Financial Services Technology Consortium), American Banker, vol. 159, No. 124, p. 14(1) (Jun. 29, 1994).
*Unisys Enters Image Processing Market with Two New Products and Major Financial and Industrial Customers* (product announcement), PR Newswire, p. 1011PH009 (Oct. 11, 1989).
Mantel, *Notes Gets in the Picture*, Datamation, pp. 87 & 88 (Jul. 15, 1992).
Marjanovic, *Payment Groups Square Off Over Electronic Check Plan*, American Banker, 1 page (May 8, 1996).
Marjanovic, *Mich. National Streamlines Imaging with IBM System* (check imaging), American Banker, vol. 160, No. 176, p. 14(1) (Sep. 13, 1995).
Marjanovic, *Home Loan Bank to Offer Check-image Statements to Members' Customers* (Federal Home Loan Bank of Pittsburgh)(Brief Article), American Banker, vol. 159, No. 248, p. 14(1) (Dec. 29, 1994).
*NCR and NYCH to Develop Image-based Check Notification System*, AT&T News Release, http://www.att.com/news/0892/920824.ncb.html, Downloaded Nov. 15, 2002, 2 pages.
*NCR Deposit Processing Technology Speeds Banking Operations*, AT&T News Release, http://www.att.com/news/1292/921207.ncc.html, Downloaded Nov. 15, 2002, 3 pages.
*Wachovia Tests NCR's New Imaging Item Processing System*, AT&T News Release, http://www.att.com/news/1091/911015.nca.html, Downloaded Nov. 15, 2002, 2 pages.
*NCR Signs DSI Alliance for Imaging Statement Processing*, AT&T News Release, http://www.att.com/news/0792/920720.nca.html, Downloaded Nov. 15, 2002, 2 pages.
*NCR, CKI to Market Image-based Credit Card Chargeback System*, AT&T News Release, http://www.att.com/news/0193/930106.ncb.html, Downloaded Nov. 15, 2002, 3 pages.
*Frost National Bank Selects NCR Over Old Mainframe Environment*, AT&T News Release, http://www.att.com/news/0493/930428.nca.html, Downloaded Nov. 15, 2002, 2 pages.
McGinn, *IBM ImagePlus High Performance Transaction System* (IBM Harness Image Processing to Make its 389x/XP Cheque Processors More Efficient)(Product Announcement), Computergram International, No. 1389, p. CG103210008 (Mar. 21, 1990).
*News Release, Retail Banking Solution Enhanced*, AT&T News Release, http://www.att.com/news/0590/900521.nca.html, Downloaded Nov. 15, 2002, 2 pages.
Messmer, *Hurdles Stand in Way of Electronic Checking*, Network World, p. 33 (Sep. 4, 1995).
*Microsoft Introduces SNA Server Version 3.0, Begins Beta Testing*, Microsoft PressPass—Information for Journalists, http://www.microsoft.com/presspass/press/1996/jun96/sna30pr.mspx, Downloaded Aug. 29, 2006, 4 pages.
Moore, *IBM, Unisys Test Check Systems for Fed Reserve*, Federal Computer Week, vol. 6, No. 21, p. 6(2) (Jul. 27, 1992).
Moreau, *Payment by Authenticated Facsimile Transmission—A Check Replacement Technology for Small and Medium Enterprise—Payment Processing Overview*, Connotech, http://connotech.com/PAYPROC.HTM, Downloaded Nov. 25, 2006, 23 pages.
Murphy, *POD Check Imaging Faces New Challenges* (In 1995 vs 1996, banks raised investment in check imaging by 9% from $198 mil and $215 mil; new low cost POD technology keeps it down), Bank Technology News, vol. 10, No. 3, p. 23 (Mar. 1997).

*Imaging Technology: Generating New Bank Revenues in the Age of the Consumer*, NCR Reports—Financial Services Trends & Technologies, NCR Corporation, Issue 1, 4 pages (Jan. 1997).
*Implementing Imaging Payment Systems: Managing Change to Achieve Results*, NCR Reports—Financial Services Trends & Technologies, NCR Corporation, Issue 2, 3 pages (Feb. 1997).
*Integrated, Customer-focused Banking Architecture: Tomorrow's Competitive Edge*, NCR Reports—Financial Services Trends & Technologies, NCR Corporation, Issue 3, 6 pages (Mar. 1997).
NCR Reports—Financial Services Trends & Technologies, NCR Corporation, Issue 4, 6 pages (1997).
*Information Technology Outsourcing: Sharpening Management Focus in Financial Institutions*, NCR Reports—Financial Services Trends & Technologies, NCR Corporation, Issue 5, 6 pages (1997).
*What is a Financial Transaction Switch?*, NCR Reports—Financial Services Trends & Technologies, NCR Corporation, vol. 1, Iss. 6, 6 pages (1997).
*Implementing National Electronic Payment System in Emerging Economies*, NCR Reports—Financial Services Trends & Technologies, NCR Corporation, vol. 1, Iss. 7, 12 pages (1997).
*Check Image Processing Delivers Truncation Benefits Today*, NCR Reports—Financial Services Trends & Technologies, NCR Corporation, vol. 1, Iss. 8, 13 pages (1997).
*7780—The Robust, Reliable Solution . . . for Processing Varying Volumes in Any Environment*, NCR Corporation, 8 pages (1998).
*7780 Mid-Range Item Processing—Technical Specifications*, NCR Corporation, http://www.ncr.com/products/hardware/hw_7780_ts_product.htm, Downloaded Nov. 15, 2002, 1 page.
*7780 Mid-Range Item Processing—Product Overview*, NCR Corporation, http://www.ncr.com/products/hardware/hw_7780_ts_product.htm, Downloaded Nov. 15, 2002, 4 pages.
*NCR Offers New Image-Based Document Management System*, AT&T News Release, http://www.att.com/news/0692/920623.ncb.html, Downloaded Nov. 15, 2002, 3 pages.
*NCR Unveils Client-Server Check Imaging* (NCR introduced NCR scalable image item processing solution, a client-server based system for image-based check processing), Bank Technology News, vol. 9, No. 3, p. 23 (Mar. 1996).
Nixon, *Is Check Imaging for You?* (automation in banking)(includes related articles), Savings & Community Banker, vol. 2, No. 10, p. 28(6) (Oct. 1993).
*Interbank Check Image Project*, FSTC, PowerPoint Presentation, No. 1016V4[1].ppt, 18 pages (no date available).
Behnke, *NSSDC's Mass Storage System Evolves*, NSSDC, http://nssdc.gsfc.gov/nssdc_news/march95/09_j_behnke_0395.html, Downloaded Oct. 15, 2002, 2 pages.
O'Heney, *Prepare for the Image Revolution* (Bankers and Vendors)(image processing; includes related article listing image processing products)(buyers guide), Computers in Banking, vol. 6, No. 10, p. 24(6) (Oct. 1989).
*On the Image Technology Front* (Unisys Corp is in an accord to Remarket Broadway & Seymore Inc's VisualImpact software, a midrange check-imaging system), American Banker, vol. CLXI, No. 68, p. 26 (Apr. 10, 1996).
*PACES—Paperless Automated Check Exchange & Settlement—Business Requirements*, FSTC, PACESBusReq3[1].doc, 7 pages (Apr. 3, 1998).
Roldan, *Project Overview—PACES Planning Meeting—New York City*, FSTC, PacesOverview40[1].ppt, 28 pages (Dec. 19, 1997).
*PACES—Paperless Automated Check Exchange & Settlement—Project Proposal*, FSTC, PACESPRO[1].doc, 25 pages (1997).
*PACES—Paperless Automated Check Exchange & Settlement—Requirements Document*, FSTC, PACESRequirements[1].doc, 25 pages (Apr. 3, 1998).
*Preliminary Invalidity Contentions of Defendants J.P. Morgan Chase & Co. and JPMorgan Chase Bank*, DataTreasury Corporation, 59 pages (Served Dec. 3, 2002).
*Cisco Partners with AT&T CMS on Network Switch Manufacturing*, Lucent Technologies, http://www.lucent.com/press/0995/950926.mma.html, Downloaded Oct. 4, 2002, 2 pages.
*NCR Document Management System Includes Kodak, Ricoh Products*, AT&T News Release, http://www.att.com/news/0493/930406.ncc.html, 3 pages (Apr. 6, 1993).

(56) References Cited

OTHER PUBLICATIONS

*NCR Introduces Scalable Image Item Processing Solution*, AT&T News Release, http://www.att.com/news/0196/960119.nca.html, 3 pages (Jan. 19, 1996).
*Regions Bank Selects ImageSoft to Provide Imaging Solution*, Business Wire, p. 9161220 (Sep. 16, 1997).
Rivest et al., *A Method for Obtaining Digital Signatures and Public-Key Cryptosystems*, pp. 1-15 (Sep. 1, 1997).
*Universal Card Purchases BancTec ImageFIRST System*, AT&T News Release, http://www.att.com/news/1292/921222.uca.html, Downloaded Nov. 15, 2002, 2 pages.
Roldan, Jr., *Title: Image Quality White Paper*, FSTC PACES Project Document, Chase Manhattan Bank, pp. 1-18 (Feb. 18, 1999).
*Paperless Automated Check Exchange and Settlement (PACES)*, FSTC Projects, http://www.fstc.org/projects/paces/projstatus.cfm, Downloaded Oct. 30, 2002, 2 pages.
Schwartz, *Banks to Test Imaging for Clearing Checks*, CommunicationsWeek, p. 35 (Sep. 14, 1992).
*Softchec Licenses 'Envision' Image Solution to West Suburban Bank*, PR Newswire, p. 116SETU002 (Jan. 16, 1996).
Bartimo et al., *Fine Tuning the Terminal Picture*, ComputerWorld, Special Report, vol. XVII, No. 35, 48 pages (Aug. 29, 1983).
Spencer, *Scanning Goes Vertical: A Big Future for Specialized Check Scanning; Check Scanning Technology*, Advanced Imaging, pp. 42-44 (Oct. 1997).
*New ATM from AT&T GIS Features Automated Document Processing*, AT&T News Release, http://www.att.com/news/1194/941129.ucb.html, Downloaded Nov. 15, 2002, 4 pages.
*NCR and Cincinnati Bell Offer Image Processing Service*, AT&T News Release, http://www.att.com/news/0194/940111.nca.html, Downloaded Nov. 15, 2002, 2 pages.
*Norwest Bank Selects NCR Image-based Processing Systems*, AT&T News Release, http://www.att.com/news/0893/930802.nca.html, Downloaded Nov. 15, 2002, 3 pages.
*New Mexico Uses NCR Imaging Systems for Tax, Revenue Processing*, AT&T News Release, http://www.att.com/news/0793/930712.ncc.html, Downloaded Nov. 15, 2002, 2 pages.
*CashFlex Selects NCR Item Processing Systems for Lockbox*, AT&T News Release, http://www.att.com/news/0793/930712.ncd.html, Downloaded Nov. 15, 2002, 2 pages.
*NCR and Arkansas System Announce Strategic Alliance*, AT&T News Release, http://www.att.com/news/0793/930712.ncb.html, Downloaded Nov. 15, 2002, 2 pages.
*NCR and Signet Banking to Provide Item Processing Services*, AT&T News Release, http://www.att.com/news/0793/930713.ncb.html, Downloaded Nov. 15, 2002, 2 pages.
*SurePOS ACE Electronic Payment Support PRPQ for 4690 OS—User's Guide*, IBM Corporation, Version1, Release 5, 250 pages (Mar. 2002).
*The Check Information Age*, Vision Executive Summary Image Archive Forum, Payment System Task Force, 10 pages (Jan. 27, 1998).
*The Wachovia Story*, RDM Corporation, 1 page (Oct. 1993).
Tracey, *IBM Unveils First Stage of Image-check System* (product announcement), Computers in Banking, vol. 7, No. 4, p. 13(3) (Apr. 1990).
Tucker, *Broadway Rolls Out Check Imaging System for Community Banks* (Broadway & Seymour Inc.), American Banker, vol. 160, No. 61, p. 14(1) (Mar. 30, 1995).
*Understanding EDI*, 2 pages (Mar. 2, 1996).
*Unisys Enhances Check Imager* (Unisys Corp Makes Effort to Appeal to Wider Range of Financial Institutions), American Baker, vol. CLIX, No. 205, p. 15A (Oct. 24, 1994).
*New York Clearing House—A Proposal for an Image-based Return Item Processing System*, Unisys, Document No. PDC 1010-16, pp. 1-1 to 7-11 (Jun. 1991).
*Unisys Wins Contract to Supply Imaging Solution to Chase Manhattan/FISERV Check Processing Alliance*, Business Wire, p. 6121175 (Jun. 12, 1995).

*Unix-based Imge Statement Software* (Cincinnati Bell Information Systems Inc. introduces ImageBanc II computer software)(Brief Article), ABA Banking Journal, vol. 85, No. 2, p. 80(1) (Feb. 1993).
*Verifone Software Links PCs to the Point of Sale* (Brief Article), American Banker, vol. 158, No. 156, p. 13A(1) (Aug. 16, 1993).
Wagner, *Banc One Checks Out Web*, Computerworld, vol. 30, No. 35, p. 69 (Aug. 26, 1996).
*Western Bank Purchases NCR's Document Managing System*, AT&T News Release, http://www.att.com/news/0893/930831.nca.html, Downloaded Nov. 15, 2002, 3 pages.
*Technical Volume—Check Image Processing Archive and Retrieval System—Proposal*, BancTec, Inc., 469 pages (Jul. 8, 1994).
*Plaintiff's Original Complaint for Patent Infringement and Jury Demand, Data Treasury Corp. vs. Bank One Corp.*, Cause No. 3-03CV-0059-K, In The United States District Court for the Northern District of Texas Dallas Division, Filed Jan. 9, 2003, 4 pages.
*Plaintiff's Original Complaint for Patent Infringement, Data Treasury Corporation vs. First Data Corporation, First Data Merchant Services Corporation, and Telecheck Services, Inc. d/b/a Telecheck International, Inc.*, Cause No. 502CV094, In The United States District Court for the Eastern District of Texas Texarkana Division, Filed May 2, 2002, 4 pages.
*Plaintiff's Original Complaint for Patent Infringement and Jury Demand, Data Treasury Corp. vs. RDM Corp. a.k.a. Research Development and Manufacturing Corp.*, Cause No. 3-02CV2641-M, In The United States District Court for the Northern District of Texas Dallas Division, Filed Dec. 11, 2002, 4 pages.
*Plaintiff's Original Complaint for Patent Infringement, Data Treasury Corporation vs. Ingenico S.A., d/b/a Groupe Ingenico, and Ingenico, Inc.*, Cause No. 502CV095, In The United States District Court for the Eastern District of Texas Texarkana Division, Filed May 2, 2002, 4 pages.
*Plaintiff's Original Complaint for Patent Infringement, Data Treasury Corporation vs. J.P. Morgan Chase & Co., J.P. Morgan Chase Bank, and Affiliated Computer Services, Inc.*, Cause No. 502CV124, In The United States District Court for the Eastern District of Texas Texarkana Division, Filed Jun. 5, 2002, 4 pages.
Vermeire, *Prosecution of Check Image Patent*, Letter to Peter Hanna, 1 page (Jul. 11, 1997).
Dowdell, *Security—Overlap of E-check and Image Intercgange*, Email to fstc-image, 2 pages (Apr. 27, 1996).
*High-Volume Data Capture Sans the Paper*, Bank Systems & Technology, p. 35 (May 1996).
Atzel, *Article Order*, Email to Marshall J. Hambro, 1 page (Oct. 9, 2001).
Kingman et al., *Operational Image Systems: A New Opportunity*, IBM Systems Journal, vol. 29, No. 3, pp. 304-312 (1990).
Helms, *Introduction to Image Technology*, IBM Systems Journal, vol. 29, No. 3, pp. 313-332 (1990).
Hakeda, *The Image Object Conten Architecture*, IBM Systems Journal, vol. 29, No. 3, pp. 333-342 (1990).
Plesums et al., *Large-Scale Image Systems: USAA Case Study*, IBM Systems Journal, vol. 29, No. 3, pp. 343-355(1990).
Avers et al., *ImagePlus as a Model for Application Solution Development*, IBM Systems Journal, vol. 29, No. 3, pp. 356-370 (1990).
Morris et al., *Image System Communication*, IBM Systems Journal, vol. 29, No. 3, pp. 371-383 (1990).
Harding et al., *Object Storage Hierarchy Management*, IBM Systems Journal, vol. 29, No. 3, pp. 384-397 (1990).
Anderson et al., *ImagePlus Workstation Program*, IBM Systems Journal, vol. 29, No. 3, pp. 398-407 (1990).
Ryman, *Personal Systems Image Application Architecture: Lessons Learned from the ImagEdit Program*, IBM Systems Journal, vol. 29, No. 3, pp. 408-420 (1990).
Dinan et al, *ImagePlus High Performance Transaction System*, IBM Systems Journal, vol. 29, No. 3, pp. 421-434 (1990).
Casey et al., *Intelligent Forms Processing*, IBM Systems Journal, vol. 29, No. 3, pp. 435-450 (1990).
Addink et al., *AS/400 ImagePlus System View*, IBM Systems Journal, vol. 29, No. 3, pp. 451-466 (1990).
Perry et al., *Experience Gained in Implementing ImagePlus*, IBM Systems Journal, vol. 29, No. 3, pp. 467-490 (1990).

(56) References Cited

OTHER PUBLICATIONS

*Technical Volume—Check Image Processing Archive and Retrieval System—Total System Solution Overview*, BancTec, Inc., 128 pages (Jul. 8, 1994).
*Interbank Check Imaging*, FSTC General Meeting—Orlando, Florida, 5 pages (Apr. 17, 1997).
*Company Background and Product Guide*,MagTek, 42 pages (no date available).
*MagTek Unveils Excella, a Dual-side Scanner for Check 21 Applications*, 1 page (May 10, 2004).
Roldan, *PACES—Paces Models—FSTC Project*, Chase Manhattan Bank,19 pages (Jul. 17, 1997).
Fricke, *PACES—Next Steps*, Chase Manhattan Bank, 10 pages (Aug. 12, 1997).
Meyerson, *PACES Redeposit Processing*, pp. 1-60 (no date available).
*MagTek Adds Enhanced Reading to MICRImageTM—New Reading Capability Supports Check Conversion with Higher Reliability*, MagTek Press Release, 3 pages (Jan. 9, 2003).
*MagTek Upgrades Its MICRImageTM Check Reader/Scanner—V. 34 Modem Supports High-Speed Image Archiving for Check Conversion*, MagTek Press Release, 3 pages (Jun. 12, 2002).
*MagTek's MICRImage Transmits Check Images at Speed of Ethernet*, MagTek Press Release, 2 pages (Feb. 14, 2002).
*The New Era of Check Scanning Technology—Introducing Excella, Specifically Designed to Meet the Processing Requirements of Check21*, MagTek, Inc., MagTek D-6, 22 pages (2005).
*Electronic Payment Systems Support/Check Processing Control System: Program Reference and Operations Manual*, IBM Corporation, 6 pages (Jun. 1986).
*PCT International Search Report*, regarding International Application No. PCT/US00/33010, dated Jun. 12, 2000, DataTreasury Corporation et al., 4 pages.
*FSTC—Financial Services Technology Consortium*, PowerPoint Presentation Ansi6v4[1].ppt, pp. 1-27 (no date available).
*Bank Automation News*, Phillips Business Information, vol. 9, Issue 6, 1 page (Apr. 2, 1997).
*You Have Requested Data From 32 Answers—Continue? Y/(N): Y*, INSPEC, pp. 175-198 (2001).
*Declaration of Richard Jesmajian*, In re the Patent of Claudio R. Ballard, Data Treasury Corporation, 3 pages (2005).
*Element by Element Comparison of Claims 1-41 of the '988 Patent to the ANSI/ABA X9.46-1995 Document, Alone and in Combination with the Newly Cited and Previously Cited Prior Art*, Document LA1714395v.2, pp. 1-22 (no date available).
*Element by Element Comparison of Claims 42-45 of the '988 Patent to Minoli "Imaging in Corporate Environments,"* Document LA1714405v.1, pp. 1-4 (no date available).
*Element by Element Comparison of Claims 1-41 of the '988 Patent to Campbell, et al.* (U.S. Pat. No. 5,373, 550), Document LA1716834v. 5, pp. 1-25 (no date available).
*Element by Element Comparison of Claims 42-45 of the '988 Patent to Campbell, et al.* (U.S. Pat. No. 5,373, 550), Document LA1717430v. 1, pp. 1-4 (no date available).
*Element by Element Comparison of Claims 46-50 of the '988 Patent to Geer, et al.* (U.S. Pat. No. 5,930,788), Document LA1719647v.1, pp. 1-4 (no date available).
*Element by Element Comparison of Claims 46-50 of the '988 Patent to Campbell, et al.* (U.S. Pat. No. 5,373,550), Document LA1714416v. 1, pp. 1-3 (no date available).
*ImagePlusTM—Image Solutions—Capture your Imagination*, Brochure, IBM Corporation, 13 pages (1991).
*Citibank, New Castle Installation*, one page (no date available).
*JPMorgan Chase and DataTreasury Settle Patent Dispute*, Company Announcement, DataTreasury Corporation, http://www.finextra.com/fullpr.asp?pf=y&id=4989, downloaded Jul. 25, 2005, one page.
Padgett, T., *Melville, N.Y.-Based DataTreasury Fights J.P. Morgan Chase over Patent, Newsday*, Oct. 22, 2003, 4 pages.
*Check Technology Case Stays in Texas, IP Law Bulletin*, Oct. 13, 2005, 4 pages.

"3174 Configuration," http://www.commercecomputer.com/3174. html, downloaded Oct. 7, 2002, *Commerce Computer Corporation*, 3 pages.
Ten Dyke, R.P., "Books," *IBM Systems Journal*, vol. 29, No. 1, pp. 489-490, 1990, 2 pages.
"Check Clearing for the 21st Century Act: Frequently Asked Questions about Check 21," http://www.federalreserve.gov/paymentsystems/truncation/faqs.htm, downloaded Oct. 26, 2005, *The Federal Reserve Board*, 2 pages.
"Frequently Asked Questions on Drive Space Issues," Drive Space FAQ, date unknown, 1 page.
"Financial Services Technology Consortium—Interbank Check Imaging Project—White Paper (Draft)," FSTC, pp. 1-29, Jun. 20, 1994, 29 pages.
"IBM 3995 Optical Library Dataserver—Economical, high-capacity, removable optical storage," IBM Corporation, 1991, 4 pages.
"IBM's ImagePlus eases transformation of the Worker's Compensation Board," IBM Corporation, 1991, 2 pages.
"IBM ImagePlus Fact Sheet," IBM Corporation, 1991, 2 pages.
"IBM's ImagePlus key to improving Royal Trust's customer service,", IBM Corporation, 1991, 2 pages.
Cahill, T.P., "Image Processing Applications at the Chase Manhattan Bank," date unknown, 2 pages.
"Image Archive Forum—Payments System Task Force—Introduction," 1998, 52 pages.
"IBM's ImagePlus: Making USAA's 'Impossible Dream' a reality," IBM Corporation, 1991, 3 pages.
Graf, R.F., "Modern Dictionary of Electronics," 6th Edition, 1997, 5 pages.
Nugent, W.R., "Specifications for a Stack Droid: Robotics Required for Large Libraries of Digitized Images on Optical Disk," date unknown.
Kniskern, J.M., "Strategic Rethinking," date unknown, 6 pages.
"Technical Volume: Check Image Processing Archive and Retrieval System," BancTec's Proposal to the Federal Reserve Bank of Boston, Jul. 8, 1994, 469 pages.
Brown, R.J., "FSTC Check Image Interchange Project Pilot Phase-1A: Preliminary Architecture and Project Plan", dated: Jun. 30, 1995, 34 pages.
"ANSI/ABA X9.46—1995, Draft version 0.13, American National Standard for Financial Image Interchange: Architecture, Overview and System Design Specification," American Bankers Association, American National Standards Institute, Inc., 1995, 229 pages.
"ANSI/ABA X9.46—1997, American National Standard for Financial Image Interchange: Architecture, Overview and System Design Specification." American Banker Association, American National Standards Institute, Inc., 1996, 245 pages.
"Imaging in Corporate Environments: Technology and Communication," Daniel Minoli, McGraw Hill, 1994.
"820 Payment Order/Remittance Advice" Version: X12-4010, pp. 1-61, Sep. 2005.
"835 Health Care Claim Payment/Advice" Version: 1.0 Final, pp. 1-70, Jul. 20, 2011.
"A Primer on HIPAA and the ACH Network," Banking Industry HIPAA Task Force, pp. 1-34.
"ACI Proactive Risk Manager™ for Enterprise Risk—Product Flyer," ACI Universal Payments, www.aciworldwide.com, 4 pages, 2016.
Arnold B. et al., "Increasing eBilling in the Healthcare Industry Without Running Afoul of Privacy Laws," 2011 Payments, pp. 1-29, Apr. 3-6, 2011.
"Authentication in an Internet Banking Environment," Federal Financial Institutions Examination Council, http://www.ffiec.gov/pdf/authentication_guidance.pdf, pp. 1-14, published 2005.
"CAQH Committee on Operating Rules for Information Exchange (CORE), Phase III CORE EFT & ERA Operating Rule Set," pp. 1-138, Jun. 2012.
Department of Health and Human Services, Federal Register, vol. 77, No. 6, pp. 1556-1590, Jan. 10, 2012.
"Guardian Analytics FraudDESK," Guardian Analytics, www.guardiananalytics.com, 2 pages, 2016.

(56) References Cited

OTHER PUBLICATIONS

Gwendolyn Lohse et al., "Federal Operating Rules for Healthcare Administrative Simplification," 2011 Payments, NACHA—The Electronic Payments Association, pp. 1-32, Apr. 3-6, 2011.
"Healthcare in the Electronic Environment, Payment, Information and Communication Within the Revenue Cycle," Alacriti Clearwave, 2011 Payments, pp. 1-30, Apr. 3-6, 2011.
Henry Ijams et al., "Evaluating ePayables Opportunities to Improve A/P Efficiencies," pp. 1-28, Jun. 22, 2011.
Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-6, Nov. 15, 2010.
Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-5, Nov. 18, 2011.
J. Estep, "Ninth National Medical Banking Institute, The Growing Collaboration of eHealth and Medical Banking, Banks Engaging in Healthcare Reform," pp. 1-20, Feb. 21, 2011.
J. Steven Stone et al., "Healthcare Reform: What Does It Really Mean for Banks?," NACHA, pp. 1-37, 2011.
J.P. Morgan, "Addressing the Administrative Cost Trajectory in a New Environment," Post-Reform Opportunities for Healthcare Payments, pp. 1-14, Apr. 27, 2010.
Jim St. Clair et al., "Ninth National Medical Banking Institute, The Growing Collaboration of eHealth and Medical Banking, Banking Platforms: Creating Programs to Speed Innovation in Healthcare," pp. 1-28, Feb. 11, 2011.
Matt Brodis et al., "Best Practices for Migrating Healthcare Payments to ACH," pp. 1-39, Apr. 3-6, 2011.
Matthew Smith and Victoria Terekhova, "Electronic Payments in Healthcare: Overcoming the Challenges," pp. 1-25, Apr. 3-6, 2011.
"Ninth National Medical Banking Institute, The Growing Collaboration of eHealth and Medical Banking, HIMSS G7 Operating Rules in Healthcare," pp. 1-11, Feb. 15, 2011.
"Payment Trends in the Healthcare Industry," A Survey of Healthcare Providers, pp. 5-38, Fall 2010.
Priya Malhotra, "Clearing House Enumerates e-Payment Ills," American Banker, 4 pages (Aug. 13, 2002).
Richard D. Marks, "Ninth National Medical Banking Institute, The Growing Collaboration of eHealth and Medical Banking, Health Record Banking: Changing the Game for Healthcare Information Technology, An Analysis of Checking Accounts for Health Information," pp. 1-13, Feb. 10, 2011.
Robert Hunter, "Letter Re: CMS-0024-IFC, Adoption of Standards for Health Care EFTs and Remittance Advice," pp. 1-10, Mar. 12, 2012.
Russ Waterhouse, "Administrative Simplification under the Patient Protection and Affordable Care Act Standards and Operating Rules for Electronic Funds Transfer (EFT) and Remittance Advice (RA)," National Committee of Vital and Health Statistics (NCVHS) Subcommittee on Standards, pp. 1-11, Dec. 3, 2010.
Russ Waterhouse, "National Committee on Vital and Health Statistics (NCVHS) Subcommittee on Standards, Administrative Simplification Under the Patient Protection and Affordable Care Act, Standards and Operating Rules for Electronic Funds Transfer (EFT) and Remittances Advice (RA)," The Clearing House, pp. 1-5, Dec. 3, 2010.
Russ Waterhouse et al., "The Healthcare Payments Solution: What's in It for the Banking Industry," NACHA Payments 2011, pp. 1-17, Apr. 5, 2011.
"SAS® Fraud Management—Real-time scoring of all transactions for fast, accurate fraud detection," Product Brief, SAS, www.sas.com, 6 pages, 2015.
"Supplement to Authentication in an Internet Banking Environment," Federal Financial Institutions Examination Council, http://www.ffiec.gov/pdf/auth-its-final%206-22-11%20(ffiec%20formated).pdf, pp. 1-12, published 2011.
"Suspicious Activity Monitoring—Anti-Money Laundering Solutions," NICE-Actimize, www.niceactimize.com, 4 pages, Mar. 15, 2014.
The Clearing House, "Healthcare EFT Enrollment, Mar. 25, 2011 Stakeholder Meeting Minutes & Wrap-Up," NACHA—The Electronic Payments Association, pp. 1-22, Apr. 20, 2011.
The Clearing House, "Healthcare EFT Enrollment, Stakeholder Meeting Materials," NACHA—The Electronic Payments Association, pp. 1-43, Mar. 25, 2011.
The Clearing House, "Healthcare EFT Enrollment, Stakeholder Meeting: Pre-read Materials," NACHA—The Electronic Payments Association, pp. 1-21, Mar. 25, 2011.
The Clearing House, "Mayo Clinic Interview," Healthcare EFT Enrollment, NACHA—The Electronic Payments Association, Healthcare EFT Enrollment, pp. 1-6, Mar. 14, 2011.
U.S. Office Action for U.S. Appl. No. 15/488,848 dated Aug. 7, 2019.
U.S. Appl. No. 14/926,112, filed Oct. 29, 2015 entitled "Secure Payment Processing".
U.S. Appl. No. 15/970,058, filed May 3, 2018 entitled "Bill Pay Service With Federated Directory Model Support".

* cited by examiner

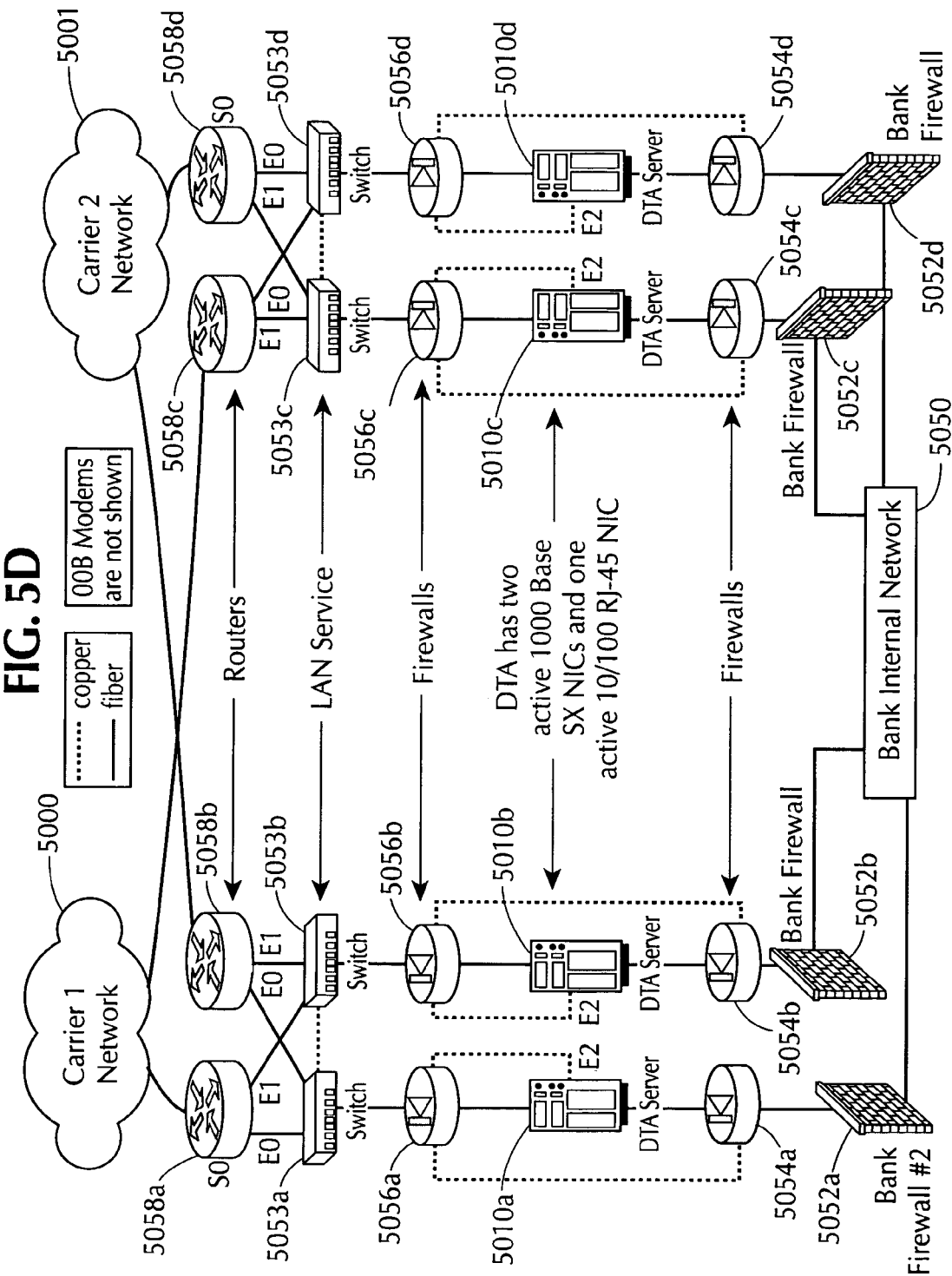

ELECTRONIC PAYMENT CLEARING AND CHECK IMAGE EXCHANGE SYSTEMS AND METHODS

CROSS-REFERENCE TO RELATED APPLICATIONS

This application is a divisional of U.S. patent application Ser. No. 14/229,326 filed on Mar. 28, 2014, now U.S. Pat. No. 9,799,011, issued Oct. 24, 2017, which is a divisional of U.S. patent application Ser. No. 10/768,821, filed on Jan. 30, 2004, now U.S. Pat. No. 8,725,607, issued May 13, 2014, the disclosures of each of which are hereby incorporated by reference in their entirety, as if fully set forth herein.

BACKGROUND OF THE INVENTION

Field of the Invention

The present invention relates generally to electronic payment and check presentment systems and methods, and more particularly, to centrally accountable peer-to-peer payment clearing, electronic check presentment and the exchange of digital check images. The present invention also generally relates to a distributed system architecture for implementing these systems and methods.

Related Art

Various programs are being implemented by financial institutions to transition the traditional paper check collection and return process into an electronic process. Such efforts are being undertaken to reduce the costs, time delays, and other problems associated with the processing of the over 40 billion paper checks collected per year in the United States.

In the conventional, paper-based check collection system, most paper checks are physically delivered by the writer of the particular check (i.e., the payor) to the person or entity to whom the check is made out (i.e., the payee). The check is deposited in the payee's financial institution, which is referred to as the bank of first deposit or the depositary bank. The check is physically delivered by the depositary bank to the bank on which the check is drawn (i.e., the paying bank) and ultimately back to the payor. Generally, checks delivered to a paying bank are accompanied by a cash letter, which lists all of the checks being delivered and information about each check, including the amount of the check. Delivering the paper check from the depositary bank to the paying bank can involve numerous check sorting processes and multiple intermediary collecting banks as the check moves through the collection process. If the check for some reason is not honored by the paying bank, e.g., because the payor has insufficient funds, then the check travels back to the depositary bank and the payee.

This check collection system, in which billions of paper checks are physically shuffled back and forth among various entities, entails significant costs and time delays. Moreover, due to banking regulations, the collection process must take place within strict schedules. For example, the paying bank has only one to one and a half days from the time a check is presented to decide whether to return the check arid recover its payment before the check is final. Also, the payee may lose interest for each day's delay in the collection process. Of course, the collection process is vulnerable to physical phenomenon, such as transportation delays caused by severe weather.

Electronic check presentment (ECP) is one type of electronic system that is being used to supplement the traditional paper check collection process. Currently, in ECP, the depositary bank or a collecting bank electronically reads from each paper check the account number, routing transit number (RTN), dollar amount and check number, which are printed on the check in a magnetic ink character recognition (MICR) line (this information is referred to as the "MICR information"), and possibly other information as well. This information is used to create a separate electronic record, referred to as an electronic check or cash letter, that is sent to the paying bank. The original paper checks are often sent at a later time.

For example, a depositary bank may electronically send an electronic cash letter for checks deposited on Monday, which will reach the paying bank by Monday evening. The paper checks usually arrive at the paying bank by the next day (Tuesday), in time for the returns process. After the paying bank receives the paper checks and reads the MICR data from them, it reconciles the paper checks with the electronic cash letter received earlier to determine missing or free items. The items to be returned, e.g., for lack of funds on deposit, are pulled and returned to the depositary bank. However, one disadvantage of this process is that it is not entirely paperless, that is, it still requires the movement of paper checks.

To reduce the movement of paper checks, check image exchange, also referred to as check truncation, has been generally proposed as an alternative. In check truncation, at some point in the check clearing process before the paper check reaches the check writer's bank, a digital image of the paper check is produced and sent in lieu thereof for further processing. The original paper check may then be stored and/or destroyed. However, check truncation has so far been limited in actual practice, for example, to imaging cancelled checks, and replacing conventional customer statements with on-line statements in which a check writer may view images of cancelled checks through the Internet, and if desired, selectively print them out. It would thus be desirable to have the checks truncated earlier in the clearing process, and specifically, to implement an ECP system with check truncation at the bank of first deposit, or at an intermediary bank, such as a clearing house or a Reserve Bank.

Another disadvantage relates to the architecture of the current ECP system. In particular, as shown in FIG. 1, one known and widely-used ECP system is based on a hub and spoke configuration. In this configuration, all electronic cash letters 100 are transmitted by the "spoke" depositary or collecting banks 102 (e.g., Bank A) to a central hub, switch 110, to be routed to "spoke" paying banks 104 (e.g., Banks B, C, and D). A number of cash letters 100, each of which is directed to a different paying bank 104, may be combined in a single electronic cash letter file 115 with a single file header 105. Upon receiving an electronic cash letter file 115, switch 110 deletes the file header 105, separates the combined file 115 into separate electronic cash letter files 120 for each paying bank, provides a new file header 125 for each file, and sends each file 120 into a separate queue 130 for each corresponding paying bank 104. The paying banks 104 then periodically retrieve the electronic cash letters 120 from their particular queue 130. Switch 110 also performs certain quality control functions, e.g., preventing processing of duplicate files, and reporting functions.

However, a hub and spoke configuration disadvantageously results in latency in the transfer of electronic cash letters due to processing time required at the central hub (switch). Such delays are particular significant if the electronic cash letter file is accompanied by check image data, as would be in an image exchange system. In addition, the operation of the central hub involves substantial redundant expense, because it must have the capacity to process every transaction in every file, even though each collecting and paying bank must process the transactions for its own purposes. Furthermore, this additional central processing is not necessary for the routing of transaction files, because modem telecommunications networks are capable of delivering files transmitted under protocols such as TCP/IP peer-to-peer, that is, without a central hub. In fact, such a central hub increases the risk of system wide failure for a payment clearing network because its failure would render the entire network unusable. To counter this vulnerability, payments network operators have had to create even more redundant systems at great expense.

Similar hub and spoke systems are used to clear other types of electronic payments (EP), including those initiated electronically or by use of credit or debit cards. These electronic payments are usually cleared in a manner similar to current ECP methods as described above. Payment system operators in the United States and most other countries operate separate, dedicated, specialized payment switches for each type of payment, including automated clearing house (ACH) entries, Giro transfers, credit card transactions and debit card transactions.

Most of these payment systems require the transmission of files including payment data, which may or may not be destined for multiple paying financial institutions, to a centralized payment switch. The payment switch separates transactions into distinct files for each paying institutions, which are then transmitted to the intended recipient or placed in a queue for later retrieval. Again, the use of a hub and spoke configuration in EP systems presents similar problems as described above in regard to ECP systems.

Accordingly, it would be desirable to have a system configuration that overcomes the problems associated with a hub and spoke configuration. Further, it would also be desirable to use such a system to process ECP data (with or without check images), EP data, or both.

SUMMARY OF THE INVENTION

It is an object of the present invention to overcome or mitigate the above problems associated with the prior electronic payment and electronic check presentment systems.

In one aspect of the present invention, a system and corresponding method are provided. The system includes a plurality of first entities (such as banks), each first entity communicatively connected to at least one distributed traffic agent (DTA), a second entity (such as a central facility) communicatively connected to a DTA, and a communication network communicatively connecting the DTAs. A payload containing a data file (such as electronic check presentment data, electronic payment data, or any other data type) is communicated from one first entity to another through their respective DTAs via the communication network. In addition, a transmittal containing control information corresponding to the payload is communicated from the one first entity to the second entity through their respective DTAs via the communication network.

These and other objects and aspects will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

FIGS. 5a-5f depict various hardware configurations for embodiments of the present invention.

DETAILED DESCRIPTION OF THE PREFERRED EMBODIMENTS

Figure 1:
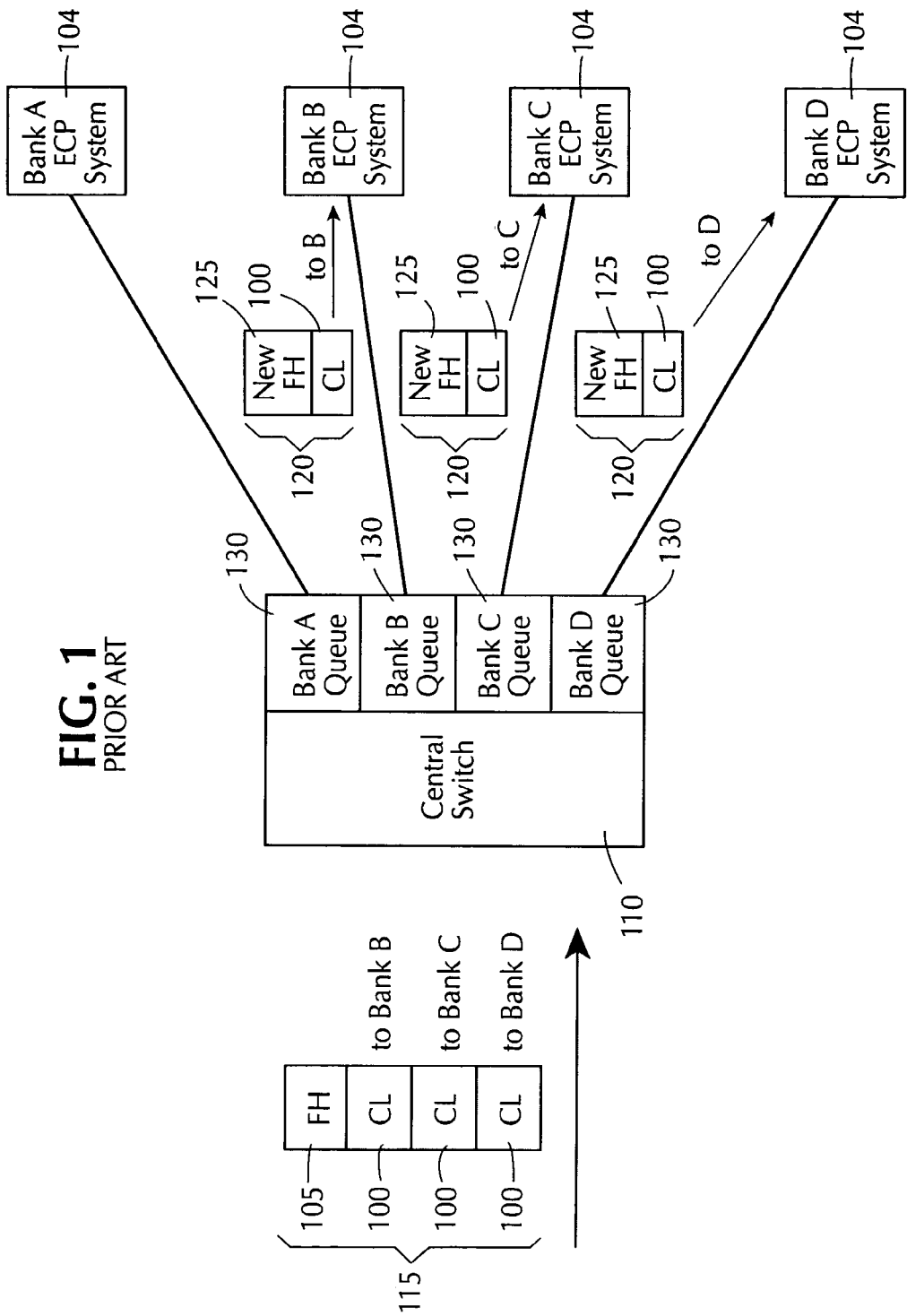
FIG. 1 is a block diagram of a known and conventional electronic check presentment (ECP) system in which electronic check letters are sent to a central switch for distribution to paying banks.

A "payload" is a file of data, and may include, as discussed below, a large account table file, any type of ECP data file, an electronic payment (EP) data file, or any other financial or non-financial-related data file, or any combinations thereof.

A "message" is a set of control and/or summary information used to control and to communicate information regarding transmission of payloads.

A "transmittal" is a message containing information associated with a payload, and specifically may contain information identifying the sender and receiver of the payload and/or summary information used to validate the integrity and contents of the payload.

The system of the present invention communicates payloads and corresponding transmittals using a distributed, intelligent architecture, to obtain the benefits of central control and coordination of the prior art central switch without the above-discussed disadvantages of a hub and spoke configuration. Payloads of electronic check data (with or without image data), electronic payment data, or any other type of data are exchanged peer-to-peer between participating banks or other entities, thus eliminating or reducing the latency associated with processing the same via a central switch, the redundant processing among the banks and central switch, and the risk of system-wide failure. Communicating transmittals containing control, tracking and like information, corresponding to the payloads, to a central control facility retains the centralized control and coordination benefits of the central switch.

In particular, each outgoing payload is designated for at least one receiving (or destination) bank or entity. A sending distributed traffic agent (sending DTA) accepts the outgoing payload from the payment and/or check processing computer system of a sending (or originating) bank or entity. A network address module obtains a network address for the destination bank. The outgoing payload is re-formatted according to a protocol of the network by the sending DTA, and transmitted with a transmittal via the network to the network address of the destination bank.

A receiving DTA receives an incoming payload via the network from a sending bank, re-formats it according to the format of the receiving bank's payment and/or check processing computer system, and passes the re-formatted payload thereto.

A sending/originating bank can also be a receiving/destination bank, and vice-versa, and the system can be implemented with both sending and receiving functionality.

The network address module may be configured to obtain network address of the destination bank from a central facility via the network, or from a routing transit number (RTN) of the destination bank. Conversely, the network address module may obtain the RTN of the originating bank from the central facility via the network, or from the network address of the originating bank.

The DTA may also divide each outgoing payload into a plurality of single destination outgoing payloads, in accordance to the respective destination banks, if the outgoing payload contains data destined for more than one destination bank. In addition, a priority may be assigned to the outgoing payloads. The priority determines the order in which the outgoing payloads are processed at the respective destination banks.

A network interface module may transmit control data via the network to a central facility, the control data being computed from the outgoing payload. The central facility may reconcile the control data computed from the outgoing payload with control data received from the originating bank.

More preferably, this control data is included in a separate transmittal message, as discussed above, which is uniquely associated with a payload. By using a transmittal message that is separate from the payload, the need for the central facility DTA to process payload data itself can be eliminated or reduced substantially. Control data can also be used for system-wide purposes such as management reporting, settlement and risk management, all without requiring centralized processing of the payload. The control data can also be used to prevent the transmission of duplicate files, files not consistent with defined business rules such as processing dates, deadlines or inter-bank exchange partnerships.

As used herein, the term "module" refers to any combination of computer hardware and software that is configured to carry out a specified function. For example, a module may be a portion of a software program, e.g., a subroutine, executing on a general purpose personal computer or workstation. A module may also may include hardware such as, for example, memory components (e.g., RAM, ROM, etc.), data buses, integrated circuits (ICs) for performing synchronous or asynchronous data input and output, ICs for performing computer network data transmission and reception, and application-specific integrated circuits (ASICs).

Figure 2:
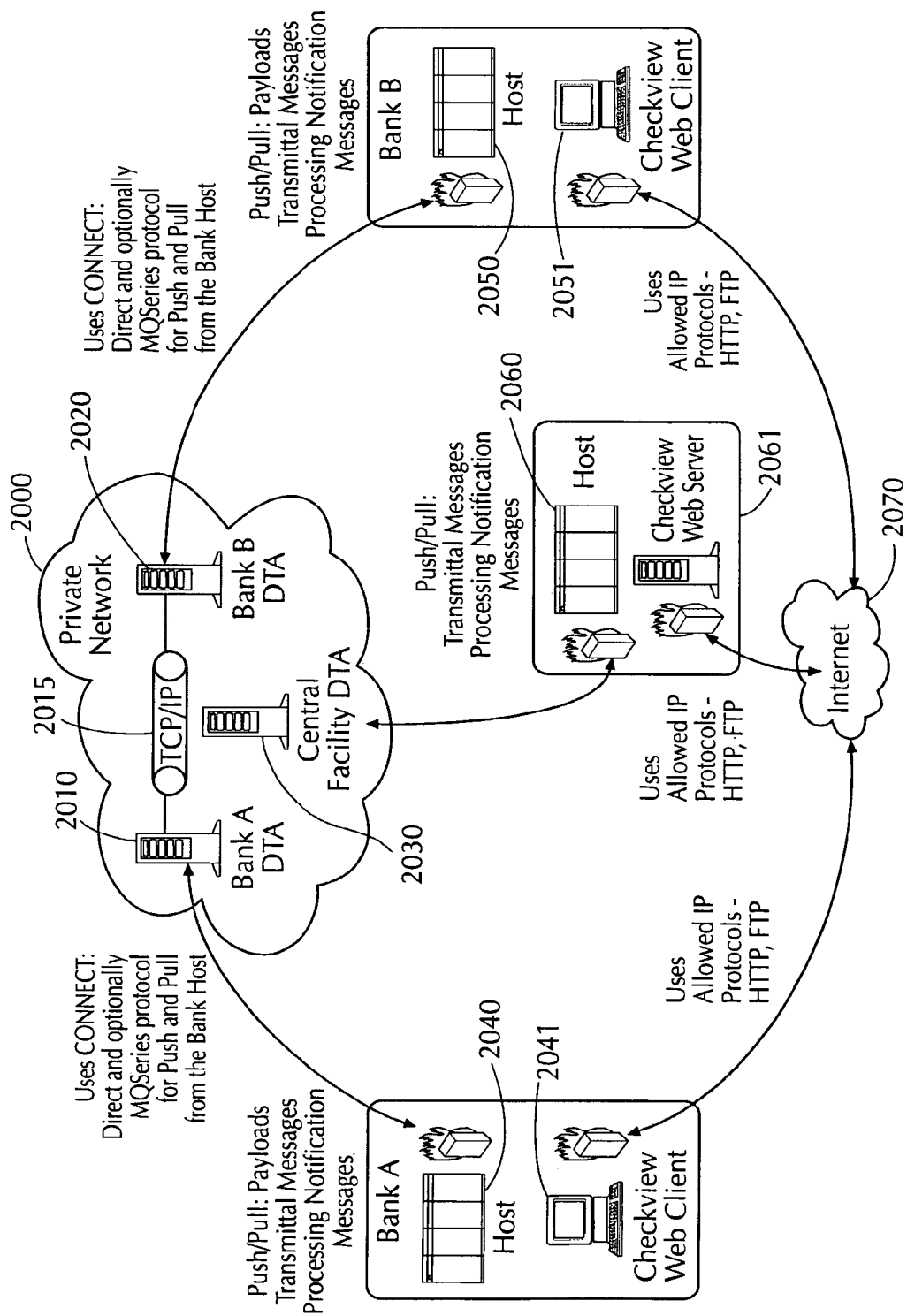
FIG. 2 depicts the architecture of an embodiment of the present invention.

The architecture of the system of the present invention is depicted in FIG. 2, and comprises a private network 2000 communicatively connecting the banks' systems (for example, Bank A's system 2040 and Bank B's system 2050) and the central facility system 2060. DTAs are the connecting points into the private network 2000. Each DTA is associated with a single entity (bank or central facility). However, there may be multiple DTAs assigned to each entity.

Bank A's system 2040 communicates payloads, transmittal messages, and processing notification messages to and/or from Bank A's DTA 2010 through a firewall. Similarly, Bank B's system 2050 communicates payloads, transmittal messages and processing notification messages to and/or from Bank B's DTA 2020 through a firewall. To send this information, each entity may access a DTA via a push/pull process, for example, using CONNECT:Direct (known software from Sterling Commerce used to perform file transfers between member banks and the private network; messages may be transferred if written as files). Messages (only) may be optionally moved with MQSeries send/receive queues. Bank A's DTA 2010 and Bank B's DTA 2020 communicate the payloads to each other, through, for example, a TCP/IP link 2015.

The banks DTAs 2010 and 2020 also transmit transmittal messages and processing notification messages to and/or from the central facility DTA 2030 via the TCP/IP link 2015. These messages in turn are communicated to/from the central facility system 2060, also via the push/pull process (e.g., via Connect:Direct) or via the MQ Series send/receive queues.

As is readily apparent to those skilled in the art, this system does not use a hub and spoke configuration, nor has its attendant disadvantages, as the relatively large payloads of data are neither transmitted through nor processed by a central hub. They are instead transmitted bank to bank via the network. Further, only a relatively small amount of control information, via transmittal and processing notification messages, are communicated to and from a central facility and to the banks, which provides the central control and coordination benefits of the hub and spoke system. In addition, because this system does not require centralized processing of the payload data itself, it can also accommodate different types of payload data (ECP, EP, or any other data) without requiring significant reprogramming or changes in the basic communication and control process.

To allow the banks to view of control data of the transmittal/processing notification messages, and information generated therefrom, a Checkview web server 2061 is operatively connected to the central facility system 2060 and, through a firewall, to a public network (Internet) 2070. Bank systems 2040 and 2050 each have a Checkview web client, respectively 2041 and 2051, operatively connected thereto, and through a firewall, to the Internet 2070. The communication links to the Internet 2070 use standard IP protocols, such as HTTP, FTP, etc. The Checkview web server 2061 provides the control data and related information via the Internet to the Checkview web clients 2041 and 2051 for bank access and viewing of the same.

Figure 3:
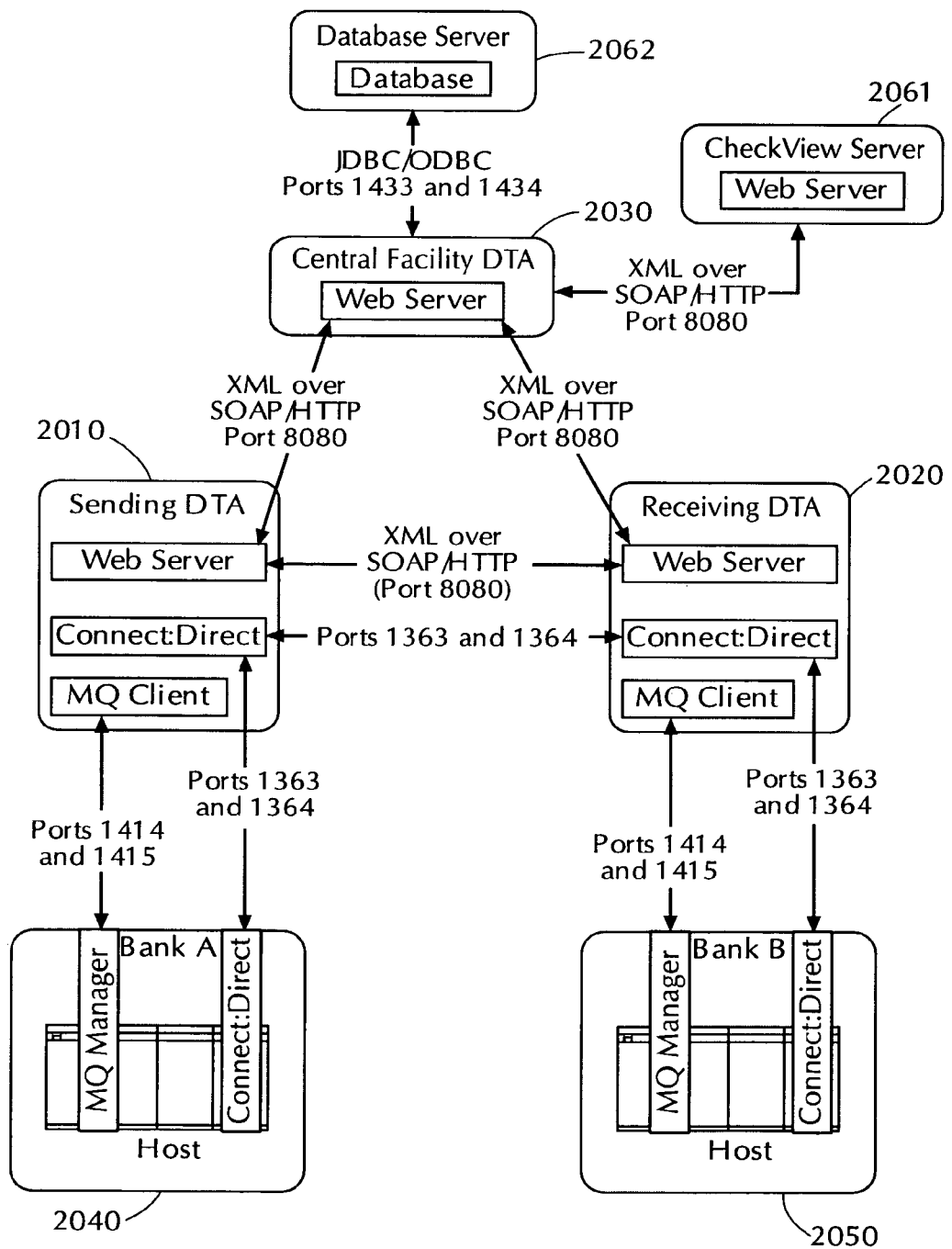
FIG. 3 depicts the communication protocols of an embodiment of the present invention.

FIG. 3 depicts exemplary communication languages and protocols among Bank A's DTA 2010 (configured as a sending DTA), Bank B's DTA 2020 (configured as a receiving DTA), central facility DTA 2030, Bank A's system 2040, Bank B's system 2050, as well as between the central facility DTA 2030 and the central facility system's database server 2062, and between the central facility DTA 2030 and the central facility system's Checkview server 2061.

Figure 4:
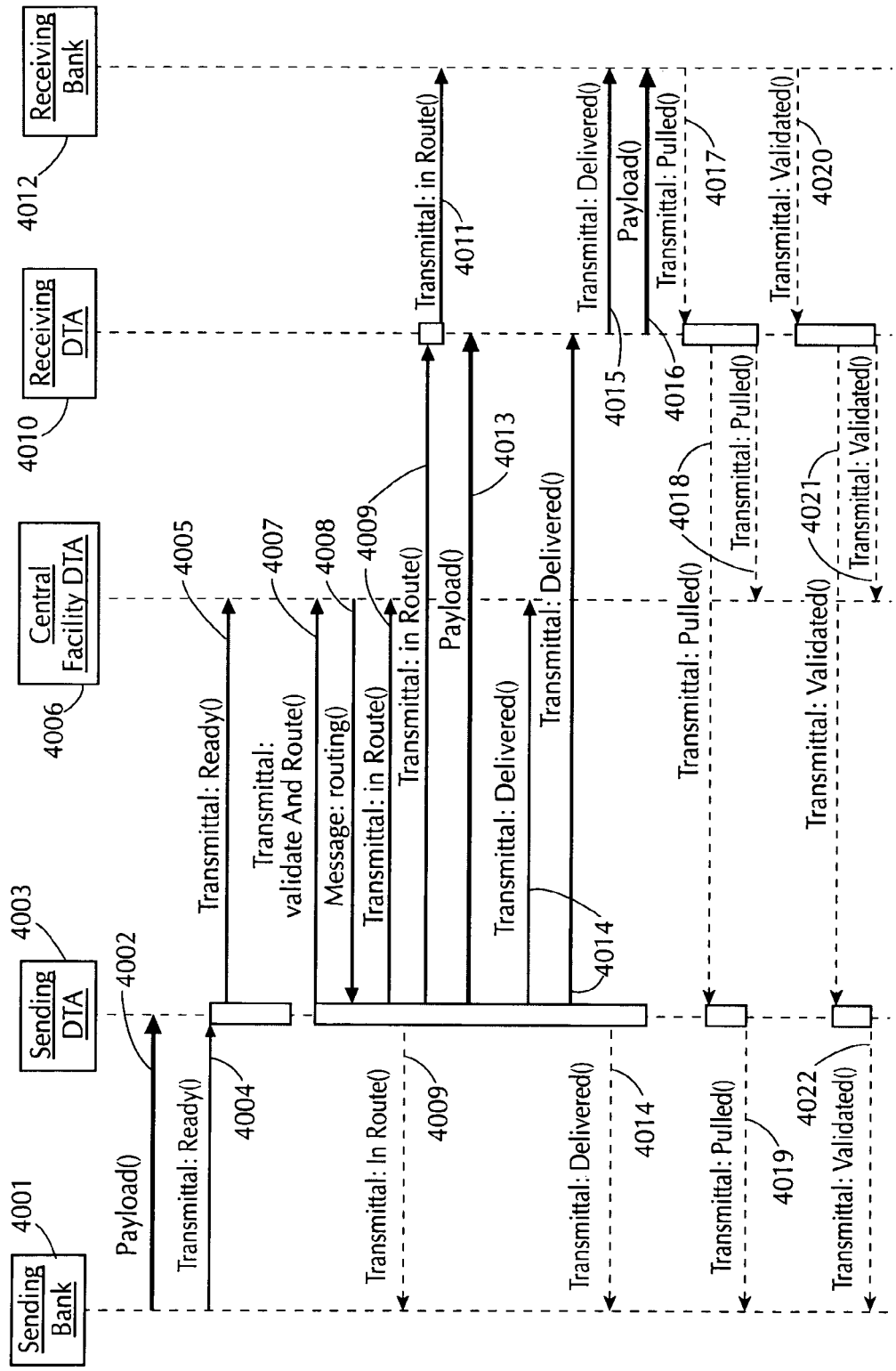
FIG. 4 depicts the payload and transmittal flow of an embodiment of the present invention.

FIG. 4 depicts the payload and transmittal events and flows in a preferred embodiment of the present invention. The sending bank 4001 is a financial institution that initiates the sending of a new payload 4002. The new payload is sent by the sending bank 4001 to the sending DTA 4003 associated with the sending bank 4001, via a bank-developed Connect:Direct script. Once a payload has been transmitted to the sending DTA 4003, the sending bank 4001 must also send a transmittal message 4004, via a bank-developed Connect:Direct script or via an MQSeries message queue, to the sending DTA 4003 to initiate the transfer of the payload 4002. (Not shown are the processing notification messages associated with the payload/transmittal that are communicated back to the sending bank 4001 as discussed above. These processing notification messages are used to notify the sending bank of any problems associated with the transmittal during validation, or of any problems associated with communications to other DTAs in the private network.)

Once the new transmittal has been recognized by the DTA software application, a notice 4005 of new transmittal (and associated payload) entering the system is sent to the central facility DTA 4006. The central facility DTA 4006 is used to track all the activity within the private network. Control totals and activity times are tracked to provide for processing flow activity and settlement information. After the sending DTA 4003 validates that a payload can be transmitted, a request 4007 is sent to the central facility DTA 4003 to do final validation (e.g., duplicate checking), and to get the assigned routing for the receiving DTA 4010 (the DTA associated with the receiving bank 4012 which is to receive the new payload) to send the transmittal 4004 and associated payload 4002. The central facility DTA 4006 returns to the sending DTA 4003 the routing information 4008.

After the sending DTA 4003 has received the routing information 4008, the sending DTA 4003 generates and "inRoute" transmittal message 4009, which is sent to the sending bank 4001, the central facility DTA 4006, and the receiving DTA 4010, thereby signaling that the payload 4002 is in route to the receiving DTA 4010. In flow 4011, the receiving bank 4102 pulls up the inRoute transmittal message 4009 via Connect:Direct, or via an MQSeries message queue monitored by the receiving bank. In flow 4013, the payload 4002 is sent to the receiving DTA 4010 by the sending DTA 4003 via Connect:Direct.

After the payload has been successfully sent to the receiving DTA 4010, the sending DTA 4003 sends a "delivered" transmittal message 4014 to the sending bank 4001, the central facility DTA 4006, and the receiving DTA 4010 (which point in time may be defined as "check presentment"). In flow 4015, the receiving bank 4012 pulls up the delivered message via Connect:Direct, or via an MQSeries message queue monitored by the receiving bank. This is the signal to the receiving bank 4012 that a payload is ready for pull-up. In flow 4016, the payload is received from the receiving DTA 4010 by the receiving bank and pulled up via Connect:Direct. After successful completion of the transfer of the payload from the receiving bank DTA to the receiving bank's internal server, the receiving bank 4012 generates a "pulled" transmittal message 4017. This is basically the same transmittal message as "delivered", with the transmittal type changed from "delivered" to "pulled." Transmittal message 4017 is pushed to the receiving DTA 4010 via a Connect:Direct script, or via an MQSeries message queue. In flow 4018, the "pulled" transmittal message is forwarded on to the central facility DTA 4006 and the sending DTA 4001. In flow 4019, the sending bank 4001 pulls up the "pulled" transmittal message via Direct:Connect or via an MQSeries message queue monitored by the sending bank.

After successful completion of the payload validation process internal to the receiving bank 4012, the receiving bank generates a "validated" transmittal message 4020. This is basically the same transmittal message as "delivered", with the transmittal type changed from "delivered" to "validated." Transmittal message 4020 is pushed to the receiving DTA 4010 via a Connect:Direct script, or via an MQSeries message queue. In flow 4021, the "validated" transmittal message is forwarded on to the central facility DTA 4006 and the sending DTA 4001. In flow 4022, the sending bank 4001 pulls up the "validated" transmittal message via Direct: Connect or via an MQSeries message queue monitored by the sending bank.

Figure 5A:
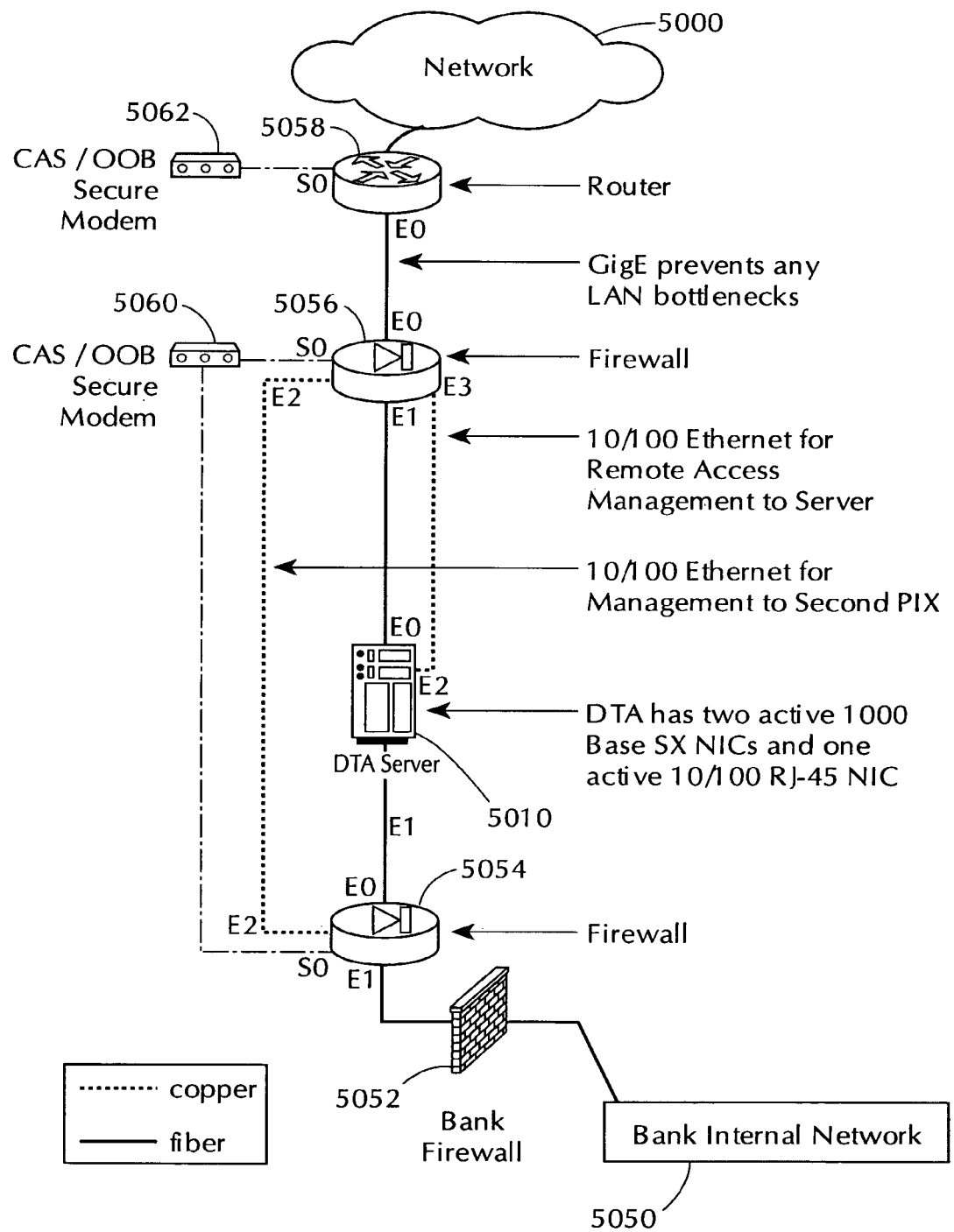
Figure 5B:
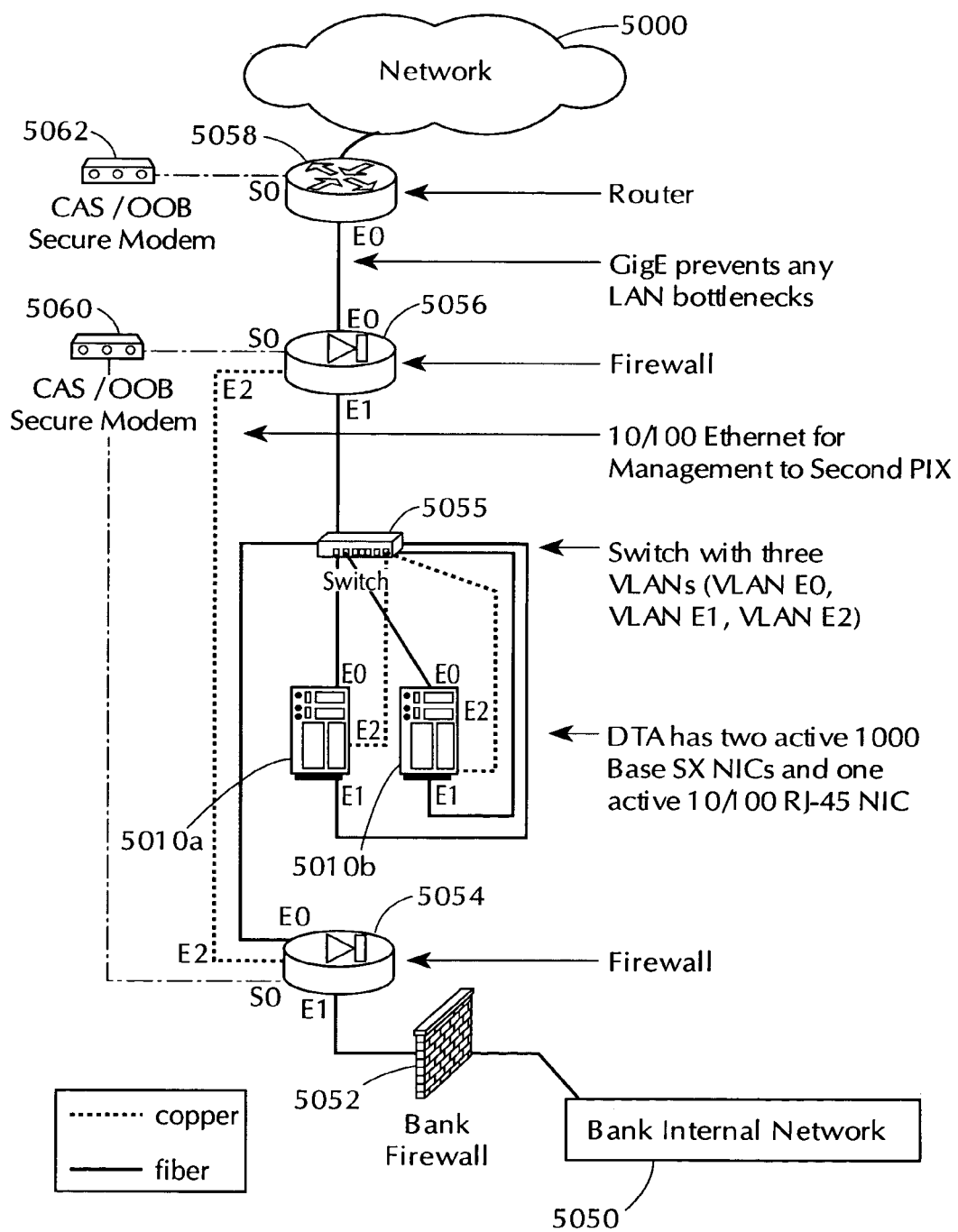
Figure 5C:
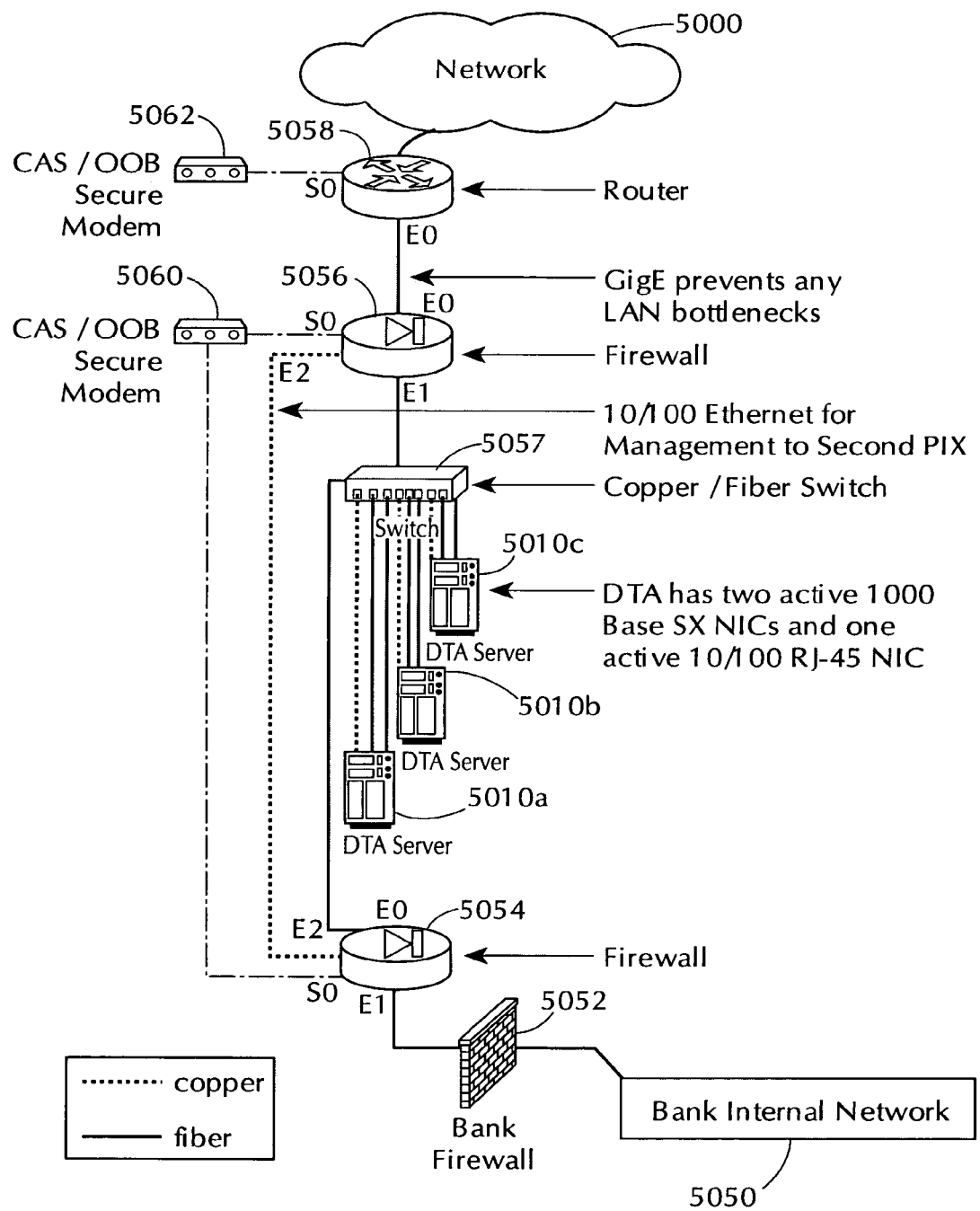
Figure 5E:
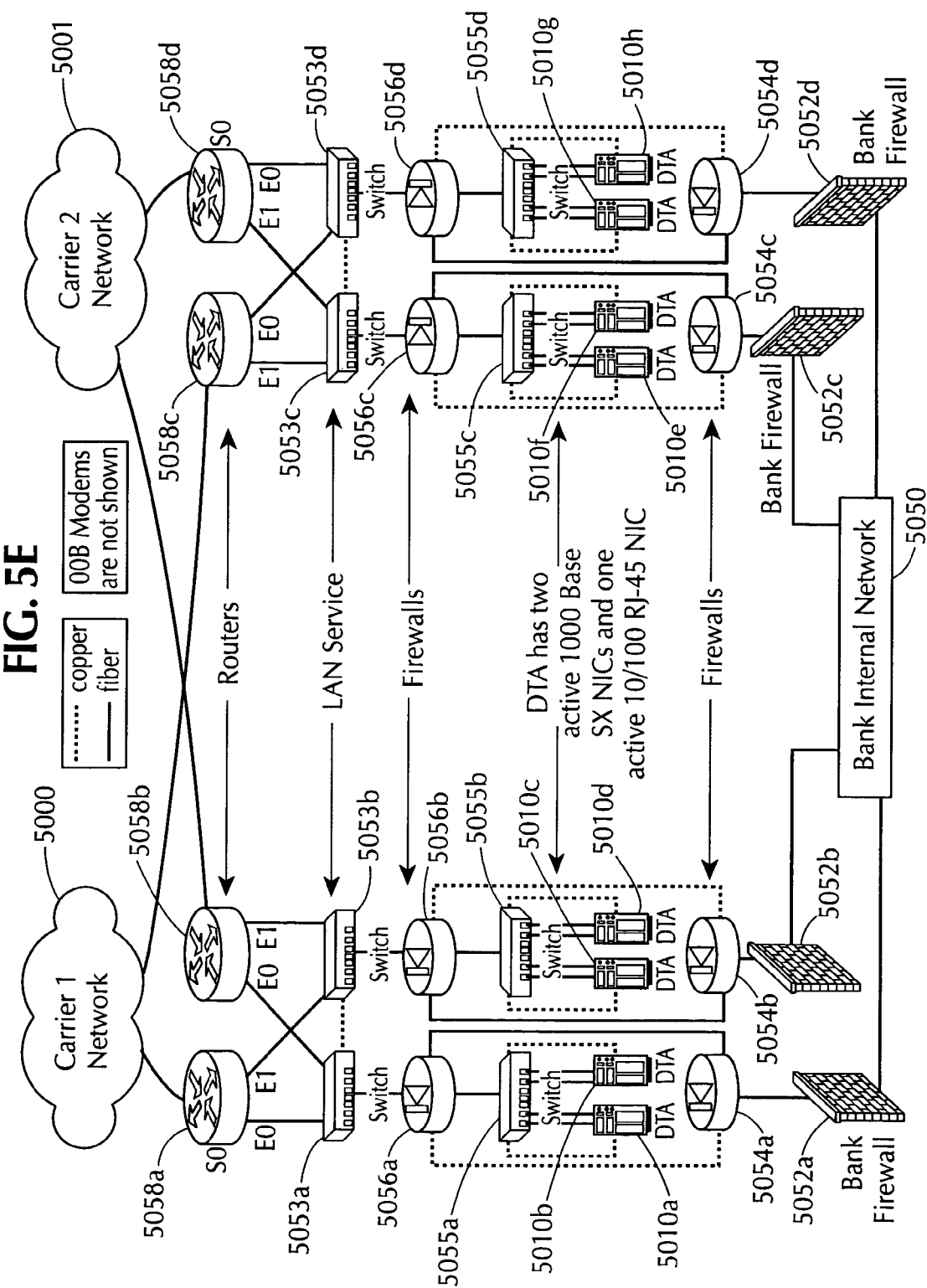
Figure 5F:
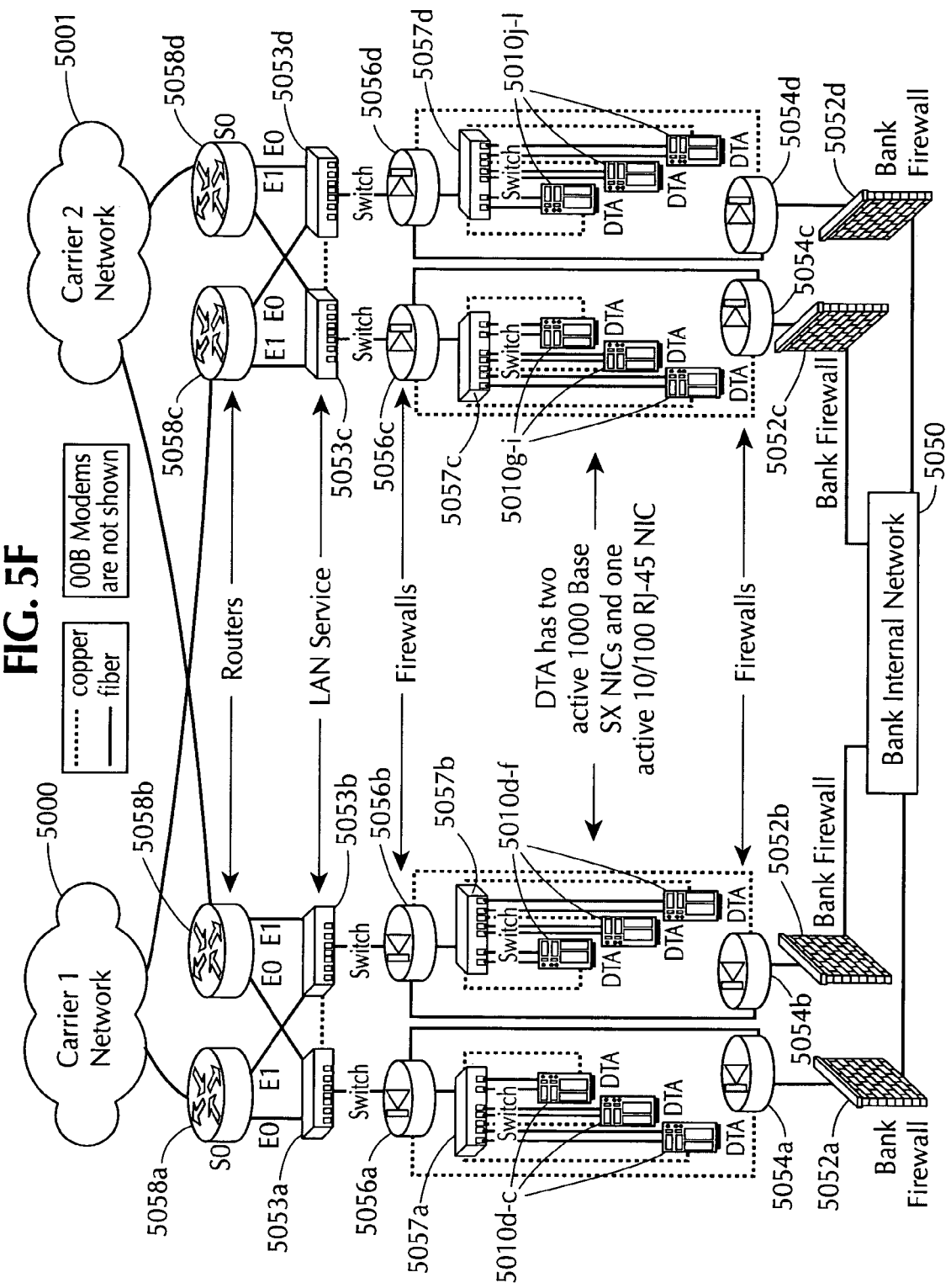

FIGS. 5a-5f depict preferred configurations for the DTA hardware and other network and communication hardware for a carrier's network 5000. In FIG. 5a, the bank's internal system 5050 (or network) is connected to a bank firewall 5052 using 1000 Base SX fiber ("fiber"), which in turn is connected, again via fiber, to a first network firewall 5054. The network firewall 5054 is connected via fiber to the DTA server 5010, which has two active 1000 Base SX NICs and one active 10/100 RJ-45 MC. The DTA server 5010 is connected to a second network firewall 5056, again via fiber. In addition, network firewalls 5054 and 5056 are connected via a 10/100 copper (Cat 5) Ethernet for management to second PIX, and the DTA server and the second network firewall are connected via 10/100 copper Ethernet for remote access management to the server. Both network firewalls 5056 and 5054 are communicatively connected to a CAS/OOB secure modem 5060. The second network firewall 5056 is connected via fiber to a network router 5058, which is also communicatively connected to a CAS/OOB secure modem 5062. The network router 5058 is connected to the carrier's network 5000. This hardware configuration represents a single carrier per data center, and a single DTA server per site. Other possible hardware configurations that may used in the present invention include for a single carrier per data center, two (FIG. 5b) or three (FIG. 5c) DTA servers per site, or for two carriers per data center, two (FIG. 5d), four (FIG. 5e) or six DTA servers per site. In these figures, components 5053, 5055, and 5057 are switches. As will be appreciated by one skilled in the art, other hardware configurations may be used.

For electronic check presentment (ECP), one implementation of the above system is provided in which ECP data are exchanged between banks via a network. In this system, a check processing device is provided for processing paper checks, including sorting the checks and generating ECP data. A check processing computer is connected to the check processing device to accept the ECP data and to generate outgoing payloads of ECP data files.

Figure 6:
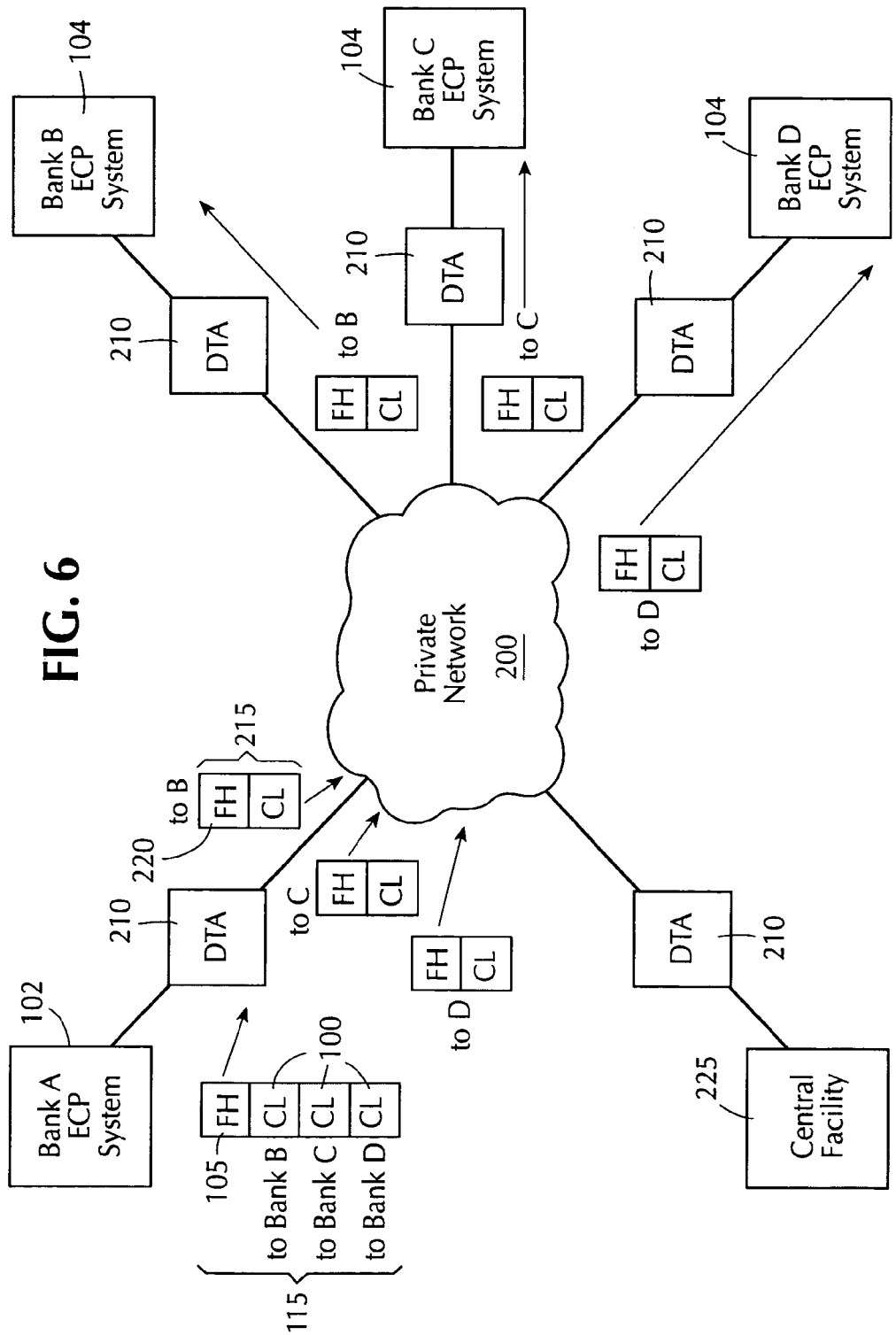
FIG. 6 is a block diagram of an ECP system with image exchange capability, in which electronic check letters and check image data are sent to paying banks via a private network.

As used herein, the term "ECP data" refers to any form of data representing encoded or printed information read from a paper check, e.g., the account number, routing transit number (RTN), dollar amount and check number, using magnetic ink character recognition (MICR), optical character recognition, or any other means of reading information from paper. The ECP data may include an electronic check letter that lists check information for checks drawn on the destination bank. The ECP data may also include image data read from a paper check, such as a digital image read from a paper check using an optical scanner. It is to be understood that the term "ECP data" encompasses any of the above data, even though the terms such as "ECP data with image data" or "ECP and image data" may be used herein. The term "ECP data file" refers to a data structure containing ECP data. An "ECP data file" may or may not contain check image data, and may or may not be formatted in accordance with ANSI DSTU X9.37-2003. "ECP-I" files refer to ECP image files that contain actual check images, as well as corresponding check data. "ECP-D" files refer to ECP disposition files that contain, for example, three cash letters used to inform a collecting bank in the disposition of certain types of checks, and specifically used to identify return items, reversals and holdover items. A specific implementation of the ECP system is shown in FIG. 6. FIG. 6 is directed to an electronic check presentment (ECP) system with image exchange capability. In this system, banks exchange ECP and check image data on a peer-to-peer basis through a shared, private network 200. Each bank 102 and 104 has a distributed traffic agent (DTA) 210 that acts as a network interface and network node. Data may be transferred between these network nodes using any commonly known manner of network transmission of digital data, for example, in the form of packets using Internet protocol (IP). In such a case, each data packet has a header with a source and destination IP address, which correspond to the unique IP address of the sending DTA and the receiving DTA, respectively. The payload of data packets travel through the private network 200 to get from the sending bank's DTA to the receiving bank's DTA, rather than being received and queued by a central switch. This eliminates central switch latency associated with the conventional hub and spoke configuration described with reference to FIG. 1.

In the example of FIG. 6, the depository bank 102, Bank A, sendsECP data, such as a group of electronic cash letters 100, to paying banks 104, e.g., Banks B, C, and D. These cash letters 100 initially may be grouped in a single combined cash letter file 115. As further described below, the DTA 210 of Bank A separates these cash letters 100 according to the paying bank into separate cash letter files 215 with new file headers 220. The individual electronic cash letter files 215 are transmitted through the network 200 as payloads directly to the respective paying banks 104.

Prior to transmission, electronic cash letter files 215 are formatted according to the data protocol of the network. For example, in an IP-based network, the DTA 210 partitions each of these individual cash letters 215 into IP data packets and applies IP header information to each packet. The packets are routed through the network 200 according to their IP headers and are received by the DTA 210 of respective paying bank 104. The DTA 210 of the paying bank 104 reassembles the IP packets into their original form and the data is received as an electronic cash letter by the ECP computer system at the paying bank 104. The DTAs 210 of the depositary bank 102 and the paying banks 104 also sends a transmittal containing control and other information relating to the cash letter transmission to a central facility 225 that performs various monitoring and quality control functions.

Because the DTA 210 acts as a network interface to convert the cash letter to and from the form of IP data packets, the EP network is transparent to the ECP systems of Banks A, B C, and D. Thus, this network is compatible with existing ECP systems, such as those described above with respect to FIG. 1, although modifications may be necessary to handle new ECP data formats.

Figure 7:
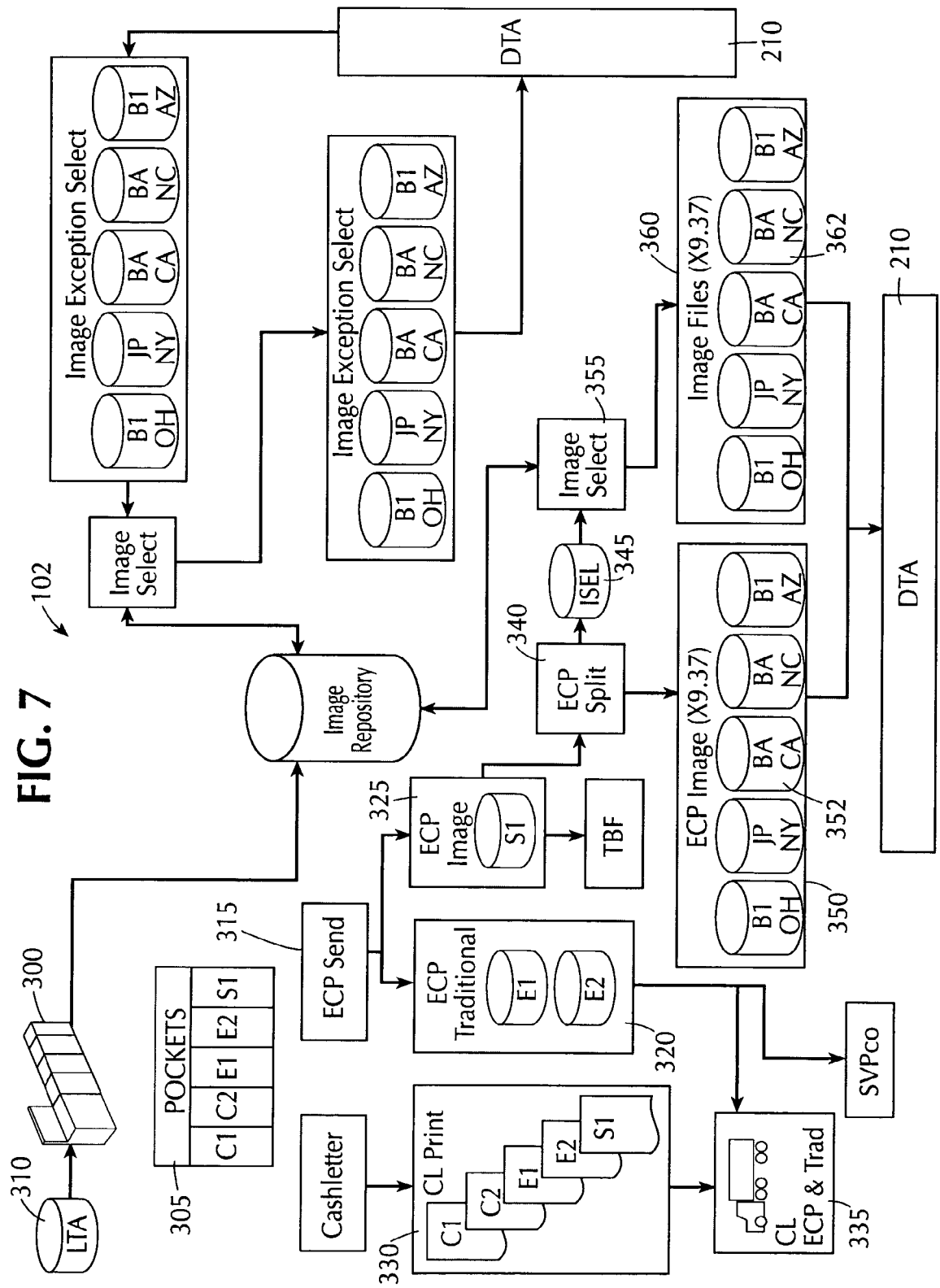
FIG. 7 is a block diagram of the ECP system showing receipt and processing of deposited checks by the collecting bank.

As shown in FIG. 7, paper checks presented for payment at a depositary or collecting bank 102 are processed by a high-speed sorting/imaging machine 300 that reads the MICR information, sorts the checks into pockets 305 depending on how the check is to be handled, and produces a digital image of the checks. The sorting is performed based on the large account table (LAT) 310, which is a data file containing routing and account numbers and an indication of how checks for each account are to be processed, e.g., whether the checks are to be truncated.

Following the processing of the paper checks, the resulting data and sorted checks are prepared for presentment, which entails the sending 315 of the ECP data 320 to the paying banks. The ECP data 320 may be in the form of an electronic cash letter generated from the MICR data, which includes a listing of the checks being sent to the paying bank 104 and their associated account numbers and amounts. The ECP data 320 may include check image data 325 produced by the sorting/imaging machine 300. Paper cash letters are printed 330 for the non-truncated items, i.e., checks drawn on accounts that are not marked for truncation. These paper cash letters 330 and their associated items, are sent 335 to the paying banks by conventional means.

The electronic cash letters are handled depending upon whether the paying bank has the capability to receive ECP with image data, as indicated by the LAT 310. If the paying bank 104 does not have ECP with image data handling capability, then the electronic cash letters are sent in the traditional manner, e.g., by routing the electronic cash letters through a central switch to the paying bank as discussed above with respect to FIG. 1.

If the paying bank 104 has ECP with image data handling capability, then the ECP data is split 340 and sent to a data processor that puts the data in a standard ECP format, such as ANSI DSTU X9.37-2003, and stores it in the image select (ISEL) database 345 for image selection processing. The ECP data is also stored in a database 350, which may have individual database files 352 corresponding to each paying bank 104. The ECP data is transferred from the database 350 for transmission to the paying bank 104 by the DTA 210 for posting. The collecting bank 102 (and the paying banks 104) may have one or several DTAs (two DTA blocks are depicted in FIG. 3, but these functional blocks may represent the same DTA device). Multiple DTAs may be used for redundancy, or the various functions performed by the DTA may be split between several units. For example, separate DTAs may be used for incoming and outgoing ECP data files.

The ECP data in the ISEL database 345 is matched with its corresponding image data in the image repository by the image select module 355. The image data is then stored in an image database 360, which may have individual files 362 corresponding to each paying bank 104.

The collecting bank 102 may send two files to the paying bank for each image exchange cash letter. The first file, which contains ECP data but not images, is generated and sent in an expedited fashion. The second file is for the same transactions as the first file, but includes the associated images. The second file is sent once the associated images are gathered and formatted into the proper format for transmission. The two files are delivered within agreed upon deadlines.

Figure 8:
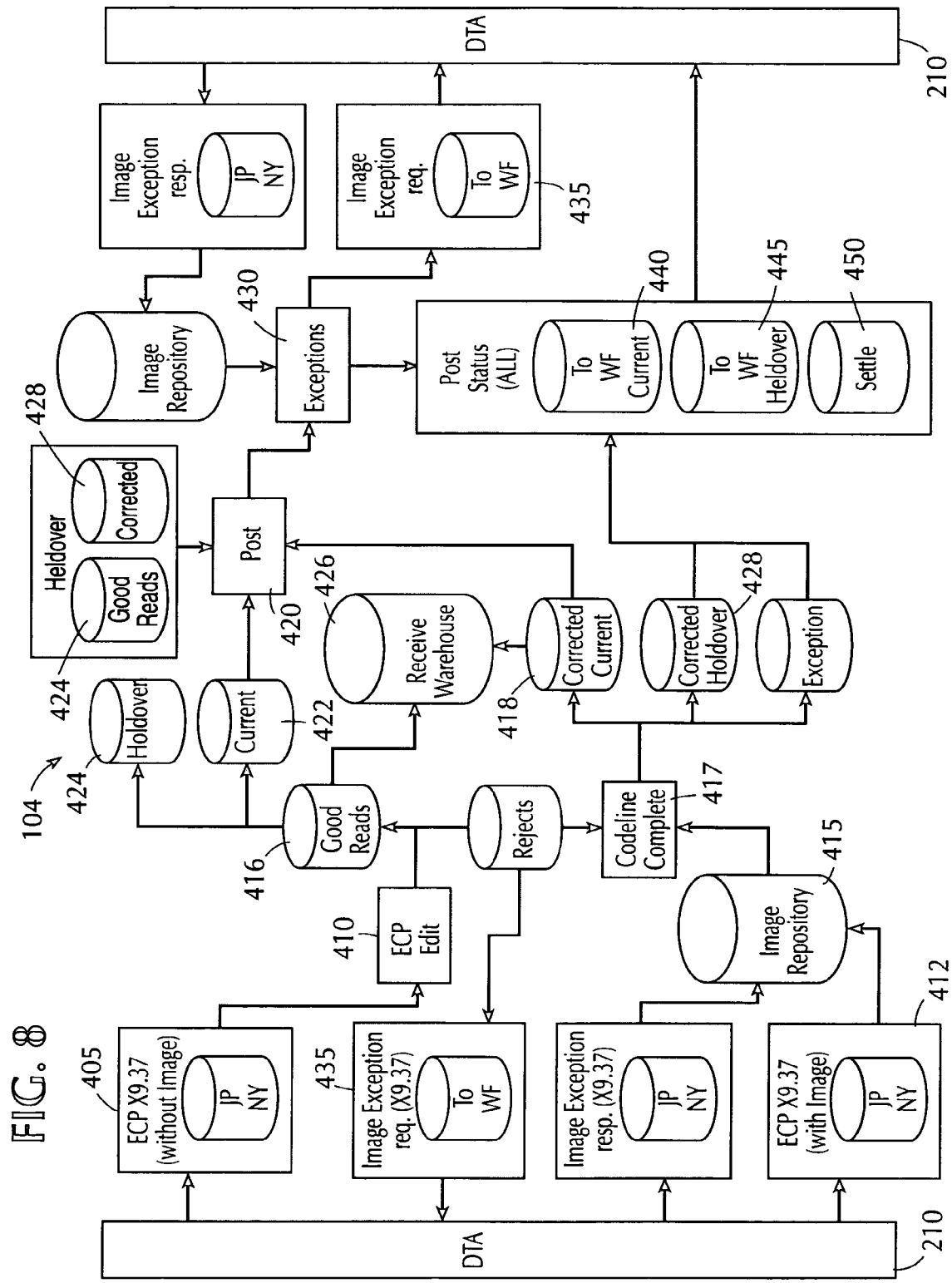
FIG. 8 is a block diagram of the ECP system showing receipt and posting of ECP with image data at the paying bank.

The ECP data and ECP with image data are sent via the DTA 210 as payloads, transmitted through the network 200 and received by the DTA 210 at the paying bank 104, shown in FIG. 8. The DTA 210 at the paying bank 104 separates the data depending upon whether it includes image data. ECP data without image data 405 is processed by an ECP edit 410 program, which performs error analysis on the ECP data to identify incorrectly read MICR data. ECP image data 412 sent subsequent to the sending of the ECP data is stored in an image repository 415. The stored image data may be used to perform codeline correction 417 for items rejected during the ECP edit 410 process. For example, an operator may manually correct codeline data based on a visual inspection of a check image. Alternatively, image data for an individual item or group of items may be requested from the collecting bank through an image exception process prior to the receipt of the ECP with image file.

The current items from the good reads 416 of the ECP edit 410 process and the current items 418 from the codeline correction 417 process, are forwarded to the posting process 420. In addition, the good reads 416 (both current 422 and holdover 424) and corrected current items 418 may be stored in a receive "warehouse" database 426 for archival purposes. Holdover items 424, which are items that do not meet the appropriate deadlines, are separated from the current items 422 prior to posting 420 and stored for further processing according to holdover workflow procedures. Previously heldover items, including good read holdovers 424 and codeline corrected holdover items 428, are also forwarded to the posting process 420.

Prior to posting and storage, all items to be posted are sent through an exceptions sorting process 430, which generates image exception requests 435 if, for example, the image is of such poor quality that the codeline data cannot be corrected by visual inspection of the image. The image exception data items 435 are stored and returned via the DTA 210 to the collecting bank 102. The items that pass the exceptions process are stored according to their post status: current items 440 to be returned to the collecting bank, heldover items 445 to be returned to the collecting bank, and settled items 450. These return data items are then separately transferred in an ECP image return item disposition file via the DTA 210 to the corresponding collecting bank 102. Each return data item includes an associated reason for return, e.g., insufficient funds.

Figure 9:
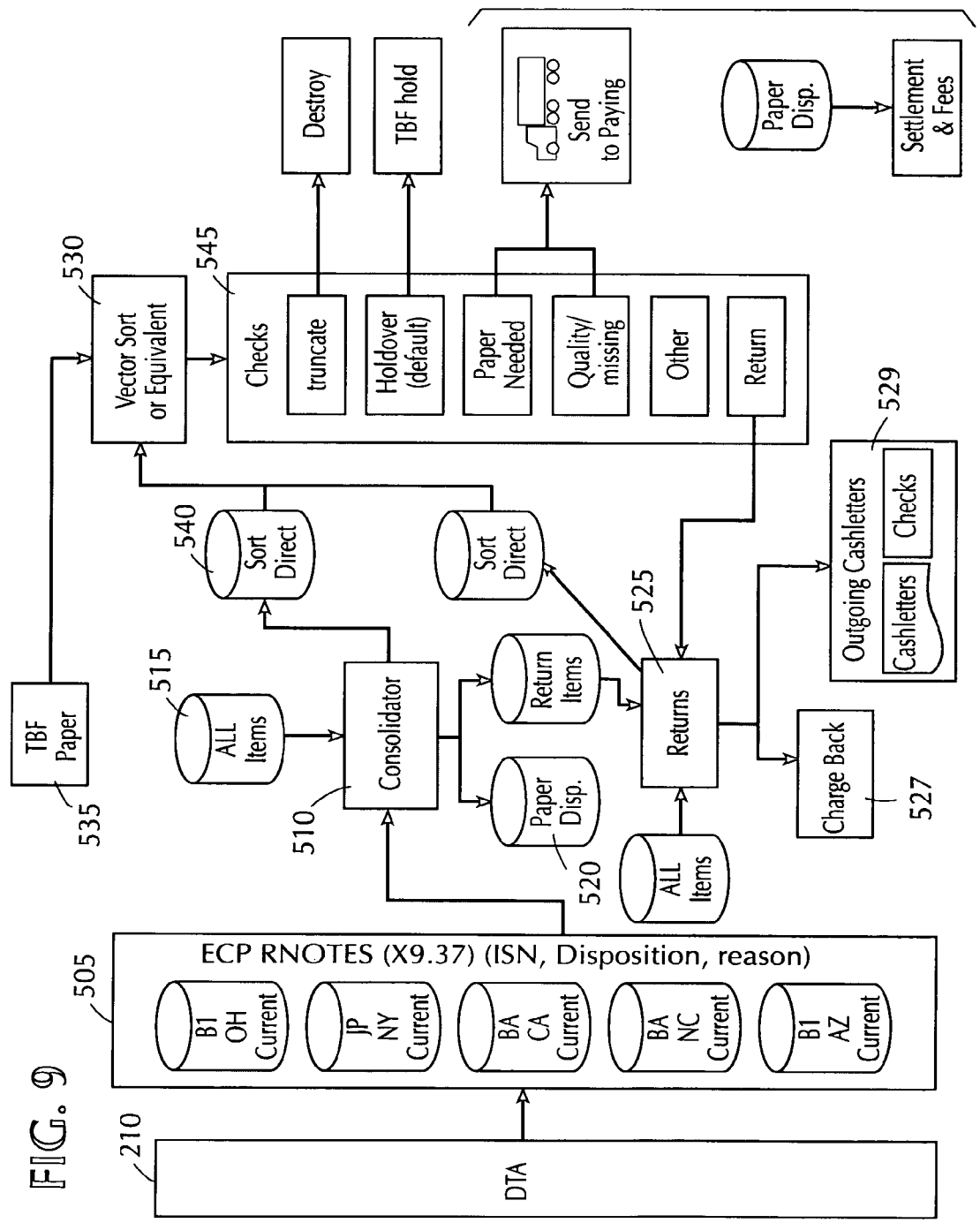
FIG. 9 is a block diagram of the ECP system showing disposition of truncated paper items and receipt of return ECP data at the collecting bank.

As shown in FIG. 9, ECP image return item disposition data files 505 from various paying banks 104 are received by the collecting bank 102 via a DTA. These return data items are combined in a consolidation process 510 with their associated entries in the previous day's all items data file 515. The consolidation process provides a number of different outputs. Some of the return data items are stored for paper disposition 520, which means that settlement information will need to be exchanged between the collecting bank 102 and paying bank 104. Other return data items are forwarded to a returns process 525, where they are charged back 527 to the payor or matched with the paper checks, which are sent out in a conventional cash letter 529.

Figure 10:
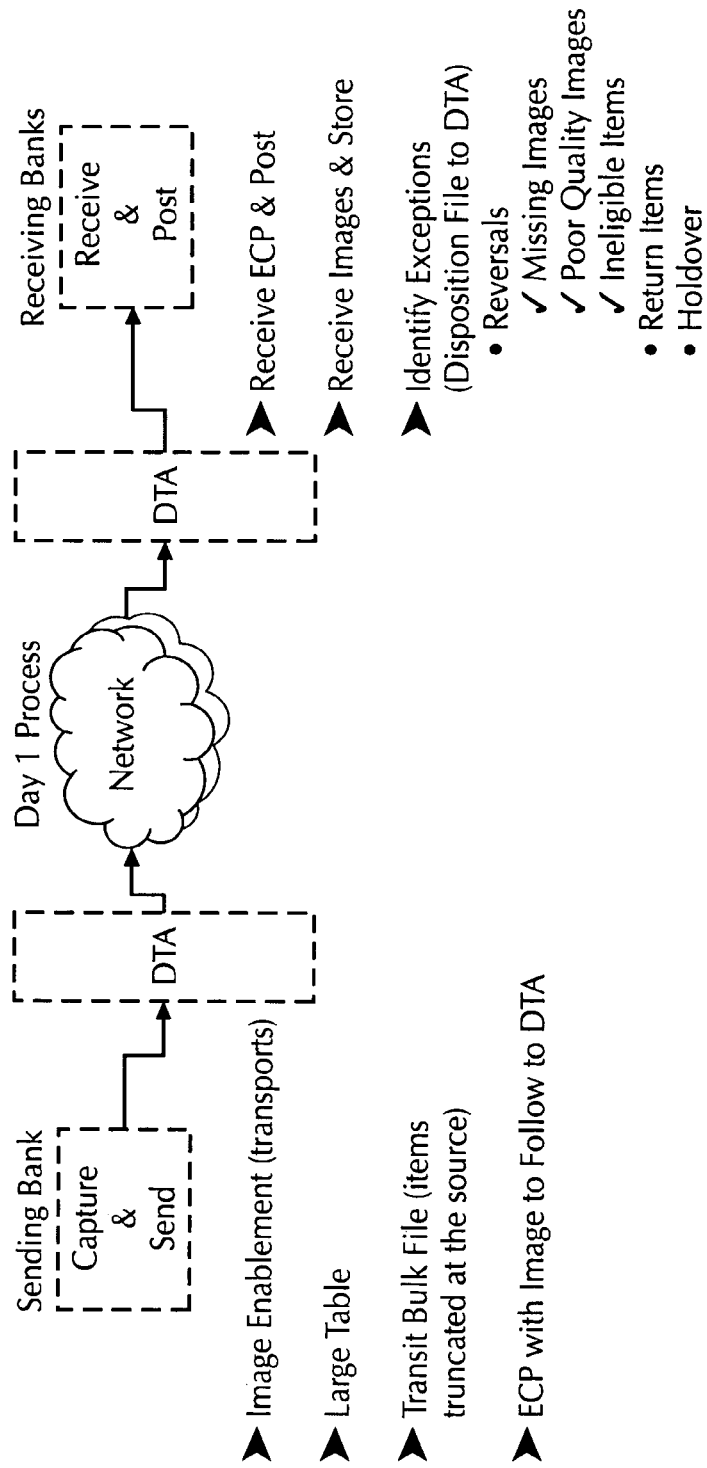
FIG. 10 depicts an example of the Day 1 process of an embodiment of the present invention.
Figure 11:
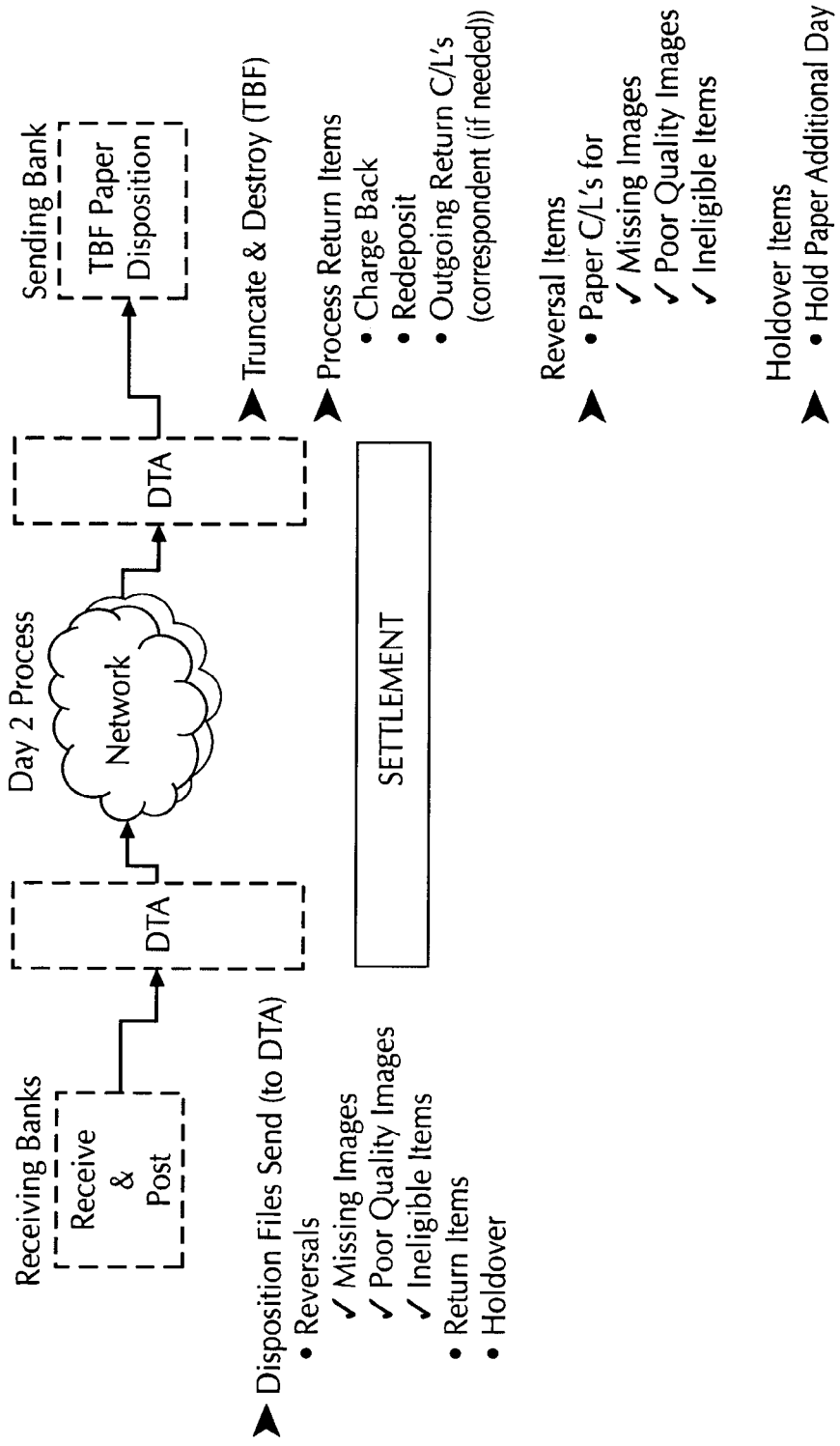
FIG. 11 depicts an example of the Day 2 process of an embodiment of the present invention.

An example of a Day 1 process and a Day 2 process are shown in FIGS. 10 and 11. In FIG. 10, on Day 1, the sending bank captures and sends to its DTA an ECP data file as a payload. In this example, the ECP data file consists of ECP data, with the corresponding ECP image data file to follow. The sending bank DTA sends this payload (with the corresponding transmittal message), to the appropriate receiving banks' DTAs via the network. The receiving banks receive the ECP data payloads and post. They later receive the ECP image data file payloads, and store the check images. The receiving bank identifies exceptions, to create a payload consisting of a ECP disposition file. The ECP disposition file contains data regarding reversals (missing images, poor quality images, and ineligible items), return items, and holdovers.

As shown in FIG. 11, on Day 2, the receiving banks send the ECP disposition file payloads to their respective DTAs for transmission, via the private network, to the sending bank's DTA, as part of the settlement process. The sending bank separates out for eventual destruction the truncated checks in the transit bulk file (as explained in more detail below), processes returned items (charge back, redeposit, and outgoing cash letter), processes reversal items (paper cash letters for missing images, poor quality images and ineligible items), and holds paper for an additional day for holdover items.

In particular, as shown in FIG. 9, the matching of physical paper checks to return data items is achieved by performing a sorting operation 530, e.g., a vector sort, on the paper checks received in the transit bulk file (TBF) 535. The sorting process 530 is controlled using sorting data 540 from the consolidation 510 and return 525 processes discussed above, such that the paper checks are divided according to their eventual disposition. For example, in the sorting output 545 truncated items are separated from the TBF 535 to be destroyed after a predetermined time period. Other items marked as paper needed, poor quality, or image missing are separated from the TBF 535 to be sent to the paying bank. As discussed above, return items are separated from the TBF 535 and returned to the payor or sent out in a conventional cash letter 529.

Implementation of ECP with image exchange, as described above, may require banks to upgrade or replace certain equipment to perform high speed check imaging. Banks having medium to large volume operations may image-enable existing high-speed transports (i.e., paper check sorting and handling machines) so that MICR and check image capture occur during prime pass capture, which is the first pass of the paper check through the processing equipment. Alternatively, image capture may be performed using high speed capture of bulk transit items on a repass or rehandle basis. By acquiring images from subsequent passes, rather than the prime pass, a banking institution may be able to lower costs by maximizing utilization of fewer image-enabled transports, as only the items to be truncated would need to be imaged. During the image capture process, items destined for banks capable of image exchange are sorted out based on the LAT. In addition, as further described below, some of these image exchange items may be identified as image quality rejects, which are referred to as image exceptions. Such items are sorted out and turned over to an image repair and re-entry process for resolution.

Banks having low to medium volume operations may use slower transports to perform MICR and image capture during prime pass capture or on a repass or rehandle basis. Some institutions may use a combination of transports to capture transit images from different sources such as POD, ATM, inclearings or pre-encoded cash letters. As in the high-speed processes, items destined for banks capable of image exchange are sorted out based on the LAT, and image quality rejects are sorted out from the image exchange items.

Some institutions may opt not to perform image capture on the prime pass and may instead selectively image items that meet image exchange criteria. This would likely be accomplished by performing image capture on a rehandle basis after on-us items and non-truncated transit items have been sorted out. Such a procedure may reduce costs by requiring image capture of fewer items.

Regardless of whether an institution performs image capturing on prime pass or on a rehandle basis, there may be image exceptions to be dealt with. Items that are identified as either having a missing image or a suspect image can be recaptured or re-scanned and replaced with a corrected images or an image replacement document (IRD). Image exceptions may be caused by, for example, transport jams, piggy-backed items, and original documents that are of poor quality or are not image-ready.

Image repair may include a combination of the following processes. If feasible, unacceptable items, e.g., missing items, poor quality items, or items with streaks, may be identified during capture and excluded prior to sending an image exchange cash letter. These unacceptable items then can be sent as a paper cash letter or recaptured as an image exchange cash letter (usually the next day). If unacceptable items cannot be identified or deleted prior to sending the image exchange cash letter, then the collecting bank awaits an image exception notification (adjustment) from the paying bank.

Items not meeting the ECP codeline edit requirements may be corrected by sorting out the item as a prime or rehandle reject in the conventional manner. Alternatively, an operator may view the image on the editing system while the item is being processed and correct the codeline in real time while maintaining the original capture sequence. An item must at minimum have a correct routing number to be eligible for this function, otherwise it will be classified as a normal reject item.

Although check processing platforms typically offer some ability to review images for quality, the options vary greatly from vendor to vendor. Institutions wishing to participate in image exchange will need to implement an image quality assurance program using, for example, vendor-provided image quality tools, third-party tools, or manual periodic sampling methods to inspect images. One common mechanical cause of poor image quality is inadequate sorter camera maintenance by the sorter operator and/or the sorter vendor. For example, a dust spot on the camera lens can cause streaks across captured images until this quality defect is identified, which may result in the generation of thousands of poor quality images.

In a paper check processing environment, MICR data is embedded in and magnetically read from paper checks. In an image exchange environment, it becomes necessary for the paying bank to verify the MICR line data read from the paper check against MICR data read from the check image. This verification function ensures that each item is represented by a complete and correct set of MICR data fields along with front and back image views for the corresponding item. If the MICR line data does not match the image-MICR data, the paying bank may reverse the item.

Checks drawn on accounts marked for truncation are retained in a transit bulk file (TBF) and eventually destroyed by the depositary or collecting bank. Only the images of these truncated items are sent on to the paying banks and ultimately the payor. The image data may be temporarily stored in an image repository for further processing and transmission prior to being sent to the paying banks. Checks that are not truncated are stored in a separate TBF and are later sent to the paying bank by conventional means, e.g., delivered by a combination of air and ground transportation.

Figure 12:
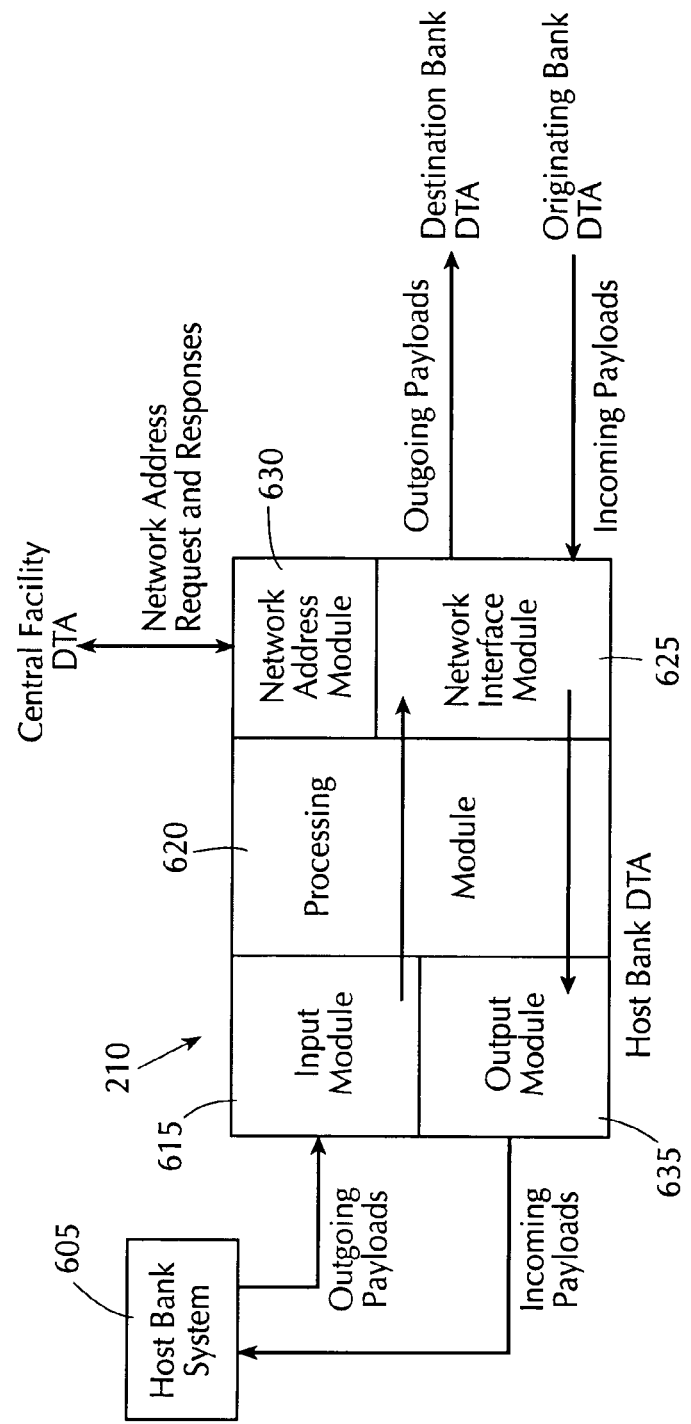
FIG. 12 is a block diagram of a distributed traffic agent (DTA) installed at a host bank.

As discussed above, the distributed traffic agent (DTA) 210 is responsible for the reception and transmission of ECP and ECP with image data files. FIG. 12 shows a block diagram of a DTA 210 connected to the ECP system of a host bank 605, which is the portion of the bank's computer system that generates ECP data from deposited checks and processes ECP data received from other banks. In the preferred embodiment, the DTA 210 is implemented using software that is configured to execute on a general purpose, server-class personal computer. The various functions of the DTA 210 may be described in terms of software/hardware modules.

The DTA 210 has an input module 615 that accepts outgoing ECP data files generated by the host bank ECP system 605 from checks deposited at the host bank. Each of these ECP data files (as a payload) is destined for a particular paying bank (i.e., destination bank). As discussed above, the ECP data files may include image data in a standard format, such as ANSI DSTU X9.37-2003. The input module is designed to interface and perform any necessary handshaking with the bank's primary ECP file transfer application, e.g., "Connect:Direct", which runs over a TCP/IP connection. The outgoing ECP data file is passed to the processing module, which performs various functions to prepare the data for transmission, such as verification of the data format and division of multiple-destination cash letter files into single-destination cash letter files. Alternatively, the functions of the processing module may be incorporated into the input module 615.

The outgoing ECP data file, that is the payload, is then passed to the network interface module 625, which, as described above, partitions each of these individual cash letters 215 into IP data packets and applies IP header information to each packet. The IP address for the destination bank is obtained from the network address module 630, which obtains the network address information from the DTA of the central facility via the private network 200. The network address module 630 also may maintain a database of such addresses, which may be updated periodically from the DTA of the central facility.

The DTA 210 has an output module 635 that performs essentially the opposite function to the input module 615. The DTA 210 receives incoming ECP data files (payloads) from collecting banks (i.e., originating banks) for checks written on the host bank. Such files are received though the private network 200 by the network interface module 630, which reassembles received IP packets into the data file transmission format. In an alternative embodiment, the functions of the input module 615 and output module 635 may be performed by a single combined input/output module. Furthermore, although the incoming and outgoing ECP data files are depicted in FIG. 12 as occurring on separate communication lines, such communication could readily be performed on a single bi-directional communication link. In such a case, the incoming and outgoing data is routed to the input module 615 and from the output module 635 as appropriate or is handled by a combined input/output module.

The incoming ECP data files are passed to the processing module 620, which performs functions such as format verification and acknowledgment transmission, and then to the output module 635. The output module 635 interfaces with the host bank's ECP file transfer application, e.g., Connect:Direct, and performs any necessary format conversion so that the files can be accepted by the bank application. The output module 635 also performs any handshaking that may be necessary with the bank application.

Each DTA preferably includes a computer platform that is an Intel-based (or equivalent), dual processor, server-class machine running at least 1.8 GHz. The DTA preferably has a minimum of 2 GB of memory, a CD-ROM drive, a minimum of 72 GB of available disk space using RAID-0 (disk mirroring) or RAID-5 (disk striping) disk redundancy implementations, a tape backup, and at least one network interface card supporting 100 megabit or gigabit Ethernet connectivity. The operation of each DTA supports a high degree of parallelism, such that multiple files can be sent, received, and validated concurrently.

Figure 13:
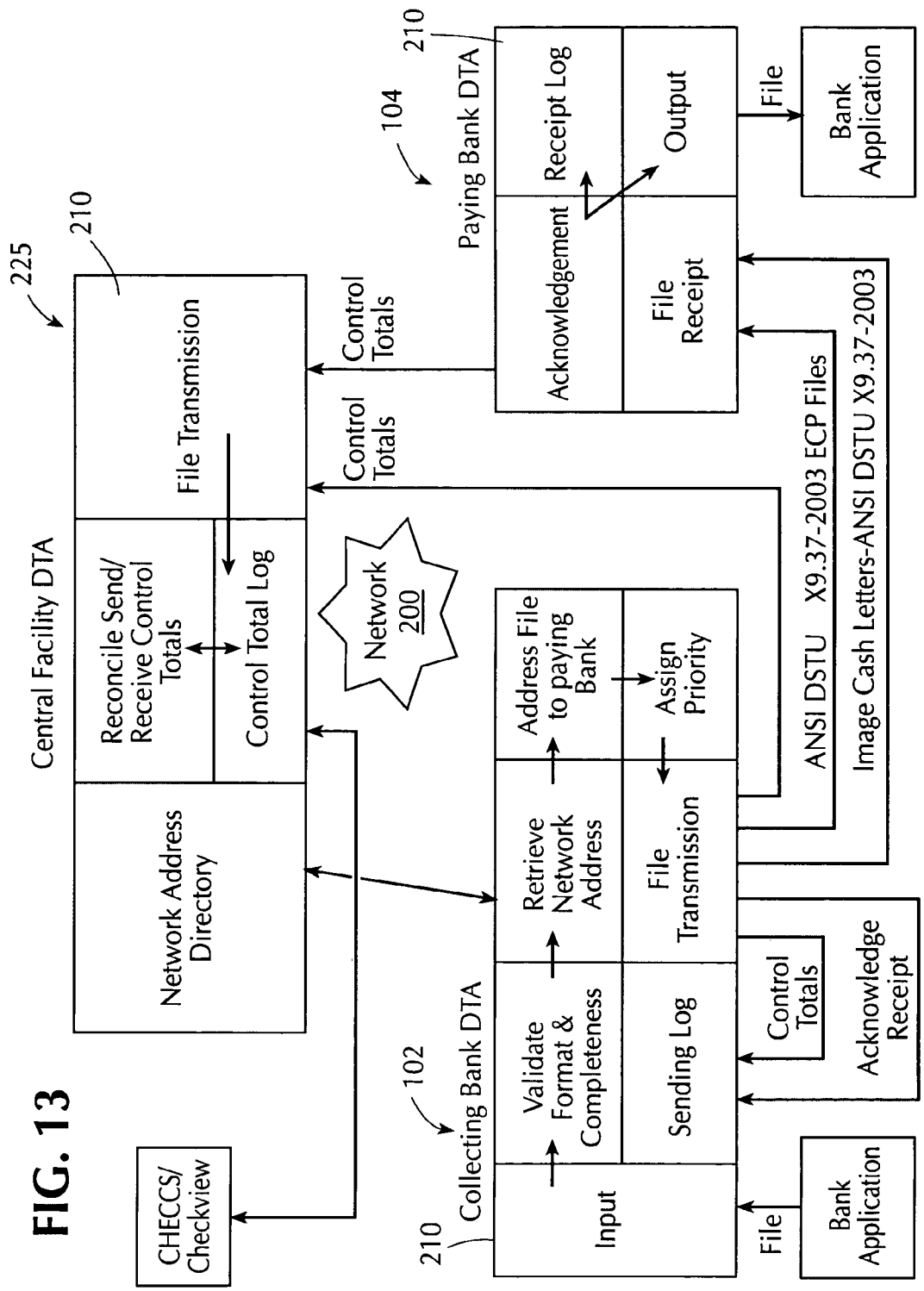
FIG. 13 is a block diagram of the functions performed by the DTAs of the collecting bank, the paying bank, and the central facility.

In addition to the reception and transmission of ECP and large account table (LAT) files as payloads, the DTA 210, as shown in FIG. 13, performs a number of other functions relating to the handling of ECP and image data in the private network. Prior to sending a file, the DTA 210 at the sending bank 102 (e.g., the collecting bank) validates the file for correct format and completeness and prepares the file for transmission to the receiving bank 104 (e.g., the paying bank). The format verification ensures that the file adheres to the standard file structure for the particular type of file. This verification includes the capability to verify that an ECP data record (e.g., data read from a check MICR strip) exists for each ECP with image data record. This allows the DTA 210 to identify any extra images in the file (i.e., those images not associated with a ECP data record). The completeness verification ensures that the number of records in the file matches a control total. The DTA 210 also may check the total file size and compare it to control values for the particular file type.

The DTA 210 prepares the file for transmission by retrieving from a secure server the network IP address of the bank to which the file is to be sent. For example, the collecting bank 102 DTA 210 may retrieve the network IP address of the paying bank from a network address directory stored on the DTA 210 at a central facility 225, such as Electronic Clearing Services (ECS$^{SM}$), which is a division of the Small Value Payments Company (SVPCo$^{SM}$). The bank receiving the file may have more than one network address, each associated with a different type of file to be received. For example, a LAT file may be sent to a different address than an ECP with image data file. Using multiple network addresses can help improve processing efficiency at the receiving DTA by allowing files to be sorted by type prior to processing. Alternatively, the network address associated with a file type may be directed to a DTA that is specifically configured to process that file type.

The DTA 210 also assigns a priority to the file prior to sending, based on criteria such as the following: receiving bank deadline, file type, file size, file value, and the most efficient use of telecommunications capacity. The priority of the file may be determined using a master table of bank-established parameters corresponding to each of the above criteria. Such a table may be maintained by the DTA 210 of the central facility 225 and may be replicated on each bank's DTA 210. In addition, it may be possible for each bank to establish its own prioritization parameters in the master table. Files with the highest priority are delivered first. File priority may be automatically overridden by an algorithm, to ensure that all files are delivered by their associated deadlines.

The DTA 210 at the receiving bank 104 is responsible for receiving the various types of payloads sent by the sending banks. In addition, the receiving DTA generates bank address responses, file receipt acknowledgment messages, and reconcilement discrepancy advices, etc. Upon receiving a file, the DTA 210 sends an acknowledgment receipt to the sending bank 102 DTA 210 and delivers the file to the appropriate banking application on the receiving bank's 104 computer system. The delivery may be accomplished by notifying the application that the file is ready for retrieval, e.g., by passing a token to the application.

The sending and receiving of payloads by the DTAs through the private network is subject to a sophisticated file tracking system. The DTA at each bank maintains a log having entries for each file sent or received. The log entries include such information as: sending bank address or identification number, receiving bank address or identification number, and file priority. The log also records the date and time that each file was delivered by the sending application to the sending DTA, sent by the DTA to the network, received by the receiving DTA, and delivered by the receiving DTA to the receiving application. In addition, the log maintains control totals for the value of the items in the file, the number of items, and the file size in bytes. A copy of this information, including file time stamps, sender and receiver identification, and control totals, is also sent to the DTA of the central facility via a transmittal. The DTA at each bank also receives and stores in the log acknowledgments received from receiving banks for each file sent.

The file tracking system is used to help reconcile discrepancies in the information maintained at the sending 102 and receiving banks 104. Via the use of transmittals, the DTA 210 at the central facility 225, as described above, receives control and tracking information from both the sending 102 and receiving 104 banks for all files that are transmitted through the private network 200. The central facility 225 DTA 210 attempts to reconcile each file transmission by matching the control totals received from the sending 102 and receiving 104 banks. If there is a disagreement between the sending 102 and receiving 104 bank's control and tracking information, then the central facility 225 DTA 210 send a reconcilement discrepancy advice to the DTAs 210 at the sending 102 and receiving 104 banks.

The DTA 210 at each bank is configured to receive reconciliation discrepancy notifications from the central facility 225 DTA 210. The bank's DTA provides tools for correcting these discrepancies. Corrections are sent to the sending bank 102, the receiving bank 104, and the central facility 225 and are stored as addenda to the logs stored on each location.

As stated above, a transmittal message is used by the file tracking system to communicate between the banks and the central facility regarding the files that are being transmitted through the private network. In the preferred embodiment, a transmittal message is received by the originating financial institution's DTA before any file is sent. The message is defined using XML (eXtensible Markup Language), an international standard method for representing data, and the following is a sample XML schema for a transmittal message:

```
<?xml version="1.0"?>
<transmittal xsi:noNamespaceSchemaLocation="transmittal.xsd"
    xmlns:xsi="http://www.w3.org/2001/XMLSchema-instance">
<transmittal_type>payload|notice|confirmation</transmittal_type>
  <transmittal_id>222222222-40001287</transmittal_id>
  <control>
    <message_id>1234-4234-42134</message_id>
    <sender type="ep">222222222</sender>
    <receiver type="dta">bank-a-node-1</receiver>
    <time_of_message>2003-07-02T02:54:42Z</time_of_message>
  </control>
  <file>
    <file_name>SVPCO.DTA.ECP.G0001V00</file_name>
    <file_type>ECP|LATF</file_type>
    <file_size>192837465</file_size>
    <codepage>437<codepage>
  </file>
  <ecp type="data|image|disp" usage="P|T" resend="N|Y">
    <key_data>
      <file_id_modifier>A</file_id_modifier>
      <create_date>20030701</create_date>
      <create_time>2145-0500</create_time>
      <origin_routing>333388889</origin_routing>
      <destination_routing>222277775</destination
    </key_data>
    <summary>
      <ansi_std_level>03</ansi_std_level>
      <cash_letter_count>1</cash_letter_count>
      <file_item_count>18434<file_item_count>
      <file_record_count>18454</file_record_count>
      <file_total_amount>127645697</file_total_amount>
      <origin_name>First Bank</origin_name>
```

```
        <originator_contact_name/>
        <originator_phone>
        <destination_name/>
        <country_code/>
        <user_field/>
    </summary>
    <cash-letters>
        <cash-letter id="90001234">
            <collection_type>00|03|05<collection_type>
            <return_type>R|E|H</return_type>
            <origin_routing>333388889</origin_routing>
<destination_routing>222277775<destination_routing>
            <origin_name>First Bank<origin_name>
            <destination_name/>
            <business_date>20030701<business_date>
            <settlement_date>20030701<settlement_date>
            <create_date>20030701<create_date>
            <create_time>2130-0500<create_time>
            <record_type>E|F</record_type>
            <doc_type>C|G|K</doc_type>
            <originator_contact_name/>
            <originator_phone/>
            <fed_work_type/>
            <user_field/>
            <bundle_count>65<bundle_count>
            <item_count>18435<item_count>
            <total_amount>127645697<total_amount>
        <cash-letter>
    </cash-letters>
<ecp>
<dta-control>
    <file_size>192837465<file_size>
    <payload type="primary|copy"/>
    <dta_nodes>
        <dta_node type="sender">
            <name>bank-a-node-1</name>
            <hostname>node1.banka.svpco.pvt<hostname>
            <ip_addr>10.10.1.2</ip_addr>
            <start>2003-07-02T02:54:54Z</start>
            <stop>2003-07-02T02:59:28Z</stop>
            <arrival>2003-07-02T02:54:40Z</arrival>
        </dta_node>
        <dta_node type="receiver">
            <name>bank-b-node-1</name>
            <hostname>node1.bankb.svpeo.pvt</hostname>
            <ip_addr>10.10.2.2</ip_addr>
            <start>2003-07-02T02:54:54Z</start>
            <stop>2003-07-02T02:59:28Z</stop>
            <arrival>2003-07-02T02:59:28Z</arrival>
        </dta_node>
    </dta_nodes>
</dta-control>
</transmittal>
```

File types for this example are:
ECP=electronic check presentment data file
LATF=large account table file
ECP file types for this example are:
DATA=ECP data without image data
IMAGE=ECP data with image data
DISP=ECP disposition file for returned, rejected and held over items An ECP validation request message is sent to the DTA at the central facility to request validation of ECP data based on the receipt of a new transmittal message. Once the message is validated, then certain values are checked against the DTA at the central facility. The following is an example of an XML schema for an ECP validation request message:

```
<?xml version="1.0"?>
<ecp_validation_request
    xsi:noNamespaceSchemaLocation="ecp_validation_request.xsd"
    xmlns:xsi="http://www.w3.org/2001/XMLSchema-instance">
    <control>
        <message_id>1234-4234-42134<message_id>
        <sender type="dta">bank-a-node-1</sender>
        <receiver type="dta">svpco-node-1</receiver>
        <time_of_message>2003-07-02T02:54:42Z</time_of_message>
    </control>
    <ecp type="data|image|disp" usage="P|T" resend="N|Y">
        <key_data>
            <file_id_modifier>A<file_id_modifier>
            <create_date>20030701<create_date>
            <create_time>2145-0500<create_time>
            <origin_routing>333388889<origin_routing>
            <destination_routing>222277775<destination
        </key_data>
        <summary>
            <cash_letter_count>1<cash_letter_count>
            <file_item_count>18434<file_item_count>
            <file_record_count>18454<file_record_count>
            <file_total_amount>127645697<file_total_amount>
        <summary>
    <ecp>
    <transmittal_id>222222222-40001287</transmittal_id>
</ecp_validation_request>
```

An ECP validation response message is sent from the DTA at the central facility as a response to a request for validation of ECP data. Receipt of this message indicates that the request passed all validation checks. If the request fails validation, an exception message will be sent identifying the details of the failure. The following is an example of an XML schema for an ECP validation response message:

```
<?xml version="1.0"?>
<ecp_validation_response
    xsi:noNamespaceSchemaLocation="bank_address_response.xsd"
    xmlns:xsi="http://www.w3.org/2001/XMLSchema-instance">
    <control>
        <message_id>1234-4234-42134</message_id>
        <sender type="dta">svpco-node-1</sender>
        <receiver type="dta">bank-a-node-1</receiver>
        <time_of_message>2003-07-02T02:54:42Z</time_of_message>
    </control>
    <transmittal_id>222222222-40001287</transmittal_id>
<ecp_validation_response>
```

A file transfer status message may be from a host bank DTA to the DTA at the central facility to provide status information about the state of a transmittal in progress. The following is an example of XML schema for a file transfer status message:

```
<?xml version="1.0"?>
<file_transfer_status
    xsi:noNamespaceSchemaLocation="file_transfer_status.xsd"
    xmlns:xsi="http://www.w3.org/2001/XMLSchema-instance">
    <control>
        <message_id>1234-4234-42134<message_id>
        <sender type="dta">bank-a-node-1<sender>
        <receiver type="ip">222222222<receiver>
        <time_of_message>2003-07-02T02:54:42Z</time_of_message>
    <control>
    <file_type>ECP|ECPI|DISP|LATF<file_type>
    <file_size>435435345<file_size>
    <sending_node>bank-a-node-1<sending_node>
<receiving_node>bank-b-node-1<receiving_node>
<transmittal_id>222222222-40001287<transmittal_id>
    <status
        state="I|V|F|L|R|B|T|C|W|M|A|SM|SA"
        process="processing|errors|delayed|completed"
        connect_direct="H|W|T|E" />
</file_transfer_status>
```

Valid values for the State indicator in this example are:
I=process initialized
V=validating
F=validation failed
L=updating log files
R=requesting bank address
B=building bank ECP application process
T=transmitting
C=sending file process completed
W=waiting for file send completion
M=creating messages to be sent to other DTA
A=creating messages to be sent to banking application
SM=sending messages to other DTA
SA=sending messages to banking application
Valid values for the Process Status in this example are:
Processing
Errors
Delayed
Completed
Valid values for the bank application, e.g., Connect: Direct, status indicator in this example are:
H=hold
W=wait
T=timer
E=executing
File types for this example are:
ECP=electronic check presentment data file without image data
ECPI=ECP data file with image data
DISP=ECP disposition file for returned, rejected and held over
LATF=large account table file The following is an example of an XML schema for a file posting status message, which is sent by a DTA upon receiving an ECP data file or large account table (LAT) file, or any other payload type:

```
<?xml version="1.0"?>
<posting_file_status
    xsi:noNamespaceSchemaLocation=" posting_file_status.xsd"
    xmlns:xsi="http://www.w3.org/2001/XMLSchema-instance">
  <control>
    <message_id>1234-4234-42134</message_id>
    <sender type="ip">333344445</sender>
    <receiver type="ip">222222222</receiver>
    <time_of_message>2003-07-02T02:54:42Z</time_of_message>
  </control>
  <file_type>ECP|ECPI|DISP|LATF</file_type>
  <sending_node></sending_node>
  <receiving_node></receiving_node>
  <transmittal_id></transmittal_id>
  <status value="accepted|not_accepted|not_posted|discrepancy" />
</posting_file_status>
```

Figure 14:
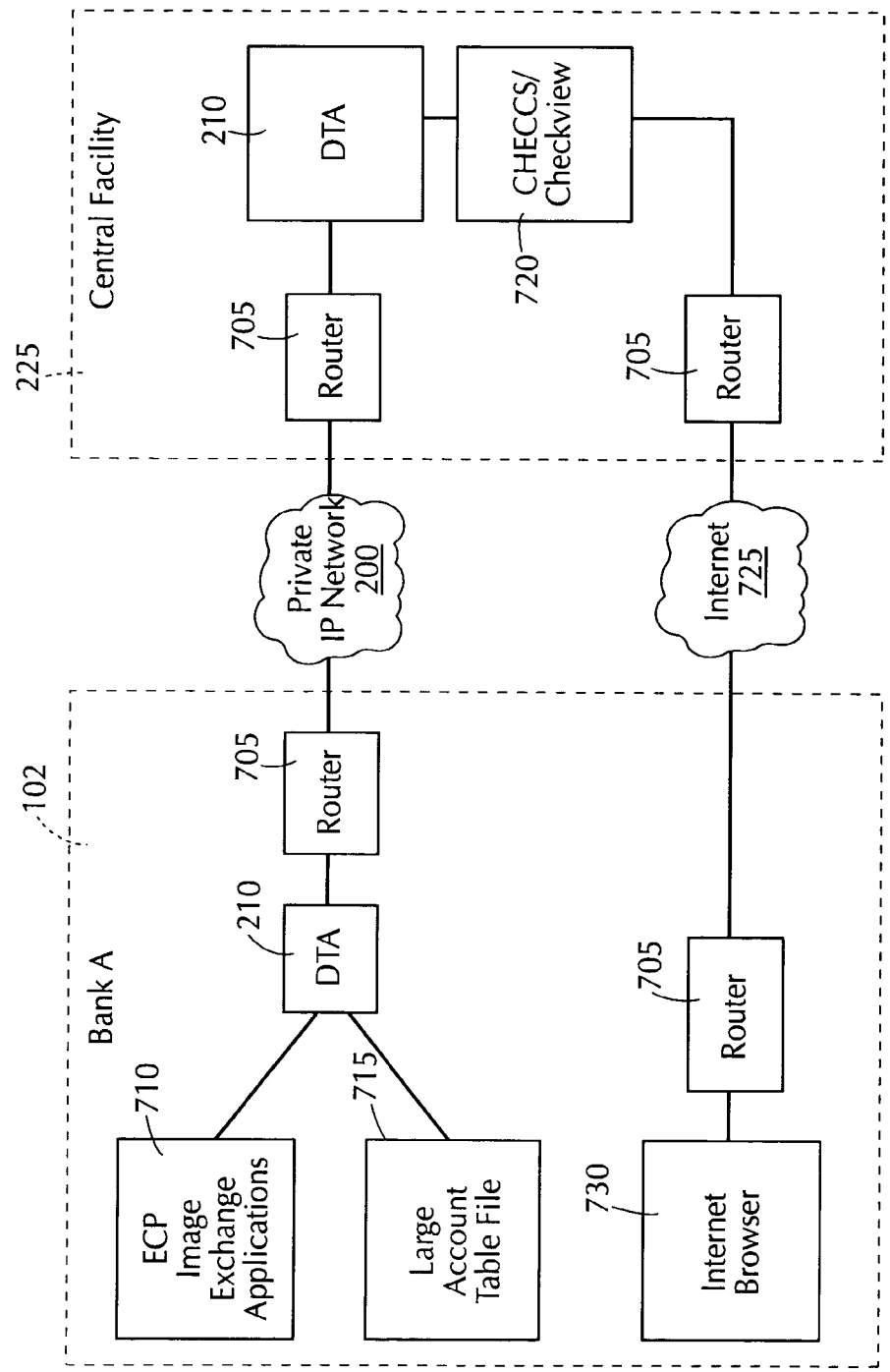
FIG. 14 is a block diagram of the interconnection of the ECP system with a monitor and control system.

Valid values for the file application status indicator are:
File accepted
File not accepted
File not posted
Reconcilement discrepancy correction As discussed above, the DTA or DTAs at each host bank are responsible for sending and receiving files relating to the bank's ECP system and large account table (LAT) system. As shown in FIG. 14, the DTA 210 at each bank, e.g., Bank A, sends and receives payload data through a router 705 connected to the private network. The DTA 210 is in turn connected to the bank's ECP image exchange application 710 and large account table (LAT) application 715, which is the computer program that handles the sending and receiving of LAT data. As discussed above, the LAT data includes routing and account numbers and information on how checks drawn on particular accounts are to be handled by the collecting bank.

Each LAT file contains three sections. The first identifies the source bank for the LATF, the second section identifies the accounts that are eligible for truncation (i.e., accepts ECP with image data), and the last section maps the bank routing numbers in the second section to pre-defined end-point IDs and cutoff times for delivery of the ECP files. The LAT file may be defined using XML. The following is a sample XML schema for a LAT file:

```
<?xml version="1.0"?>
<latf xsi:noNamespaceSchemaLocation="latf.xsd"
    xmlns:xsi="http://www.w3.org/2001/XMLSchema-instance">
  <control>
    <originator_id>333388889</originator_id>
    <date>20030701</date>
    <time>2330</time>
  </control>
  <accounts>
    <account include="y">
      <routing_id>0320000059</routing_id>
      <account_id>29384374389</account_id>
    </account>
    <account include="y">
      <routing_id>0320000059</routing_id>
      <account_id>4545453989</account_id>
      <dollar_limit>100000.00</dollar_limit>
    </account>
    <account_range include="n">
      <routing_id>0320000059<routing_id>
      <account_start>393040000<account_start>
      <account_end>393049999<account_end>
    <account>
  </accounts>
  <endpoints>
    <endpoint id="333388889">
      <cutoff_times>
        <cutoff day="mon" time="23:30:00"/>
        <cutoff day="tue" time="23:30:00"/>
        <cutoff day="wed" time="23:30:00"/>
        <cutoff day="thu" time="23:30:00"/>
        <cutoff day="fri" time="22:30:00"/>
        <cutoff day="sat" time="16:30:00"/>
        <cutoff day="sun" time="16:30:00"/>
      </cutoff_times>
      <routing_ids>
        <routing_id>0320000059<routing_id>
        <routing_id>0320000062<routing_id>
        <routing_id>0320000023<routing_id>
      </routing_ids>
    <endpoint>
  </endpoints>
</latf>
```

As discussed above, the central facility 225 has a DTA 210, or several DTAs that receive control information via transmittal messages regarding all ECP and LAT files that are transmitted through the private network. This information may also be made available to participating banks using a monitor and control system 720, such as the well-known CHECCS/Checkview system, which is a separate system to which the DTA 210 at the central facility 225 is connected. The monitor and control system includes a Checkview web server 720 that is connected to a public network, e.g., the Internet 725, through a router 705 and configured to distribute information to the participating banks, as well as ECP and image exchange information. The server 720 is accessed in a secure mariner by the participating banks using a computer 730 connected to the Internet 725 through a router 705 and equipped with an Internet browser (Checkview web client).

The monitor and control system 720 interfaces with the DTAs via a messaging layer that is configurable to allow member banks, at the discretion of the central facility 225, to configure, monitor, and control the DTAs at each respective member bank. To users of the system, the DTA 210 functions as a "black box," as there is no direct user interface with the DTA 210 in the preferred embodiment, although such an interface could be provided. Rather, there is an indirect user interface through the monitor and control system 720.

The above electronic systems can be readily modified for electronic payment clearing. In this instance, rather than generating an ECP data file via a check processing computer, an electronic payment (EP) data file is instead generated by a payment processing computer, which is then communicated as a payload, with a transmittal, from a sending bank to one or more receiving banks via their respective DTAs and the network. As will be appreciated by those skilled in the art, certain parts of the above-described ECP system are not needed in a dedicated EP system. Alternatively, EP and ECP may be combined in a single system.

As used herein, the term "EP data" or "electronic payment data" refers to any form of data representing an electronic payment, including but not limited to one initiated by check, initiated by credit or debit payment card, initiated electronically, initiated by computer, initiated by telephone or other verbal authorization, initiated by written payment order or initiated by other means.

The systems of the present invention may provide fast and efficient transfer of EP, ECP, and other financial or non-financial data between depositary, collecting and paying banks or other entities, in an environment that maintains centralized accountability and control to ensure the integrity of the payment and/or check collection processes. In addition, transportation savings may be significant due to the high volume of transit items, for example, checks and check letters, that no longer need to be sent between banks. Additional transportation savings may be realized as the number of participating banks increases.

Moreover, an ECP system with image exchange may result in significant reduction of float due to the acceleration of posting by the paying bank. For example, by eliminating the need to deliver checks to the paying bank before a designated deadline for presentment, the volume of checks that can be included in ECP transmissions for accelerated posting may increase. In addition, the paying bank may realize a reduction in the cost of funds. There may be some improvement in clearing times for collecting banks as well. For example, two day availability items may receive next day availability, and items that are captured too late to meet dispatch deadlines may be dispatched electronically the same evening. Also, fraud reduction may be achieved due to expedited forward and return presentment.

As discussed above, electronic payments are similar to check image exchange, in that there is a need to exchange data in addition to the transaction record itself. Whereas the check image provides additional information to support the clearing of checks, certain electronic payments convey additional supporting data, such as addenda records associated with ACH transactions, details associated with commercial transactions such as invoice or purchase order references, images of electronic versions of trade documents, and proof of authorization such as signature images or cryptographically secured digital signatures. The system of the present invention conveys electronic payments with their supporting data efficiently and reliably. Thus, benefits and efficiencies similar to those described above for ECP and image exchange may also be achieved for electronic payment processing. In particular, the system of the present invention supports the clearing and exchange of multiple types of payments, eliminating the complexity and expense of maintaining separate, dedicated payment systems. Because such a system does not require centralized processing of transaction files, it can accommodate multiple different types of payment files without requiring significant reprogramming or changes in the basic process.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A system comprising:
   a plurality of first entities, each first entity communicatively connected to at least one distributed traffic agent (DTA);
   a second entity communicatively connected to a DTA; and
   a first communication network communicatively connecting the DTAs, wherein a payload containing a data file is communicated from at least one of said plurality of first entities to another of said plurality of first entities through their respective DTAs via said first communication network, the data file including electronic check presentment data or electronic payment data, wherein in response to at least one of the respective DTAs receiving the data file, the at least one DTA automatically converts the data file according to a network protocol that is distinct from a network protocol used by the at least one DTA to transmit data files, wherein a transmittal containing control information corresponding to the payload is communicated from said at least one first entity to said second entity through their respective DTAs via said first communication network, wherein the DTA communicatively connected to said at least one first entity is responsive to receiving the transmittal by automatically forwarding the transmittal to the DTA communicatively connected to said second entity, the DTA communicatively connected to said second entity is responsive to receiving the transmittal by automatically forwarding the transmittal to said second entity, and wherein at least one of the DTAs comprises a server computer.

2. A system according to claim 1, wherein said second entity is a central facility, and the central facility provides to the DTA communicatively connected to the at least one first entity, routing information for the control information.

3. A system according to claim 1, wherein the transmittal is also communicated from said at least one first entity to said another first entity through their respective DTAs via said first communication network.

4. A system according to claim 1, wherein processing notification messages are communicated among said at least one first entity and said another first entity and said second entity through their respective DTAs via said first communication network.

5. A system according to claim 1, wherein said first entities are banks, and said second entity is a central facility.

6. A system according to claim 1, wherein said second entity has a web view server, and said at least one first entity and said another first entity have web view clients, the web view server and web view clients communicatively connected via a second communication network.

7. A system according to claim 6, wherein said first communication network is a private communication network, and said second communication network is the Internet.

8. The system of claim 1, wherein the control information is determined based on the data file.

9. The system of claim 8, wherein the second entity is a central facility, and wherein the central facility reconciles the control information with the data file.

10. The system of claim 1, wherein the data file includes a cash letter.

11. The system of claim 10, wherein the cash letter is without check image data.

12. The system of claim 1, wherein the data file includes a cash letter and check image data.

13. The system of claim 1, wherein the distributed traffic agent (DTA) comprises:
an input module and an output module configured to communicate the data file;
a network address module configured to obtain a network address of at least one of the first entities; and
a network interface module configured to convert the data file.

14. The system of claim 13, wherein the network address module is configured to obtain a routing number based on the network address.

15. The system of claim 14, wherein the network address module obtains the routing number from the second entity, and wherein the second entity is a central facility.

16. The system of claim 1, wherein the data file comprises an electronic check letter that lists check information for checks.

17. The system of claim 1, wherein the data file has an assigned priority order specifying an order in which the data file is processed at one of the first entities.

18. The system of claim 1, wherein one of the network protocols is in accordance with a protocol of the first communication network.

19. The system of claim 1, wherein one of the network protocols is in accordance with a protocol of one of the first entities.

20. The system of claim 1, wherein the DTA communicatively connected to said at least one first entity forwards to said at least one first entity a confirmation that the payload has been communicated.

* * * * *